(12) United States Patent  
Oikawa

(10) Patent No.: US 8,149,324 B2  
(45) Date of Patent: Apr. 3, 2012

(54) PHASE DIFFERENCE DETECTION DEVICE, IMAGING APPARATUS, PHASE DIFFERENCE DETECTION METHOD

(75) Inventor: Makoto Oikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 249 days.

(21) Appl. No.: 12/503,974

(22) Filed: Jul. 16, 2009

(65) Prior Publication Data

US 2010/0013947 A1  Jan. 21, 2010

(30) Foreign Application Priority Data

Jul. 17, 2008 (JP) ................................. 2008-186401

(51) Int. Cl.
- H04N 5/232 (2006.01)
- H04N 5/238 (2006.01)
- H04N 9/64 (2006.01)
- G06K 9/40 (2006.01)
- G06K 9/46 (2006.01)
- G03B 13/00 (2006.01)
- G03B 7/099 (2006.01)
- G01D 5/34 (2006.01)

(52) U.S. Cl. ........ 348/349; 348/345; 348/353; 348/365; 348/251; 382/274; 382/190; 382/181; 396/104; 396/114; 396/89; 250/231.16

(58) Field of Classification Search ................. 348/326, 348/251, 252, 222.1, 229.1, 208.12, 673, 348/687, 678, 603, 362–366, 345–356; 382/274, 382/118, 190, 181, 115; 396/104, 89, 121, 396/114; 250/208.1, 201.7, 231.16

See application file for complete search history.

(56) References Cited

U.S. PATENT DOCUMENTS

| | | | | |
|---|---|---|---|---|
| 6,781,632 | B1 * | 8/2004 | Ide | 348/345 |
| 7,924,342 | B2 * | 4/2011 | Kusaka | 348/345 |
| 2007/0206940 | A1 * | 9/2007 | Kusaka | 396/128 |

FOREIGN PATENT DOCUMENTS

| | | |
|---|---|---|
| EP | 0757476 A2 | 2/1997 |
| JP | 52-138924 | 11/1977 |
| JP | 62-039722 | 8/1987 |
| JP | 63-264715 | 11/1988 |
| JP | 9-046596 | 2/1997 |
| JP | 2004-012601 | 1/2004 |

* cited by examiner

Primary Examiner — Lin Ye  
Assistant Examiner — Marly Camargo  
(74) Attorney, Agent, or Firm — Cowan, Liebowitz & Latman, P.C.

(57) ABSTRACT

The ratio between an image A and an image B is calculated as the comparison result of the images A and B obtained from a pair of optical images. The variance is then calculated in order to evaluate the statistical fluctuation of the ratio obtained for each pixel. The fluctuation due to the variance is evaluated for each phase difference while the phase between the image A and the image B is shifted. The phase difference detection is performed on the basis of the evaluation result of the fluctuation.

14 Claims, 29 Drawing Sheets

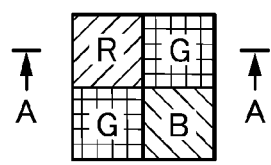
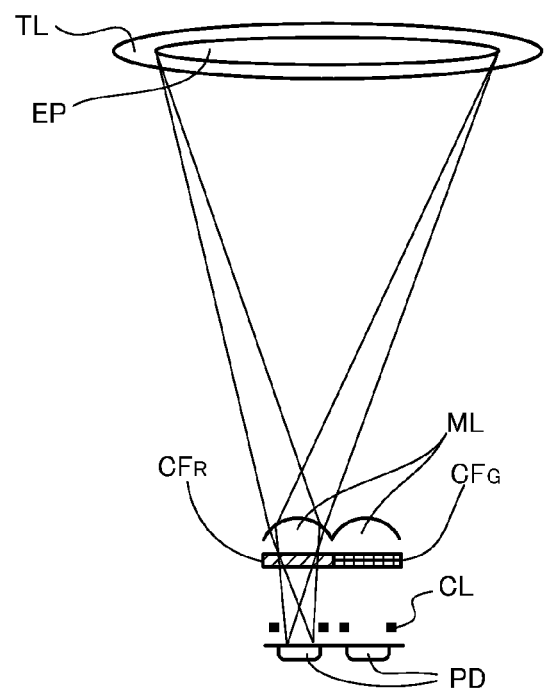
FIG. 5A  FIG. 5B
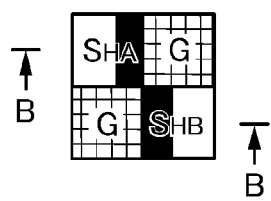
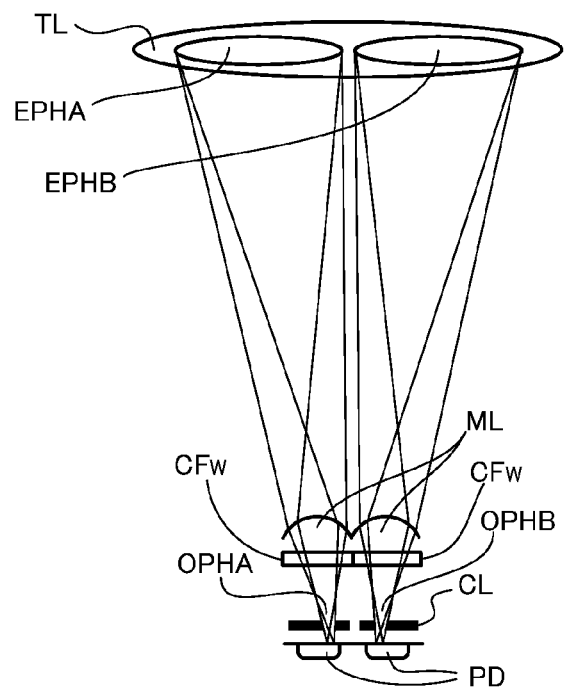
FIG. 6A  FIG. 6B

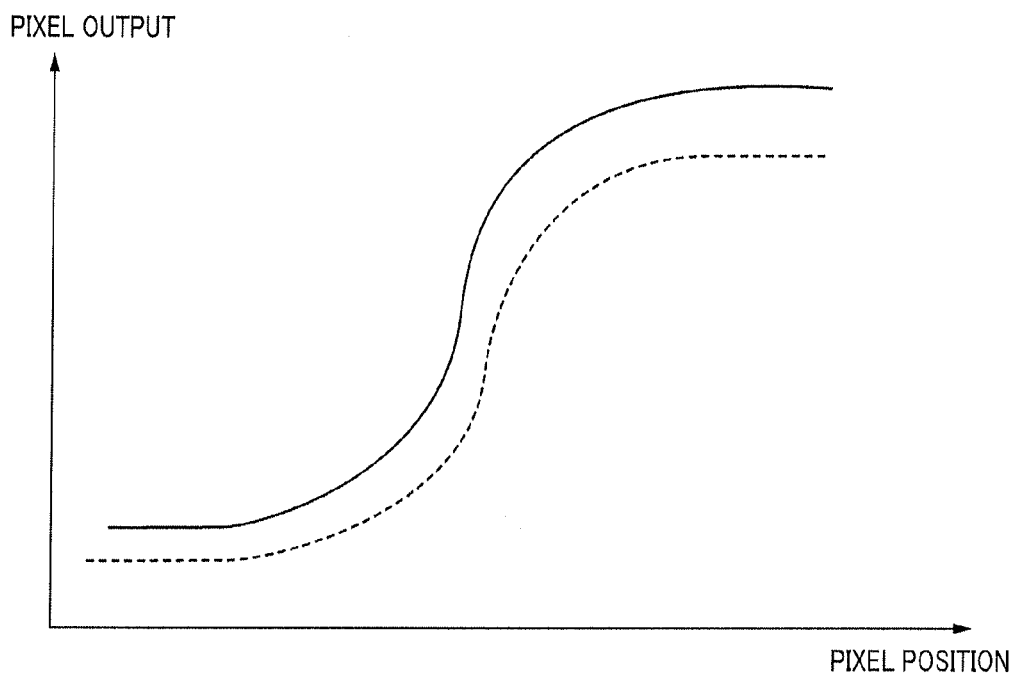
FIG. 35A *(PRIOR ART)*
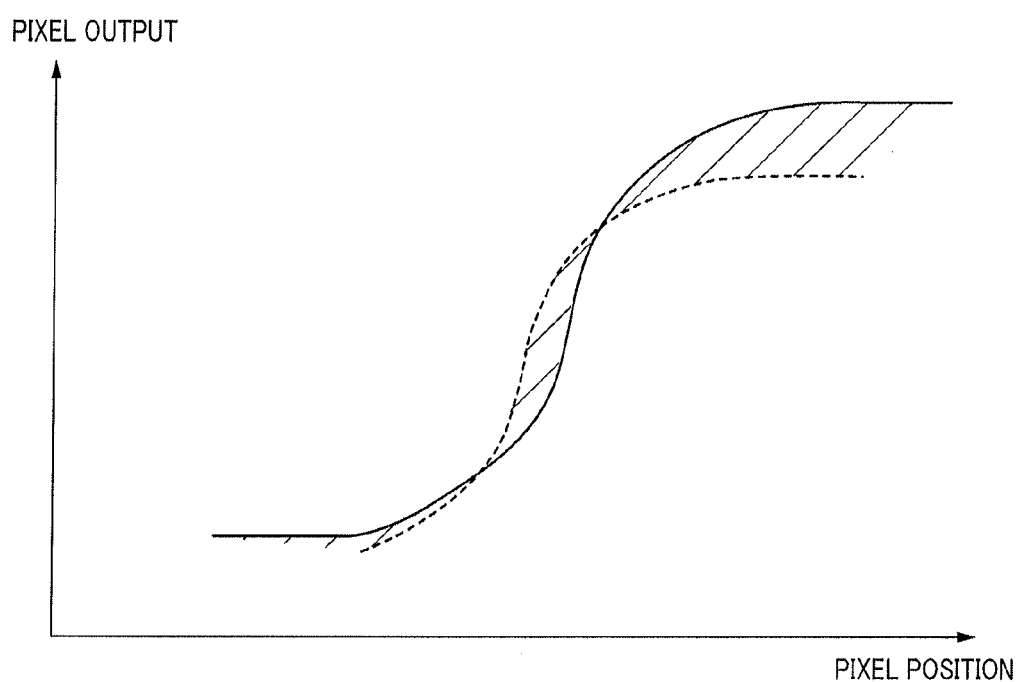
FIG. 35B *(PRIOR ART)*

PHASE DIFFERENCE DETECTION DEVICE, IMAGING APPARATUS, PHASE DIFFERENCE DETECTION METHOD

BACKGROUND OF THE INVENTION

1. Field of the Invention

The present invention relates to a phase difference detection device which can be employed on an imaging apparatus such as a camera or a video camera, an imaging apparatus including the phase difference detection device, a phase difference detection method, and a computer-readable recording medium containing computer program code for causing a computer to carry out the phase difference detection method.

2. Description of the Related Art

In conventional imaging apparatuses, the focus state of an image-taking lens is detected in an autofocus (AF) operation. For example, a focus detection method is known that is for detecting a focus state of an image-taking lens from a phase difference between a pair of image signals between which the relative position relationship changes depending on the focus state of the image-taking lens. A method for detecting a phase difference between a pair of image signals on the basis of a predefined amount of information (hereinafter referred to as "amount of correlation") obtained from a pair of image signals is disclosed in Japanese Patent Laid-Open No. 62-39722. Two output signals are created that show the phase correlation of the two image signals. In Japanese Patent Laid-Open No. 62-39722, a pair of radiant energy detectors are positioned to receive energy in the form of image signals from a scene being viewed. A first of such detectors produces a first output signal pattern while a second of such detectors produces a second output signal pattern. The two patterns coincide at the desired focus position but move with respect to one another in a first or opposite direction depending upon the focus condition. The slope of one or both of the patterns at predetermined positions is multiplied by the difference in value from the outputs of the detectors to create values which are summed. The sign of the summed values is representative of the direction the taking lens must be moved to bring the patterns into coincidence at the desired focus position. The sum of the first resulting signal and the second resulting signal is defined as an amount of correlation. A phase difference between a pair of image signals is detected on the basis of the amount of correlation. In addition, a TTL ("through the lens") phase difference focus detection device for detecting a focus state of an image-taking lens from a phase difference between a pair of image signals produced by a light beam transmitted through different pupil areas of the taking lens is disclosed in Japanese Patent Laid-Open No. 63-264715. In Japanese Patent Laid-Open No. 63-264715, the sum of the absolute values of the phase difference between a pair of image signals is defined as an amount of correlation. A phase difference between a pair of image signals is detected on the basis of the amount of correlation. Furthermore, the phase difference focus detection method of the external measuring type is disclosed in Japanese Patent Laid-Open No. 2004-12601.

However, there are the following problems with the conventional phase difference detection methods. At a position away from the center of the optical axis of an image-taking lens, an uneven decrease in light intensity from a pair of image signals occurs due to vignetting of an image-taking lens, resulting in a gain difference between two image signals. An attempt to detect a phase difference between two image signals having a gain difference may result in not only detection difficulty caused by a poor degree of coincidence therebetween but may also result in detection error depending on the pattern of an image signal. FIG. 35A is a view showing the waveforms of two image signals when there is a gain difference. The y-axis shows a pixel output against the pixel position in the x-axis (as in FIGS. 13A, 14A and 15A as will be described later). The pixel output is the output from an image sensor represented by a wave-pattern. FIG. 35A illustrates a case where an object having a gradation pattern with black on the left, white on the right, and a gradual change from black to white at the boundary between the black and the white is captured. FIG. 35A also shows the state where there is no phase difference between two image signals. Assume that the phase difference detection is performed by an amount of correlation disclosed in Japanese Patent Laid-Open No. 62-39722 and Japanese Patent Laid-Open No. 63-264715 when two image signals as shown in FIG. 35A are obtained. In this case, the gain difference that has occurred between two image signals cannot be distinguished from the phase difference between two image signals. Consequently, the phase difference detection mistakenly determines that two image signals are matched at a lateral offset position.

FIG. 35B is a view showing the waveforms of two image signals when a conventional phase difference detection has mistakenly determined that two image signals were matched when there was a gain difference. In the prior art, the area denoted by hatching in FIG. 35B corresponds to an amount of correlation, so that it is determined that two image signals are matched in the state shown in FIG. 35B at which the hatched area is minimized. Hence, when the phase difference detection is performed using a conventional amount of correlation, the phase difference detection mistakenly determines that two image signals are matched at a lateral offset position due to the influence of a level difference as shown in FIG. 35B. As a result, the problem arises in that deviations in the phase difference detection result of two image signals will occur. For example, a method for correcting a gain difference by determining the amount of an uneven decrease in light intensity is also contemplated. However, there exist the vignetting deviation due to manufacturing error on an image-taking lens, the vignetting deviation due to play of an image-taking lens during zoom/focus driving, and the aperture ratio deviation due to manufacturing fluctuations on a lens system that forms a pair of optical images, or the like. Therefore, an error caused by these various factors still remains in gain correction, which may result in the gain difference as shown in FIG. 35A. When such correction remains present, the problem also arises in that deviations in the phase difference detection result of two image signals will occur.

SUMMARY OF THE INVENTION

It is an object of the present invention to provide a phase difference detection device. The phase difference detection device includes a photoelectric conversion unit in which a plurality of pixels for photoelectrically converting received light are arrayed, the photoelectric conversion unit being configured to photoelectrically convert at least a pair of optical images received through a lens so as to generate a first image signal and a second image signal. The phase difference detection unit includes unit for obtaining first and second image signals from each of at least two pixel positions in the photoelectric conversion unit, comparison unit for comparing the first image signal with the second image signal for each pixel position, fluctuation calculation unit for calculating a fluctuation of first and second image signals, unit for comparing the calculated fluctuation over a range of pixel positions to obtain a resultant first image signal and a resultant second image signal, and phase difference calculation unit for calculating a phase difference between the resultant first and second image signals in order to enable the determination of a focus state of the lens on the basis of the calculated fluctuation.

It is desirable to provide a phase difference detection device that is less susceptible to a phase difference detection error even for a pair of image signals having a gain difference.

Further features of the present invention will become apparent from the following description of exemplary embodiments with reference to the attached drawings.

BRIEF DESCRIPTION OF THE DRAWINGS

FIGS. 5A and 5B show the arrangement and structure of the image sensing pixels.

FIGS. 6A and 6B show the arrangement and structure of the focus detection pixel for carrying out pupil splitting in the horizontal direction (lateral direction) of the photographic optical system.

FIG. 35A is a view showing the waveforms of two image signals when there is a gain difference.

FIG. 35B is a view showing the waveforms of two image signals when a conventional phase difference detection has mistakenly determined that two image signals were matched when there was a gain difference.

DESCRIPTION OF THE EMBODIMENTS

Hereinafter, the best mode for carrying out the invention will now be described with reference to the accompanying drawings. As described below, each drawing including FIG. 1 is a schematic view, and the respective portions are emphasized in both size and shape for ease of understanding. In the following description, specific numerical values, shapes, and operations are shown, which may be appropriately modified. Furthermore, unless otherwise specified, the terms "up and down" (or longitudinal), "right and left" (or lateral), and "front and rear" used in the following description refer to the situation when the camera's position is normal. "Up and down" refers to up and down from the camera's normal position. "Right and left" refers to right and left from the camera's normal position assuming that the "right" indicates the right hand side of the camera seen from the rear face thereof by the user or photographer holding the camera. For "front and rear," the object side refers to the "front" side. "Normal position" refers to the position at which the user or photographer holds the camera in the normal state, namely, the user or photographer holds the camera in the state in which an optical axis of a photographic optical system is horizontal and the longitudinal direction of a photographing frame is also in the horizontal direction.

First Embodiment

Figure 1A:
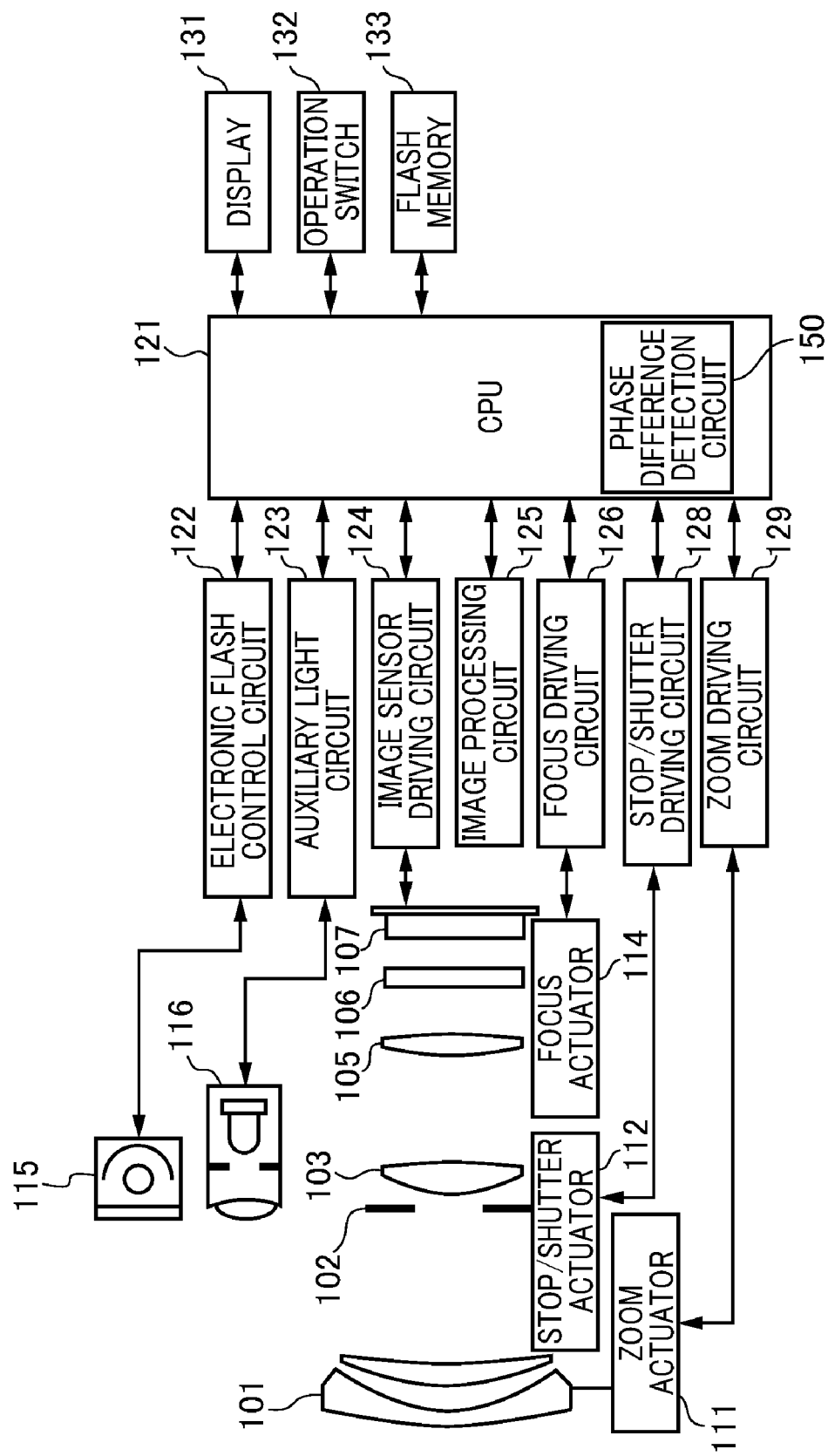
FIG. 1A is a view showing a configuration of a camera of the first embodiment used with the phase difference detection device of the present invention.

FIG. 1A is a view of the configuration of the camera of the first embodiment provided with the phase difference detection device of an embodiment of the present invention. The camera of the first embodiment is a digital camera that serves as an imaging apparatus integrating a camera body having an image sensor with a photographic optical system TL. The camera of the first embodiment includes a first lens group 101, a stop/shutter 102, a second lens group 103, a third lens group 105, a low-pass filter 106, an image sensor 107. In addition, the camera of the first embodiment includes a zoom actuator 111, a stop/shutter actuator 112, a focus actuator 114, an electronic flash 115, an AF auxiliary light unit 116, a CPU 121, an electronic flash control circuit 122. The camera of the first embodiment further includes an auxiliary light driving circuit 123, an image sensor driving circuit 124, an image processing circuit 125, a focus driving circuit 126, a zoom driving circuit 129, a display 131, an operation switch group 132, and a removable flash memory 133.

The first lens group 101 is a lens group arranged at the distal end (object side) of the photographic optical system (image forming optical system), and is held so as to be extendable and retractable in the optical axis direction. The stop/shutter 102 adjusts the aperture diameter to adjust the light quantity when shooting. The stop/shutter 102 also functions as a shutter for adjusting the exposure time when shooting a still image. The second lens group 103 is a lens group which is arranged closer to the image sensor 107 than the first lens group 101 and the stop/shutter 102. The stop/shutter 102 and a second lens group 103 advance and retract together in the optical axis direction to achieve a zooming operation (zooming function) in synchronism with the reciprocal operation of the first lens group 101. The third lens group 105 is a lens group which is arranged closer to the image sensor 107 than the second lens group 103. The third lens group 105 functions as a focus lens group for focusing by advancing and retracting in the optical axis direction.

The low-pass filter 106 is an optical low-pass filter comprising an optical element for reducing the false color or moiré of a shot image. The image sensor 107 is a photoelectric conversion unit constituted by a CMOS (Complementary Metal Oxide Semiconductor) image sensor and its peripheral circuit. The image sensor 107 is a two-dimensional one-chip color sensor in which a plurality of pixels (light receiving pixels) arranged in a matrix having m pixels in a row in the lateral direction and n pixels in a column in the longitudinal direction are integrated on a chip and a Bayer-pattern primary color mosaic filter is formed over the plurality of pixels. The image sensor of the present embodiment includes an image sensing pixel for generating an imaging image signal for use in the generation of the image-capturing image data based on an object image; and a phase difference detecting pixel distributed at regular intervals between these image sensing pixels. The details of the above will be described later. The zoom actuator 111 is, for example, a stepping motor. The zoom actuator 111 produces the driving force for rotating a cam cylinder (not shown), and drives the first lens group 101 to the third lens group 105 to advance and retract in the optical axis direction and perform the zooming operation. The stop/shutter actuator 112 is, for example, an electromagnetic driven actuator utilizing a magnet coil and a magnet. The stop/shutter actuator 112 controls the aperture diameter of the stop/shutter 102 to adjust the light quantity when shooting, and controls the exposure time when shooting a still image. The focus actuator 114 is, for example, a stepping motor. The focus actuator 114 adjusts the focus by extending and retracting the third lens group 105 in the optical axis direction.

The electronic flash 115 is a light source used to illuminate an object when shooting. The electronic flash 115 is preferably a flash illumination device using a xenon tube, but may also be an illumination device having a continuous emission LED (Light Emitting Diode). The AF auxiliary light unit 116 projects, to the field via a projection lens, an image of a mask having a predetermined aperture pattern, and improves the focus detection capability for a dark object or low-contrast object. The CPU 121 is the CPU within the camera, which carries out comprehensive control of the various operations of the camera body. The CPU 121 includes an arithmetic unit (not shown), a ROM, a RAM, an A/D converter, a D/A converter, a communication interface circuit, and the like. The CPU 121 drives various circuits incorporated in the camera on the basis of a predetermined program stored in the ROM to execute a series of operations including focus detection, AF operation, shooting, image processing, and recording. The CPU 121 also includes a phase difference detection circuit 150. The phase difference detection circuit 150 performs phase difference detection (which will be described below) in order to achieve focus detection which is used for the focus adjustment operation (AF operation) to be performed by the focus driving circuit 126. In the embodiment, the phase difference detection circuit 150 is included within the CPU 121, which is implemented as a function of the CPU 121, however, the phase difference detection circuit 150 may also be configured as a circuit separate from the CPU 121.

Figure 1B:
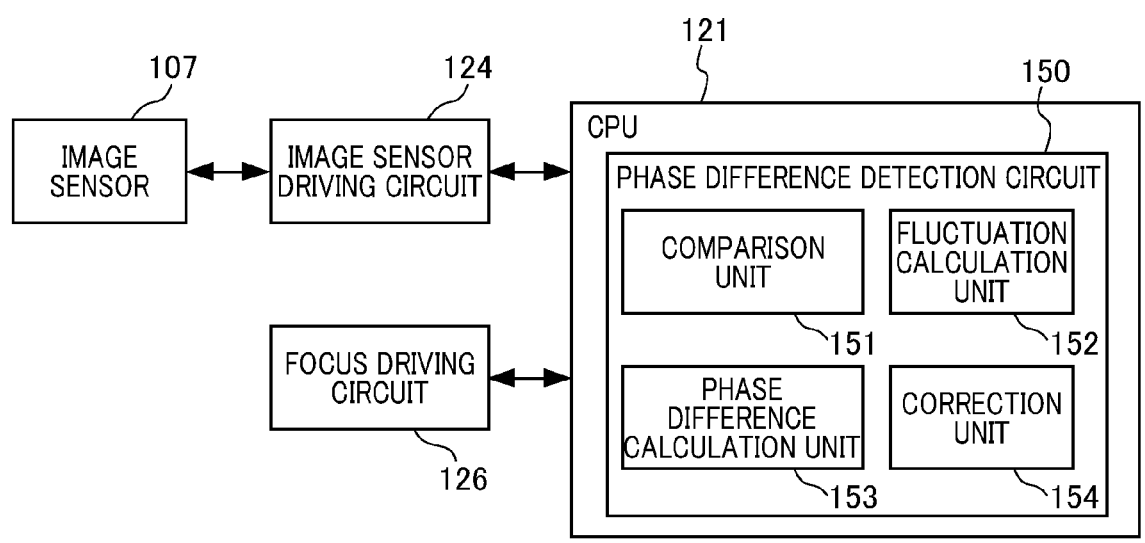
FIG. 1B is a block diagram showing an extracted portion associated with the phase difference detection circuit of FIG. 1A.

FIG. 1B is a block diagram showing an extracted portion associated with the phase difference detection circuit 150. The phase difference detection circuit 150 includes a comparison unit 151, a fluctuation calculation unit or analysis unit 152, a phase difference calculation unit 153, and a correction unit 154. As mentioned above, the image sensor comprises a matrix of pixels. These pixels produce image signals as a result of optical signals (i.e. light) hitting them through use of their photodiodes. Some of the pixels may be allocated to focus detection (those that can be spared from imaging). The image signals created by these allocated focus detection pixels are dealt with as described below. The focus detection pixels may be allocated in pairs, first and second pixels of each pair generating first and second image signals respectively. The comparison unit 151 sequentially measures image signals generated by the pairs of pixels that are allocated to focus detection, as will be described below with respect to FIGS. 6A and 6B. The comparison unit compares the first image signals with the second image signals and determines a fluctuation of the image signals. The fluctuations results of all of the pairs of pixels are compared with each other in order to determine the pair with the lowest fluctuation. This pair of image signals then have their phase difference calculated and this is used as the phase difference for the calculation of the lens focus. More specifically, the comparison unit 151 compares each of the (first and second) image signals forming a pair of image signals at pixel portions which correspond to each pixel at their "displaced respective relative displacement positions." What is meant by this is that a pair of pixels have their aperture for receiving light displaced relative to each other. This different relative displacement (as will be discussed below) is what gives the two pixels in each pair of pixels their different resulting image signals because different intensities from different portions of light being received through the lens 105 will hit the pixels, depending on their "respective relative displacement positions." The comparison unit 151 outputs the comparison result. In the present embodiment, the comparison unit 151 outputs the ratio between the first and second image signals as the comparison result, but may also output a difference between the signals. The fluctuation calculation unit 152 makes a statistical analysis of the comparison of the image signals. For example, the analysis may be specifically be a fluctuation calculation that computes the statistical fluctuation of the comparison result for all focus detection pixels output by the comparison unit 151 at the respective relative displacement position for quantification. In the present embodiment, the variance to be described below is determined as a statistical fluctuation. The phase difference calculation unit 153 calculates the phase difference of a pair of image signals on the basis of the variance, for example on the basis of the statistical fluctuation quantified by the fluctuation calculation unit 152 in response to outputs by different pairs of pixels. The phase difference calculated by the phase difference calculation unit 153 is sent to the CPU 121 for use in the AF operation performed by the focus driving circuit 126. The correction unit 154 corrects the signal level of a pair of image signals on the basis of the variance, that is, statistical fluctuation quantified by the fluctuation calculation unit 152 in response to the potentially differing outputs of the different pairs of pixels. In the present embodiment, the correction unit 154 corrects the signal level of a pair of image signals on the basis of the relative pixel position where the variance is minimized.

Referring back to FIG. 1A, the electronic flash control circuit 122 controls the ON operation of the illumination unit 115 in synchronism with the shooting operation. The auxiliary light circuit 123 controls the ON operation of the AF auxiliary light unit 116 in synchronism with the focus detection operation. The image sensor driving circuit 124 controls the imaging operation of the image sensor 107, A/D-converts an acquired image signal, and transits the digital data to the CPU 121. The image processing circuit 125 performs processes such as γ conversion, color interpolation, and JPEG compression for an image obtained by the image sensor 107. The focus driving circuit 126 carries out control to drive the focus actuator 114 on the basis of the focus detection result, and drive the third lens group 105 to advance and retract in the optical axis direction, thereby adjusting the focus. The shutter driving circuit 128 carries out control to drive the stop/shutter actuator 112, whereby the aperture of the stop/shutter 102 is controlled. The zoom driving circuit 129 drives the zoom actuator 111 in accordance with the zooming operation of the user. The display 131 is, for example, an LCD (Liquid Crystal Display), and displays information on the shooting mode of the camera, a preview image before shooting, a confirmation image after shooting, an in-focus display image upon focus detection, and the like. The operation switch group 132 includes a power switch, release (shooting trigger) switch, zooming operation switch, shooting mode selection switch, and the like. The flash memory 133 is a removable storage medium which records a shot image.

Figure 2:
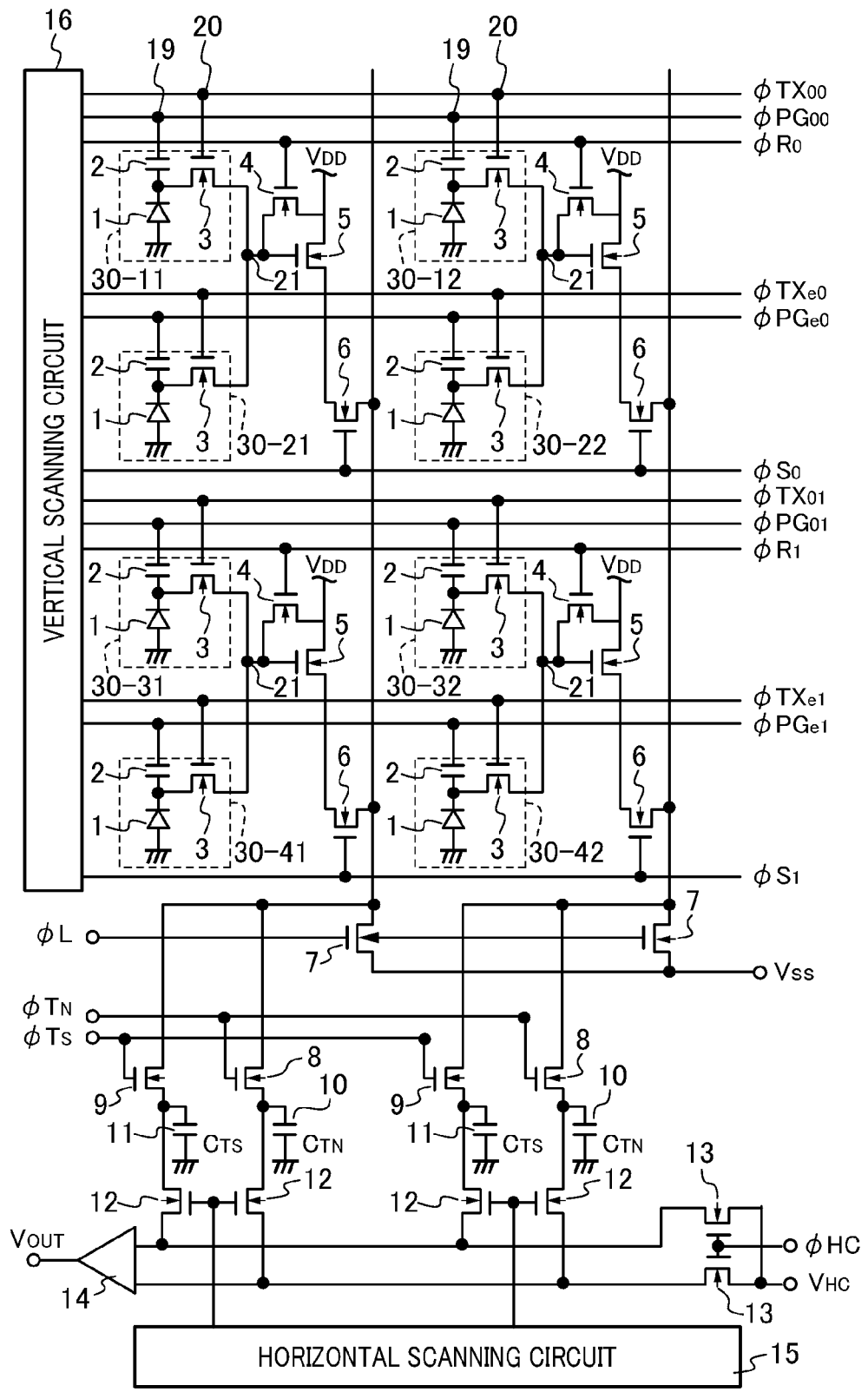
FIG. 2 is a schematic circuit diagram of the image sensor according to the present invention.

FIG. 2 is a schematic circuit diagram of the image sensor according to the present invention. The basic configuration of the image sensor 107 of the present embodiment is similar to that of a technique disclosed in Japanese Patent Laid-Open No. 09-046596. FIG. 2 shows a pixel area of 2 columns by 4 rows in the two-dimensional image sensor 107 (CMOS image sensor). In the actual image sensor 107, a plurality of pixel areas shown in FIG. 2 are arranged so that a high-resolution image can be obtained. The embodiment will exemplify an image sensor having a pixel pitch of 2 μm, effective pixels on 3,000 columns by 2,000 rows=6,000,000 pixels, and an imaging frame size of 6 mm in width times 4 mm in length. The image sensor 107 includes a photoelectric conversion section (PD: photodiode) 1 composed of a MOS transistor gate and a depletion layer under the gate, a photogate 2, a transfer switch MOS transistor 3, and a reset MOS transistor 4. The image sensor 107 also includes a source follower amplifier MOS transistor 5, a horizontal selection switch MOS transistor 6, a source follower load MOS transistor 7, a dark output transfer MOS transistor 8, and a bright output transfer MOS transistor 9. The image sensor 107 also includes a dark output accumulation capacitor $C_{TN}$ 10, a bright output accumulation capacitor $C_{TS}$ 11, a horizontal transfer MOS transistor 12, a horizontal output line reset MOS transistor 13, a differential output amplifier 14, a horizontal scanning circuit 15, and a vertical scanning circuit 16.

Figure 3:
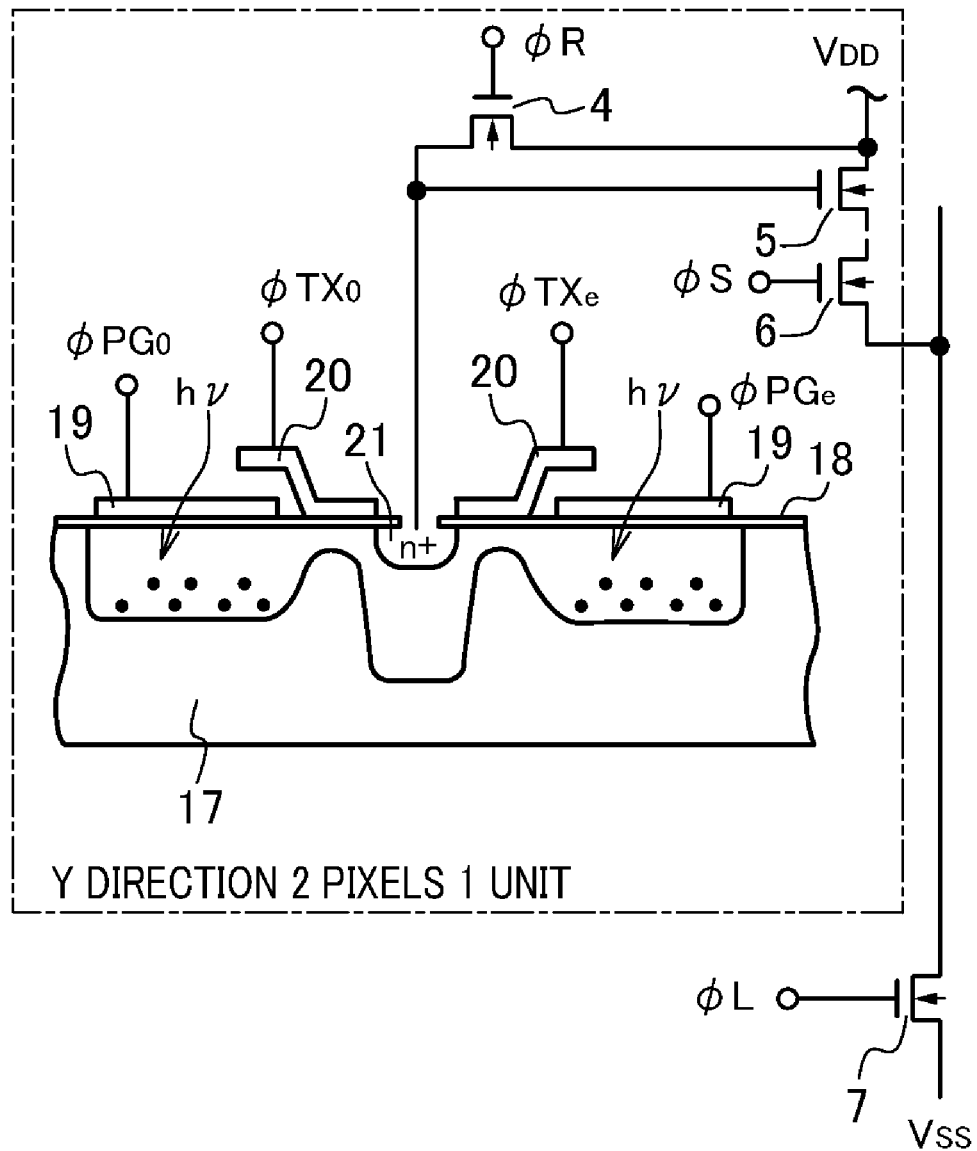
FIG. 3 is a cross-sectional view of the pixel (photoelectric conversion section 1).

FIG. 3 is a cross-sectional view of the pixel section (photoelectric conversion section 1). The image sensor 107 further includes a P-type well 17, a gate oxide film 18, a first poly-Si layer 19, a second poly-Si layer 20, and an n+ floating diffusion (FD) section 21. The FD section 21 is connected to another photoelectric conversion section via another transfer switch MOS transistor. In FIG. 3, the drain of two transfer switch MOS transistors 3 and the FD section 21 is shared to increase the sensitivity by micropatterning and reduction in the capacity of the FD section 21. The FD section 21 may also be connected by, for example, an A1 wire.

Figure 4:
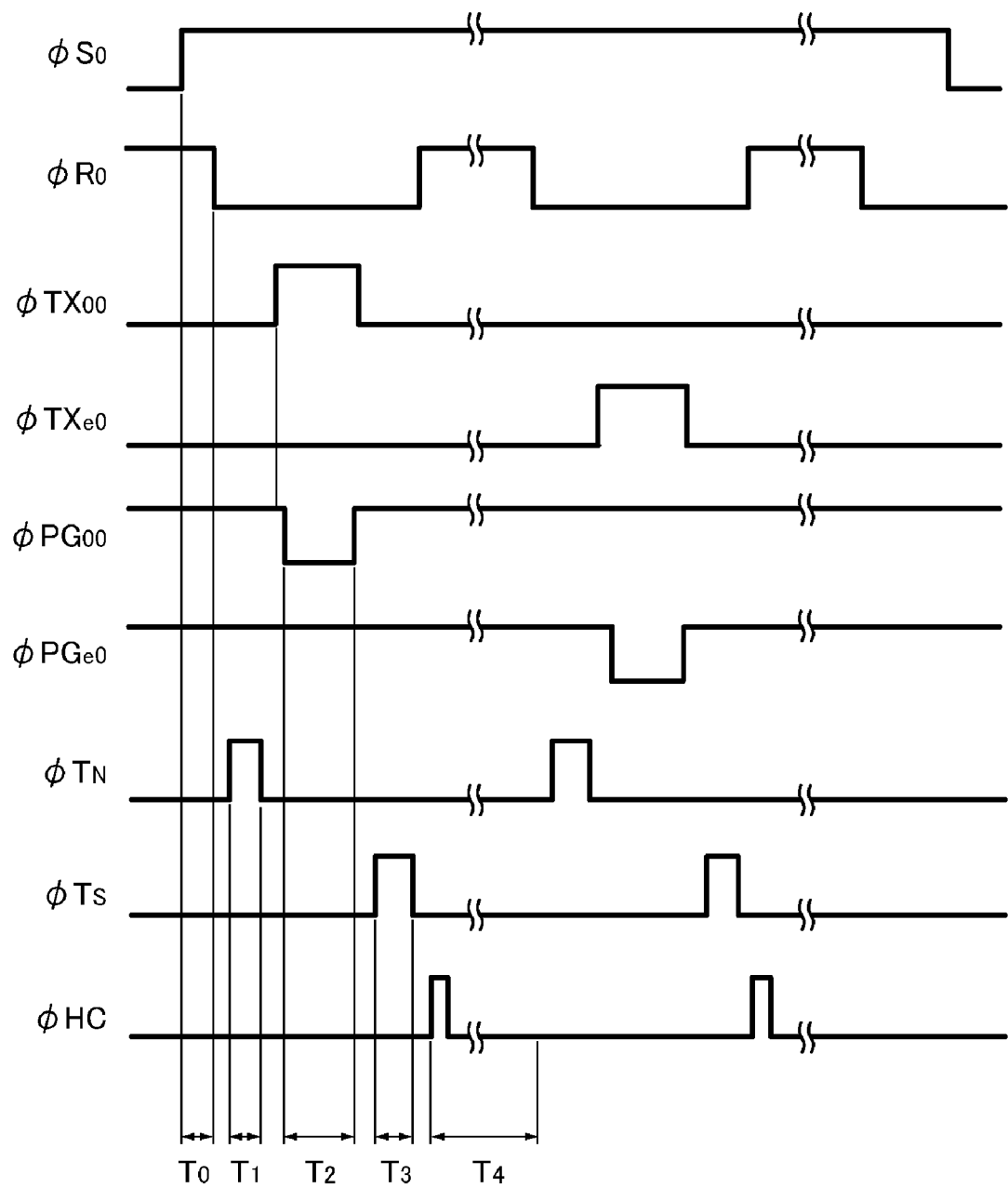
FIG. 4 is an operation timing chart of the image sensor.

FIG. 4 is an operation timing chart of the image sensor. This timing chart in FIG. 4 shows the case of independently outputting signals from all pixels. The operation of the image sensor of the embodiment will be described with reference to the timing chart in FIG. 4. First, in response to a timing output from the vertical scanning circuit 16, a control pulse φL changes to high level to reset a vertical output line. Control pulses φR$_0$, φPG$_{00}$, and φPG$_{e0}$ change to high level to turn on the reset MOS transistor 4 and set the first poly-Si layer 19 of the photogate 2 to high level. In the period T$_0$, a control pulse φS$_0$ changes to high level to turn on the selection switch MOS transistor 6 and select pixels on the first and second lines. Then, the control pulse φR$_0$ changes to low level to end the resetting of the FD section 21, sets the FD section 21 to the floating state, and the signals passes between the gate and source of the source follower amplifier MOS transistor 5. In the period T$_1$, a control pulse φT$_N$ changes to high level to output dark voltage from the FD section 21 to the accumulation capacitor C$_{TN}$ 10 by the source follower operation. To photoelectrically convert outputs from pixels on the first line, a control pulse φTX$_{00}$ for the first line changes to high level to turn on the transfer switch MOS transistor 3. In the period T$_2$, the control pulse φPG$_{00}$ changes to low level. The voltage relationship preferably raises the potential well spreading below the photogate 2 to completely transfer photoinduced carriers to the FD section 21. Hence, the control pulse φTX may also be a fixed potential instead of a pulse as long as carriers can be completely transferred. In the period T$_2$, when charges are transferred from the photoelectric conversion section 1 of the photodiode to the FD section 21, the potential of the FD section 21 changes depending on light. Since the source follower amplifier MOS transistor 5 is in the floating state, the potential of the FD section 21 is output to the accumulation capacitor C$_{TS}$ 11 by changing a control pulse φT$_S$ to high level in the period T$_3$. Up to this time, dark and bright outputs from pixels on the first line have been accumulated in the accumulation capacitors C$_{TN}$ 10 and C$_{TS}$ 11, respectively. In the period T$_4$, a control pulse φHC temporarily changes to high level to turn on the horizontal output line reset MOS transistor 13 and reset the horizontal output lines. In the horizontal transfer period, dark and bright outputs from pixels are output to the horizontal output lines in response to the scanning timing signal of the horizontal scanning circuit 15. At this time, the differential output amplifier 14 outputs a differential output V$_{OUT}$ between the accumulation capacitors C$_{TN}$ 10 and C$_{TS}$ 11, obtaining a signal with a high S/N ratio free from random noise and fixed-pattern noise of the pixel. Photocharges in the pixels 30-12 and 30-22 are respectively accumulated in the accumulation capacitors C$_{TN}$ 10 and C$_{TS}$ 11 at the same time as those in the pixels 30-11 and 30-21. In this readout, however, the timing pulse from the horizontal scanning circuit 15 is delayed by one pixel, and then photocharges are read out to the horizontal output lines and output from the differential output amplifier 14.

In the embodiment, the differential output V$_{OUT}$ is obtained within the chip. However, the same effects can also be attained using a conventional CDS (Correlated Double Sampling) circuit arranged outside the chip, in place of obtaining the differential output V$_{OUT}$ within the chip. After outputting a bright output to the accumulation capacitor C$_{TS}$ 11, the control pulse φR$_0$ changes to high level to turn on the reset transistor 4 and reset the FD section 21 to the power supply V$_{DD}$. After the end of horizontal transfer from the first line, photocharges are read out from the second line. In the readout from the second line, the control pulses φTX$_{e0}$ and φPG$_{e0}$ are similarly driven and the high-level control pulses φT$_N$ and φT$_S$ are supplied to accumulate photocharges in the accumulation capacitors C$_{TN}$ 10 and C$_{TS}$ 11, and output dark and bright outputs. By this driving, photocharges can be independently read out from the first and second lines. Then, the vertical scanning circuit is driven to read out photocharges from the (2n+1)th and (2n+2)th lines (n=1, 2, etc.), thereby independently outputting photocharges from all pixels. For example, for n=1, the control pulse φS$_1$ changes to high level, and then φR$_1$ changes to low level. The control pulses φT$_N$ and φT$_{X01}$ change to high level, the control pulse φPG$_{01}$ changes to low level, the control pulse φT$_S$ changes to high level, and the control pulse φHC temporarily changes to high level, reading out pixel signals from the pixels 30-31 and 30-32. Subsequently, the control pulses φTX$_{e1}$ and φPG$_{e1}$ are applied in the above-described way, reading out pixel signals from the pixels 30-41 and 30-42.

FIGS. 5 to 7 are views for explaining the structures of an image sensing pixel and focus detection pixel. The preferred embodiment of the present invention adopts a Bayer array in which two pixels having G (Green) spectral sensitivity are diagonally arranged among 2 times 2=four pixels, and pixels each having R (Red) and B (Blue) spectral sensitivity are arranged as the remaining two pixels. Focus detection pixels having a structure described below are distributed and arranged between pixels of the Bayer array in accordance with a predetermined rule. FIGS. 5A and 5B show the arrangement and structure of the image sensing pixel. FIG. 5A is a plan view of 2 by 2 image sensing pixels. As is generally known, in the Bayer array, G pixels are diagonally arranged, and R and B pixels are arranged as the two remaining pixels. This 2 by 2 structure is repeatedly arranged. FIG. 5B is a sectional view taken along the line A-A in FIG. 5A. The image sensor 107 further includes an on-chip microlens ML arranged in front of each pixel, CF$_R$, namely, a R (Red) color filter, and CF$_G$, i.e., a G (Green) color filter. In FIG. 5B, reference symbol PD (Photodiode) denotes a schematic photoelectric conversion section of the image sensor 107 shown in FIG. 3. Further, in FIG. 5B, reference symbol CL (Contact Layer) denotes an interconnection layer for forming a signal line for transmitting various signals within the image sensor 107. Reference symbol TL denotes a schematic photographic optical system. The on-chip microlens ML and photoelectric conversion section PD of the image sensing pixel are configured to capture a light beam having passed through the photographic optical system TL as effectively as possible. In other words, an exit pupil EP (Exit Pupil) of the photographic optical system TL and the photoelectric conversion section PD are conjugate to each other via the microlens ML, and the effective area of the photoelectric conversion section is designed so as to be large. FIG. 5B shows the incident beam of the R pixel, but the G pixel and B (Blue) pixel also have the same structure. The exit pupil EP corresponding to each of the R, G, and B image sensing pixels has a large diameter, and a light beam (light quantum) from an object can be efficiently captured to increase the S/N ratio of an image signal.

FIGS. 6A and 6B show the arrangement and structure of focus detection pixels for carrying out pupil splitting in the horizontal direction (lateral direction) of the photographic optical system. FIG. 6A is a plan view of 2 by 2 pixels including focus detection pixels. When obtaining an image signal, the main component of luminance information is attained by a G pixel. The image recognition feature of a person is sensitive to luminance information. Thus, if a G pixel is lost, degradation of the image quality is readily perceived. An R or B pixel is used to acquire color information, and the visual feature of a person is not sensitive to color information. Hence, if a only a few pixels for acquiring color information is lost, degradation of the image quality is hardly recognized. Thus, in the embodiment, among the 2 by 2 pixels, the G pixels are left to serve as image sensing pixels, and the R and B pixels are replaced with focus detection pixels. In FIG. 6A, $S_{HA}$ and $S_{HB}$ represent focus detection pixels. The number of pixels that will serve as focus detection pixels depends on the number of pixels that can be sacrificed as image-producing pixels without visible degradation of the image. An optimum number of pixels is chosen that enables focus detection to be carried out effectively while allowing no (or minimal) degradation of the image insofar as it is invisible to a user.

FIG. 6B is a sectional view taken along the line B-B in FIG. 6A. The microlens ML and photoelectric conversion section PD have the same structures as those of the image sensing pixel shown in FIG. 5B. In the embodiment, a signal from the focus detection pixel is not used to generate an image, so a transparent film $CF_W$ (white) is arranged in place of the color filter for separating color. To carry out pupil splitting at the image sensor 107, the aperture of the interconnection layer CL is offset (or displaced) in one direction from the center line of the microlens ML. Alternatively, the aperture of the interconnection layer CL may be decreased to a smaller opening to limit the amount of light that is transmitted to the photodiode. The limited amount of light may have different positions for different pixels, the positions of the apertures dictating where the light comes from in the exit pupil, as shown in FIGS. 6A and 6B. More specifically, an aperture OPHA of the pixel $S_{HA}$ is offset to the right and receives a light beam having passed through the left side of the exit pupil EPHA of the photographic optical system TL. Similarly, an aperture OPHB of the pixel $S_{HB}$ is offset to the left and receives a light beam having passed through the right side of the exit pupil EPHB of the photographic optical system TL. Pixels $S_{HA}$ are arrayed regularly in the horizontal direction, and an object image obtained by these pixels is defined as image A. Pixels $S_{HB}$ are also arrayed regularly in the horizontal direction, and an object image obtained by these pixels is defined as image B. By detecting the relative positions of the images A and B, the defocus amount of the object image can be detected. Here, the microlens ML serves as a lens which generates a pair of optical images including the image A that consists of a light beam having passed through the left side of the exit pupil EPHA of the photographic optical system TL and the image B that consists of a light beam having passed through the right side of the exit pupil EPHB of the photographic optical system TL. The pixels $S_{HA}$ and $S_{HB}$ can detect the focus of an object, for example, a vertical line having a luminance distribution in the lateral direction of the photographing frame, but cannot detect the focus of a horizontal line having a luminance distribution in the longitudinal direction. Thus, in the embodiment, pixels are also provided that carry out pupil splitting in the vertical direction (longitudinal direction) of the photographic optical system TL so as to detect the focus of a horizontal line.

Figures 7A, 7B:
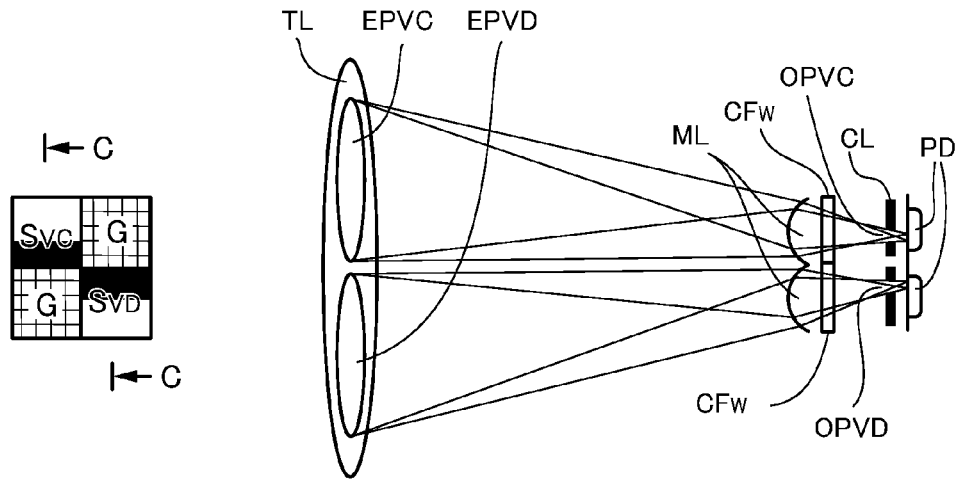
FIGS. 7A and 7B show the arrangement and structure of the focus detection pixel for carrying out pupil splitting in the vertical direction of the photographic optical system.

FIGS. 7A and 7B show the arrangement and structure of focus detection pixels for carrying out pupil splitting in the vertical direction of the photographic optical system. FIG. 7A is a plan view of 2 by 2 pixels including focus detection pixels. Similar to FIG. 6A, G pixels are left to serve as image sensing pixels, and R and B pixels are replaced with focus detection pixels. In FIG. 7A, $S_{VC}$ and $S_{VD}$ represent focus detection pixels. FIG. 7B is a sectional view taken along the line C-C in FIG. 7A. The pixel in FIG. 7B has the same structure as that in FIG. 6B except that the pixel in FIG. 6B has a structure for carrying out pupil splitting in the lateral direction, but the pixel in FIG. 7B has a structure for carrying out pupil splitting in the longitudinal direction. An aperture OPVC of the pixel $S_{VC}$ is offset downward and receives a light beam having passed through an upper side of the exit pupil EPVC of the photographic optical system TL. Similarly, an aperture OPVD of the pixel $S_{VD}$ is offset upward and receives a light beam having passed through a lower side of the exit pupil EPVD of the photographic optical system TL. Pixels $S_{VC}$ are arrayed regularly in the vertical direction, and an object image obtained by these pixels is defined as image C. Pixels $S_{VD}$ are also arrayed regularly in the vertical direction, and an object image obtained by these pixels is defined as image D. By detecting the relative positions of the images C and D, the defocus amount of the object image having a luminance distribution in the vertical direction can be detected.

Figure 8:
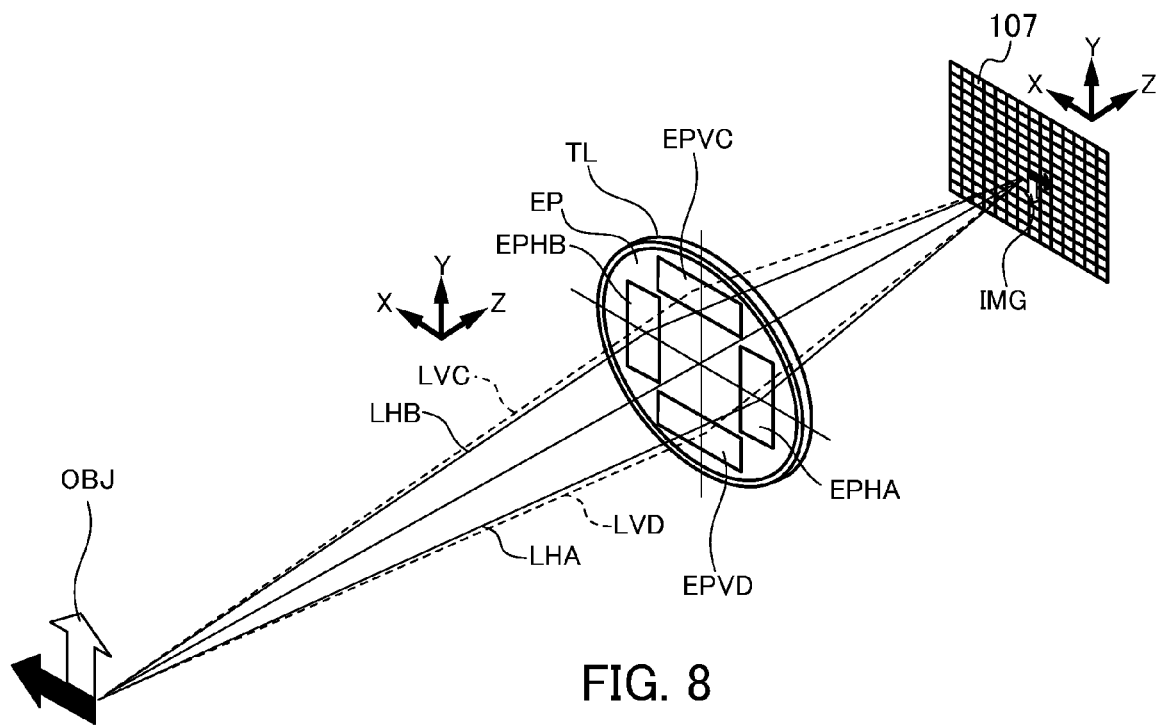
FIG. 8 is a view for explaining the concept of the pupil splitting function of the image sensor in the first embodiment.

FIG. 8 is a view for explaining the concept of the pupil splitting function of the image sensor in the first embodiment. In FIG. 8, reference symbol TL denotes a photographic optical system; 107, an image sensor; OBJ, an object; and IMG, an object image. As described with reference to FIGS. 5A and 5B, an image sensing pixel receives a light beam having passed through the entire exit pupil EP of the photographic optical system TL. A focus detection pixel has the pupil splitting function, as described with reference to FIGS. 6A to 7B. More specifically, the pixel $S_{HA}$ in FIG. 6A receives a light beam LHA having passed through the left side of the pupil (when viewing the rear surface of the lens from the imaging surface), i.e., a light beam having passed through a pupil EPHA in FIG. 8. Similarly, the pixels $S_{HB}$, $S_{VC}$, and $S_{VD}$ receive beams LHB, LVC, and LVD having passed through pupils EPHB, EPVC, and EPVD. Focus detection pixels are distributed over the entire area of the image sensor 107, and can detect the focus over the entire imaging area.

Figure 9:
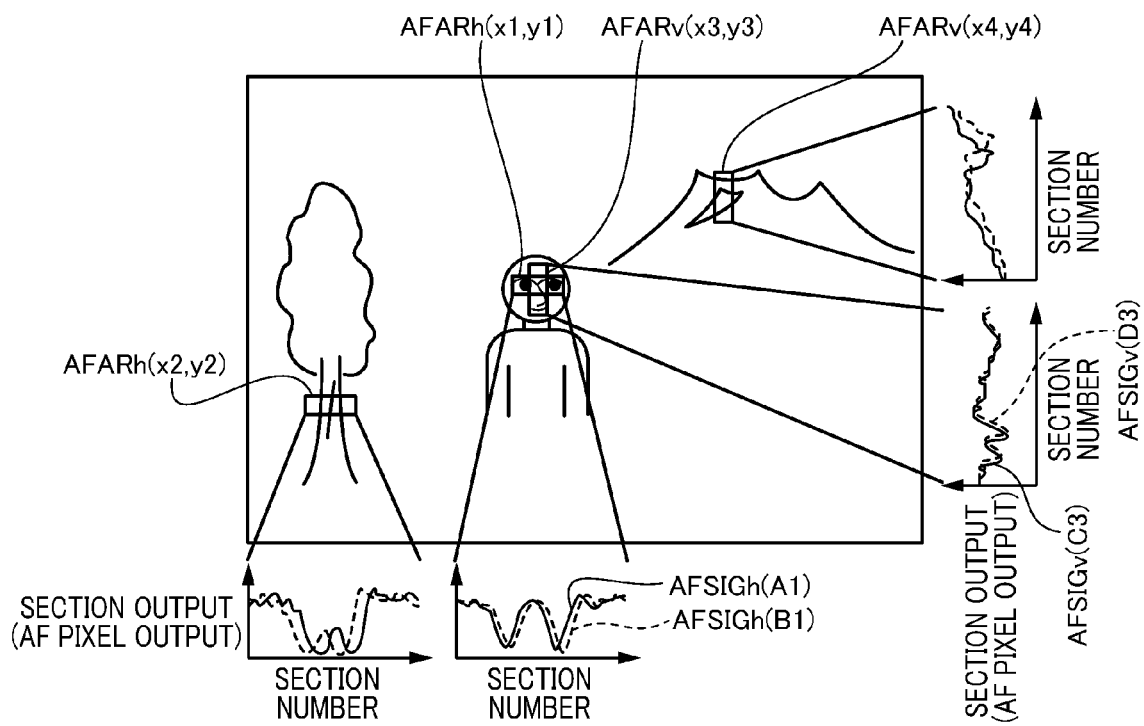
FIG. 9 is a view for explaining an image obtained based on focus detection and a focus detection area.

FIG. 9 is a view for explaining an image obtained in focus detection and a focus detection area. In FIG. 9, an object image formed on the imaging surface includes a person at the center, a tree in the foreground on the left side, and mountains in the background on the right side. In the embodiment, pairs of pixels $S_{HA}$ and $S_{HB}$ for lateral defocus detection and pairs of pixels $S_{VC}$ and $S_{VD}$ for longitudinal defocus detection are arranged as focus detection pixels at equal densities in the entire imaging area. A method for arranging pairs of pixels $S_{HA}$ and $S_{HB}$ for lateral defocus detection and pairs of pixels $S_{VC}$ and $S_{VD}$ for longitudinal defocus detection will be described later. In lateral defocus detection, a pair of obtained image signals from pairs of pixels $S_{HA}$ and $S_{HB}$ for lateral defocus detection are employed as AF pixel signals for calculating the phase difference. In longitudinal defocus detection, a pair of obtained image signals from pairs of pixels $S_{VC}$ and $S_{VD}$ for longitudinal defocus detection are employed as AF pixel signals for calculating the phase difference. Distance measurement areas for lateral defocus detection and longitudinal defocus detection can be set at arbitrary positions in the imaging area. In FIG. 9, a person's face is present at or near the center of the frame. When the presence of the face is detected by a known face recognition technique, a focus detection area $AFAR_h$ (x1, y1) for lateral (or horizontal) defocus detection and a focus detection area $AFAR_v$ (x3, y3) for longitudinal (or vertical) defocus detection are set using the face area as a center. Here, the suffix "h" represents the horizontal direction, and (x1, y1) and (x3, y3) indicate the coordinates (i.e. the positions as measured in pixels in the x and y directions) of the upper left corners of the focus detection areas. Signals from focus detection pixels $S_{HA}$ for lateral defocus detection included in each section of the focus detection area $AFAR_h$ (x1, y1) are added, and a phase difference detection image A signal obtained by linking the signals of 30 sections together is defined as $AFSIG_h$ (A1). Similarly, signals from focus detection pixels $S_{HB}$ for longitudinal defocus detection included in each section are added, and a phase difference detection image B signal obtained by coupling the added signals of 30 sections is defined as $AFSIG_h$ (B1). The relative lateral defocus amounts of the image A signal $AFSIG_h$ (A1) and image B signal $AFSIG_h$ (B1) are calculated by a correlation calculation of the present invention which is described thereafter, obtaining the defocus amount of the object. The defocus amount of the focus detection area $AFAR_V$ (x3, y3) is also obtained in the same way. The two defocus amounts detected in the focus detection areas for lateral defocus and longitudinal defocus are compared, and the value having a high reliability is adopted. The trunk of the tree on the left side of the frame mainly has a vertical line component, namely, a luminance distribution in the lateral direction, so it is determined that the trunk is an object suitable for lateral defocus detection. A focus detection area $AFAR_h$ (x2, y2) for lateral defocus detection is set. The ridgeline of the mountains on the right side of the frame mainly has a horizontal line component, namely, a luminance distribution in the longitudinal direction, so it is determined that the ridgeline is an object suitable for longitudinal defocus detection. A focus detection area $AFAR_V$ (x4, y4) for longitudinal defocus detection is set. As described above, according to the embodiment, focus detection areas for lateral defocus detection and longitudinal defocus detection can be set at arbitrary positions in the frame. Even if the projection position of an object and the direction of the luminance distribution vary, the focus can be detected accurately.

Figure 10:
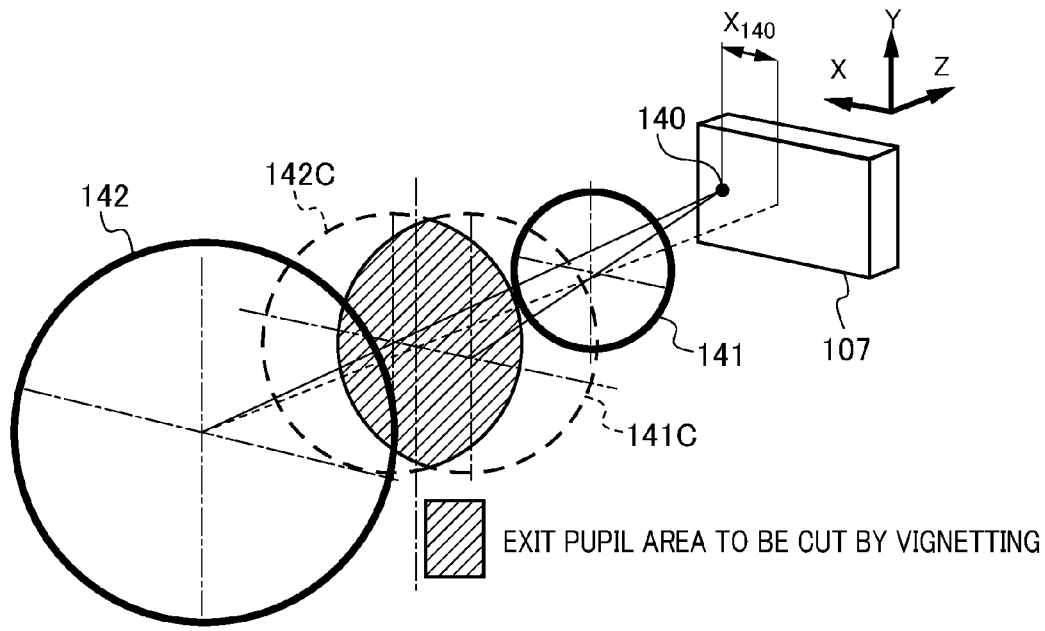
FIG. 10 is a perspective view of the region of an image sensor and a photographic optical system seen from the quadrant surrounded by three axes −X, +Y, and −Z.
Figure 11:
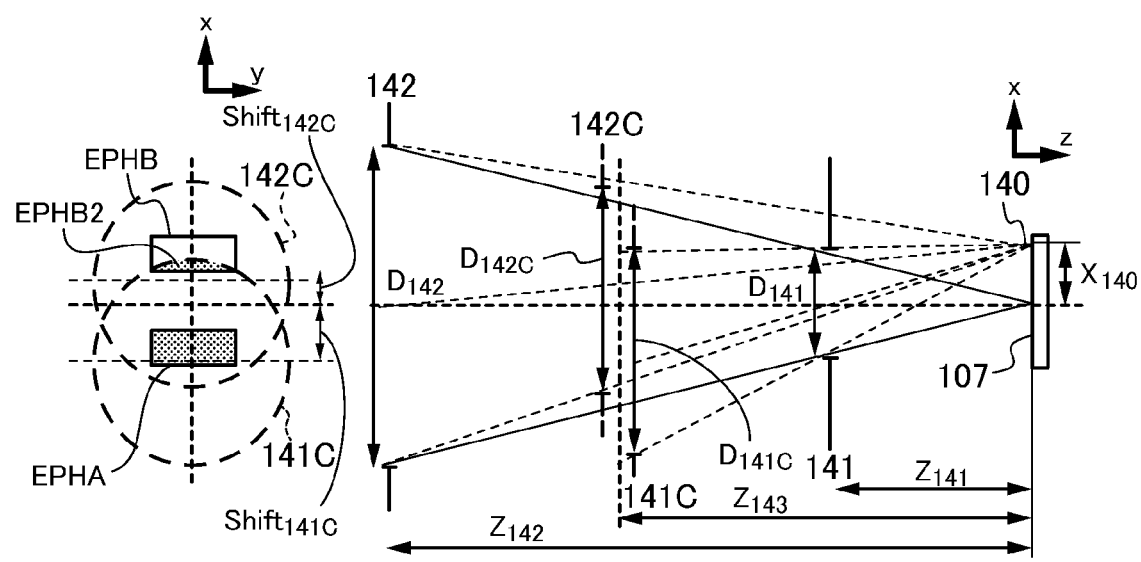
FIG. 11 is a view showing the relationship of the image sensor to the exit window and the pupil.

With reference to FIG. 10 and FIG. 11, the limiting of the exit pupil by vignetting in the photographic optical system TL will be explained. FIG. 10 is a perspective view of the region of an image sensor and a photographic optical system seen from the quadrant surrounded by three axes –X, +Y, and –Z. FIG. 10 illustrates the image sensor 107, the exit windows 141 and 142 of the photographic optical system TL, and the exit windows 141C and 142C through which the exit windows 141 and 142 are projected on the exit pupil of the photographic optical system TL. Also, a point 140 of the image height $X_{140}$ is shown in the +X direction on the light receiving face of the image sensor 107. The light reaching to the optical axis of the light receiving face of the image sensor 107 has passed through the entire area of the exit pupil EP shown in FIG. 8, since it is not vignetted by the exit window of the photographic optical system TL. On the other hand, when the photographic optical system TL is viewed from the point 140, the exit window 141 looks like as if there is an exit window 141C shifted in the –X direction on the exit pupil, and the exit window 142 looks like as if there is an exit window 142C shifted in the +X direction on the exit pupil. Hence, the light reaching to the point 140 has passed through the region (shaded parts in FIG. 10) in which the entire area of the exit pupil EP shown in FIG. 8 is cut down by the exit window 141C and the exit window 142C.

Next, with reference to FIG. 11, it is explained how the exit windows 141C and 142C projected on the exit pupil are changed in accordance with the image height $X_{140}$. FIG. 11 is a view showing the relationship of the image sensor to the exit window and the pupil. FIG. 11 illustrates a view along the +Y direction in the right-hand portion of the Figure, and a view along the –Z direction in the left-hand portion of the Figure. The left-hand portion of the figure shows the cross-section of the optical system at the exit window 142C. $Z_{141}$ represents the distance from the image sensor 107 to the exit window 141; $Z_{142}$ represents the distance from the image sensor 107 to the exit window 142; and $Z_{143}$ represents the distance from the image sensor 107 to the exit pupil. Also, $D_{141}$ is the aperture diameter of the exit window 141; $D_{142}$ is the aperture diameter of the exit window 142; EPHA is the pupil of the pixel $S_{HA}$; EPHB is the pupil of the pixel $S_{HB}$; and EPHB2 is the pupil formed as a result of the pupil EPHB limited by vignetting in the photographic optical system TL. From the drawings in FIG. 11, the amount of shift $Shift_{141C}$ and the aperture diameter $D_{141C}$ from the optical axis of the exit window 141C projected onto the exit pupil, and the amount of shift $Shift_{142C}$ and the aperture diameter $D_{142C}$ from the optical axis of the exit window 142C projected onto the exit pupil can be represented by the following Formulae (1) to (4), respectively.

$$Shift_{141C} = X_{140} \cdot \frac{Z_{143} - Z_{141}}{Z_{141}} \qquad \text{Formula (1)}$$

$$D_{141C} = D_{141} \cdot \frac{Z_{143}}{Z_{141}} \qquad \text{Formula (2)}$$

$$Shift_{142C} = X_{140} \cdot \frac{Z_{142} - Z_{143}}{Z_{142}} \qquad \text{Formula (3)}$$

$$D_{142C} = D_{142} \cdot \frac{Z_{143}}{Z_{142}} \qquad \text{Formula (4)}$$

As shown in Formulae (1) to (4), the exit windows 141C and 142C projected onto the exit pupil are changed in accordance with the image height $X_{140}$. The exit pupil EPHA of the pixel $S_{HA}$ and the exit pupil EPHB of the pixel $S_{HB}$ are limited by the aperture of the diameter $D_{141C}$ shifted by $Shift_{141C}$ from the optical axis and the aperture of the diameter $D_{142C}$ shifted by $Shift_{142C}$ from the optical axis. Consequently, the vignetting occurs only at the exit pupil EPHB, whereby only a light beam having passed through the pupil EPHB2 reaches the pixel $S_{HB}$ of the point 140. This results in a light intensity difference between the pixel $S_{HA}$ and the pixel $S_{HB}$, which causes a gain difference between the image A obtained from the pixel $S_{HA}$ group and the image B obtained from the pixel $S_{HB}$ group.

Figure 12A:
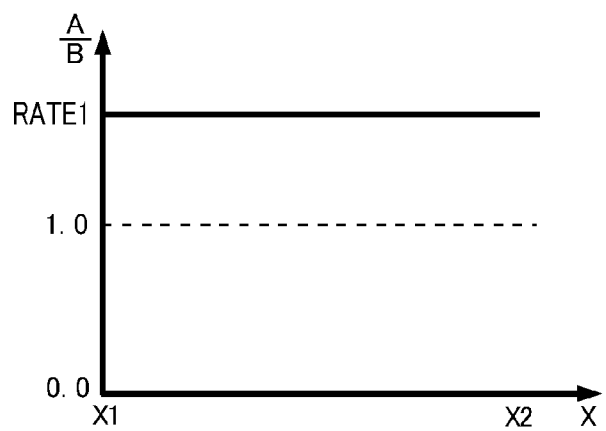
FIG. 12A is a graph showing an example of how the gain difference between the image A and the image B changes in accordance with the image height.
Figure 12B:
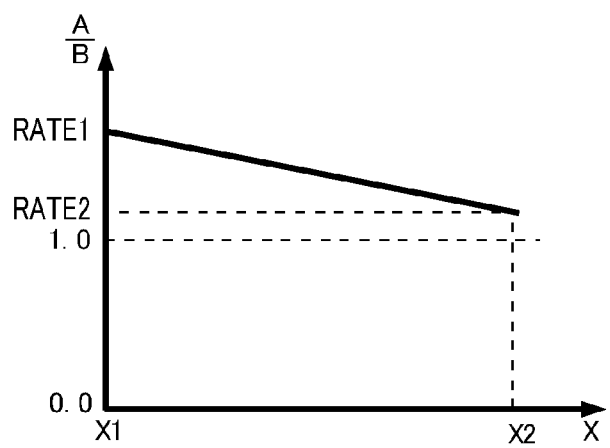
FIG. 12B is a graph showing another example of how the gain difference between the image A and the image B changes in accordance with the image height.
Figure 12C:
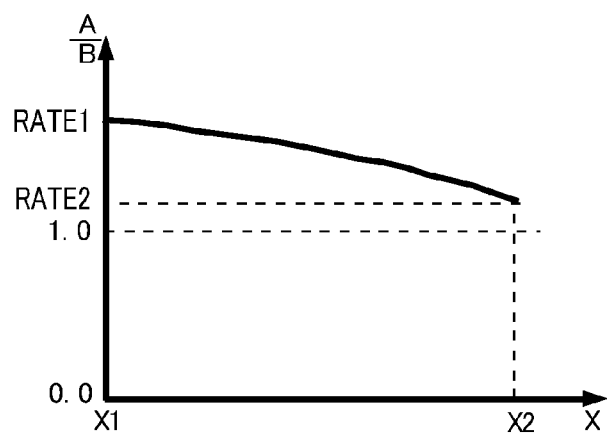
FIG. 12C is a graph showing still another example of how the gain difference between the image A and the image B changes in accordance with the image height.

Each of the FIGS. 12A to 12C is a graph showing an example of how the gain difference between the image A and the image B changes in accordance with the image height. The horizontal axis in FIGS. 12A to 12C represents the image height in the X direction, and the vertical axis represents the ratio of the image A pixel output to the image B pixel output in each image. More specifically, the horizontal axis in FIGS. 12A to 12C represents how the ratio of the images A to B is changed between the image height X1 and the image height X2 in the X direction. As shown in Formulae (1) and (3), since the image height $X_{140}$ of the point 140 is present in Formulae representing the amount of shift $Shift_{141C}$ of the exit window 141C and the amount of shift $Shift_{142C}$ of the exit window 142C projected on the exit pupil respectively, the gain difference between the images A and B is changed in accordance with the image height. In the case where the exit window 141 and the exit window 142 are present in the proximity of the exit pupil of the photographic optical system TL, $Z_{141}$, $Z_{142}$, and $Z_{143}$ are approximately equal and the numerator in Formulae (1) and (3) becomes zero, so that the gain difference between the images A and B is substantially constant even if the image height $X_{140}$ is changed. Hence, as shown in FIG. 12A, the ratio of the images A to B is a predetermined value RATE1. The ratio of the images A to B is not equal to 1 because it is assumed that the center of the exit window 141 or 142 is displaced from the optical axis due to manufacturing errors, resulting in unequal vignetting of the exit pupil EPHA and the exit pupil EPHB. In the case where the exit window 141 and the exit window 142 are present at a position distal of the exit window of the photographic optical system TL, using Formulae (1) and (3), the gain difference between the images A and B will change in accordance with the image height $X_{140}$. Depending on the optical characteristics of the photographic optical system TL, some are linearly changed from RATE1 to RATE2 as shown in FIG. 12B and others are quadratically changed from RATE1 to RATE2 as shown in FIG. 12C. As described above, with reference to FIG. 10 to FIG. 12C, the gain difference which changes in accordance with the image height occurs between the image A and the image B due to the influence of vignetting in the photographic optical system TL or the like.

FIG. 13A to FIG. 14C will be used to explain that deviations of the phase difference detection occur when the phase difference detection is carried out for the images A and B where a gain difference has occurred as shown in FIG. 12A on the basis of an amount of conventionally defined correlation. Firstly, with reference to FIGS. 13A to 13C, a description will be given for the case where a phase difference detection is performed with respect to the images A and B, in which the gain difference has occurred as shown in FIG. 12A, on the basis of the amount of correlation disclosed in Japanese Patent Laid-Open No. 62-39722. Here, an object pattern is a gradation pattern with black on the left, white on the right, and a gradual change from black to white at the boundary. A state is assumed in which there is no phase difference between the focused images A and B.

Figure 13A:
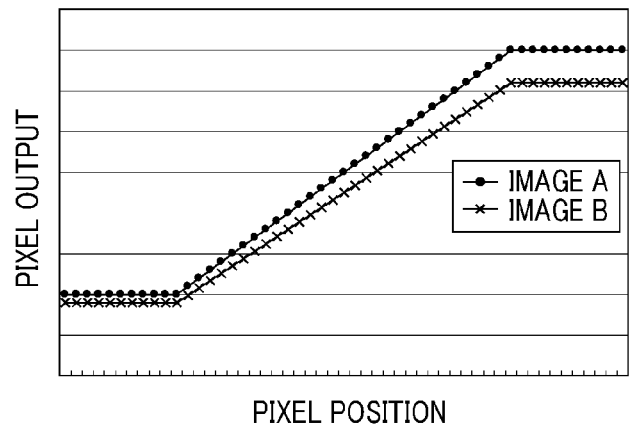
FIG. 13A is a graph showing the images A and B obtained by receiving light from an object having the above-described pattern on the pixel $S_{HA}$ and pixel $S_{HB}$ where a gain difference has occurred as shown in FIG. 12A.
Figure 13B:
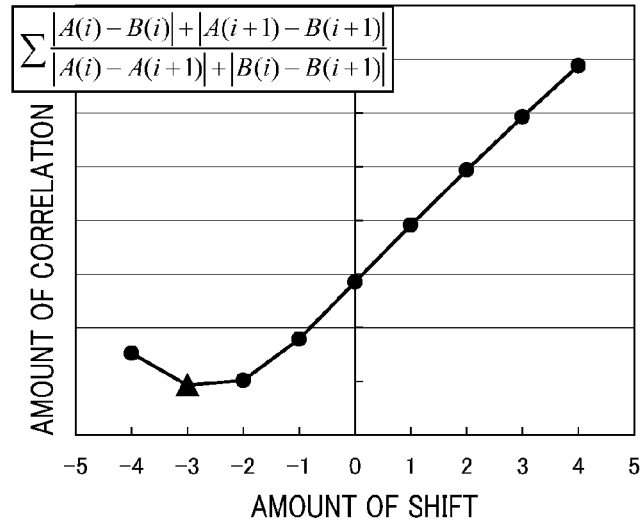
FIG. 13B is a graph showing the result of an amount of correlation disclosed in Japanese Patent Laid-Open No. 62-39722 calculated while the relative position relationship between the images A and B is shifted one bit at a time as shown in FIG. 13A.

FIG. 13A is a graph showing the images A and B obtained by receiving light from an object having the above-described pattern on the pixel $S_{HA}$ and pixel $S_{HB}$ where a gain difference has occurred as shown in FIG. 12A. FIG. 13A shows the waveforms of the focus-matched images A and B, in which the gain of the image A is improved by RATE1 compared to that of the image B. FIG. 13B is a graph showing the result of an amount of correlation disclosed in Japanese Patent Laid-Open No. 62-39722 calculated while the relative position relationship between the images A and B is shifted one bit at a time as shown in FIG. 13A. Circles represent a plot of an amount of correlation versus an amount of each shift. A triangle represents a plot of an amount of correlation versus an amount of shift where the amount of correlation is minimized. An amount of correlation used herein is defined by the following Formula (5).

$$\sum \frac{|A(i)-B(i)|+|A(i+1)-B(i+1)|}{|A(i)-A(i+1)|+|B(i)-B(i+1)|} \quad \text{Formula (5)}$$

Figure 13C:
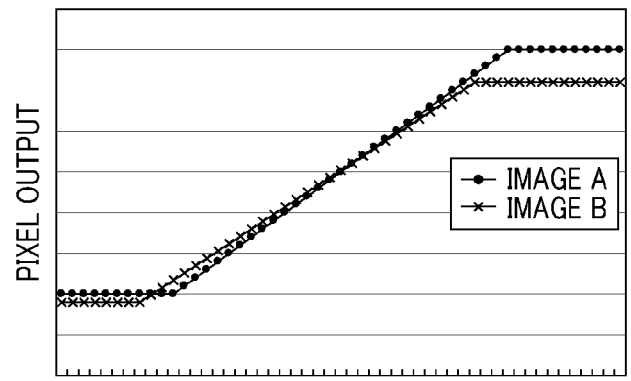
FIG. 13C is a graph showing the images A and B after being shifted by −3 bits.

In the formula, A(i) represents the signal of the ith pixel $S_{HA}$, and B(i) represents the signal of the ith pixel $S_{HB}$. Although an amount of correlation should be minimized when the amount of shift is 0; as shown in FIG. 13B, an amount of correlation is minimized when the amount of shift is −3. That is, the phase difference detection is incorrect by −3 bits. FIG. 13C is a graph showing the images A and B after being shifted by −3 bits. An amount of correlation defined by Formula (5) and as disclosed in Japanese Patent Laid-Open No. 62-39722 determines that the degree of coincidence between the images A and B becomes highest in a position shifted by −3 bits. Consequently, the phase difference detection result is offset by −3 bits.

Figure 14A:
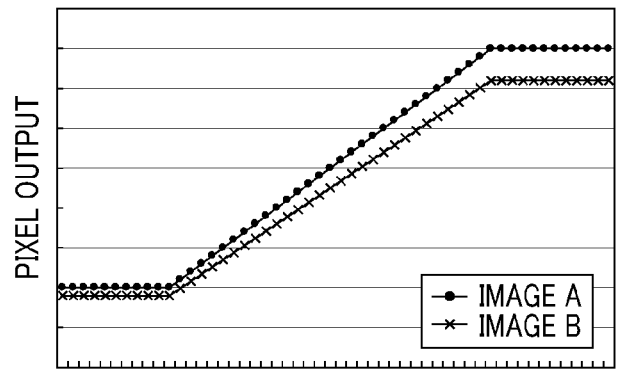
FIG. 14A is a graph showing the images A and B obtained by receiving light from an object having the above-described pattern on the pixel $S_{HA}$ and pixel $S_{HB}$ where a gain difference has occurred as shown in FIG. 12A.
Figure 14B:
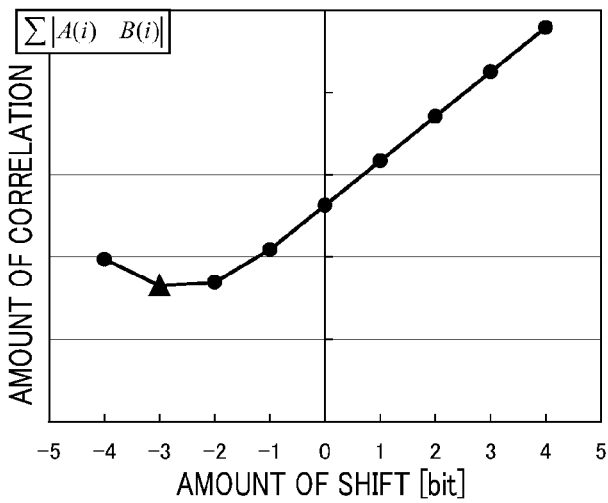
FIG. 14B is a graph showing the result of an amount of correlation disclosed in Japanese Patent Laid-Open No. 63-264715 calculated while the relative position relationship between the images A and B is shifted one bit at a time as shown in FIG. 13A.
Figure 14C:
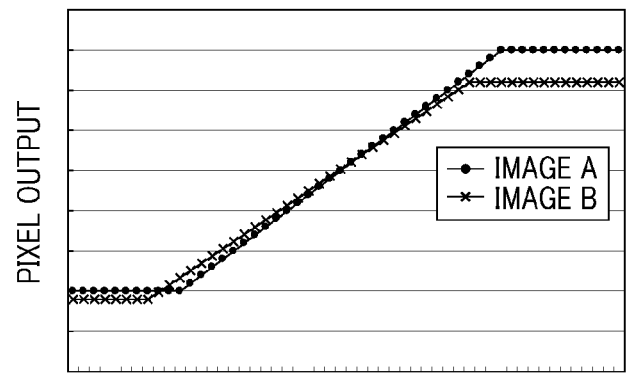
FIG. 14C is a graph showing the images A and B after being shifted by −3 bits.

Next, with reference to FIGS. 14A to 14C, a description will be given for the case where a phase difference is detected relative to the images A and B in which the gain difference has occurred as shown in FIG. 12A on the basis of the amount of correlation disclosed in Japanese Patent Laid-Open No. 63-264715. As in the case of FIGS. 13A to 13C, an object pattern is a gradation pattern with black on the left, white on the right, and a gradual change from black to white at the boundary, and a state is assumed in which there is no phase difference between the focused images A and B. FIG. 14A is a graph showing the images A and B obtained by receiving light from an object having the above-described pattern on the pixel $S_{HA}$ and pixel $S_{HB}$ where a gain difference has occurred as shown in FIG. 12A. As in FIG. 13A, FIG. 14A shows the waveforms of the focus-matched images A and B, in which the gain of the image A is improved by RATE1 compared to that of the image B. FIG. 14B is a graph showing the result of an amount of correlation disclosed in Japanese Patent Laid-Open No. 63-264715 calculated while shifting the relative position relationship between the images A and B as shown in FIG. 14A one bit at a time. Circles represent a plot of an amount of correlation versus an amount of each shift. A triangle represents a plot of an amount of correlation versus an amount of shift where the amount of correlation is minimized. An amount of correlation used herein is defined by the following Formula (6).

$$\sum |A(i)-B(i)| \quad \text{Formula (6)}$$

In the formula, A(i) represents the signal of the ith pixel $S_{HA}$, and B(i) represents the signal of the ith pixel $S_{HB}$. An amount of correlation should be minimized when the amount of shift is 0; however, as shown in FIG. 14B, an amount of correlation is minimized when the amount of shift is −3. That is, the phase difference detection is incorrect by −3 bits. FIG. 14C is a graph showing the images A and B after being shifted by −3 bits. An amount of correlation defined by Formula (6) and as disclosed in Japanese Patent Laid-Open No. 63-264715 determines that the degree of coincidence between the images A and B becomes highest at a position shifted by −3 bits. Consequently, the phase difference detection result is offset by −3 bit. The present invention thus proposes an amount of correlation that is less likely to cause an error in the phase difference detection result for the images A and B in which the gain difference has occurred as shown in FIGS. 13A and 14A.

Figure 15A:
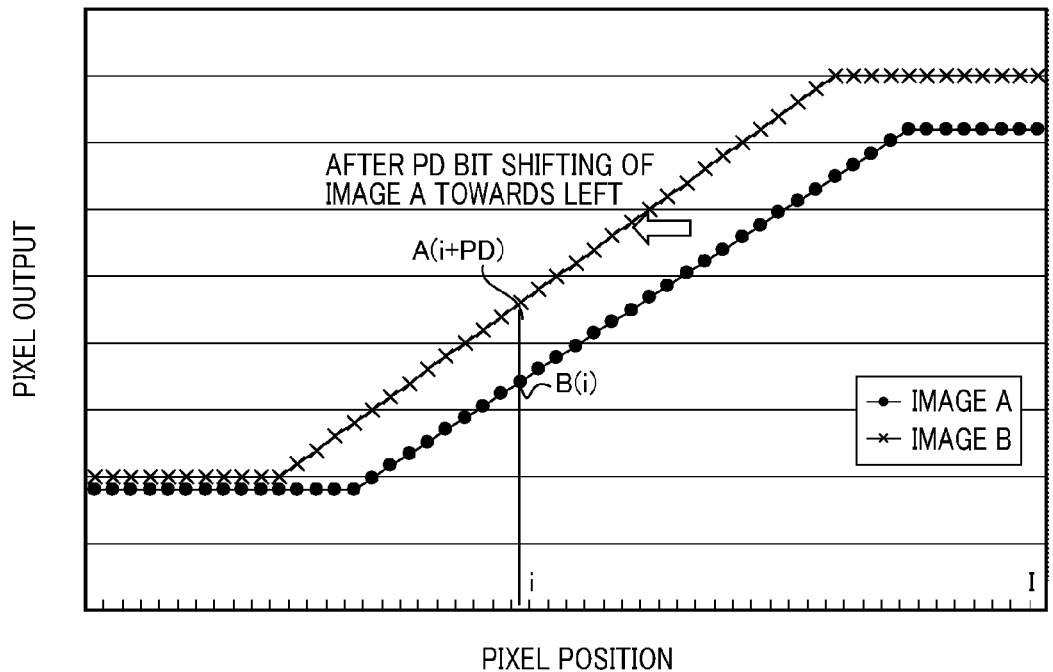
FIG. 15A is a graph showing the images A and B obtained by receiving light from an object having a gradation pattern such that the gradation gradually changes from black (left-side) to white (right-side) at the pixel $S_{HA}$ and pixel $S_{HB}$ where a gain difference has occurred as shown in FIG. 12A.
Figure 15B:
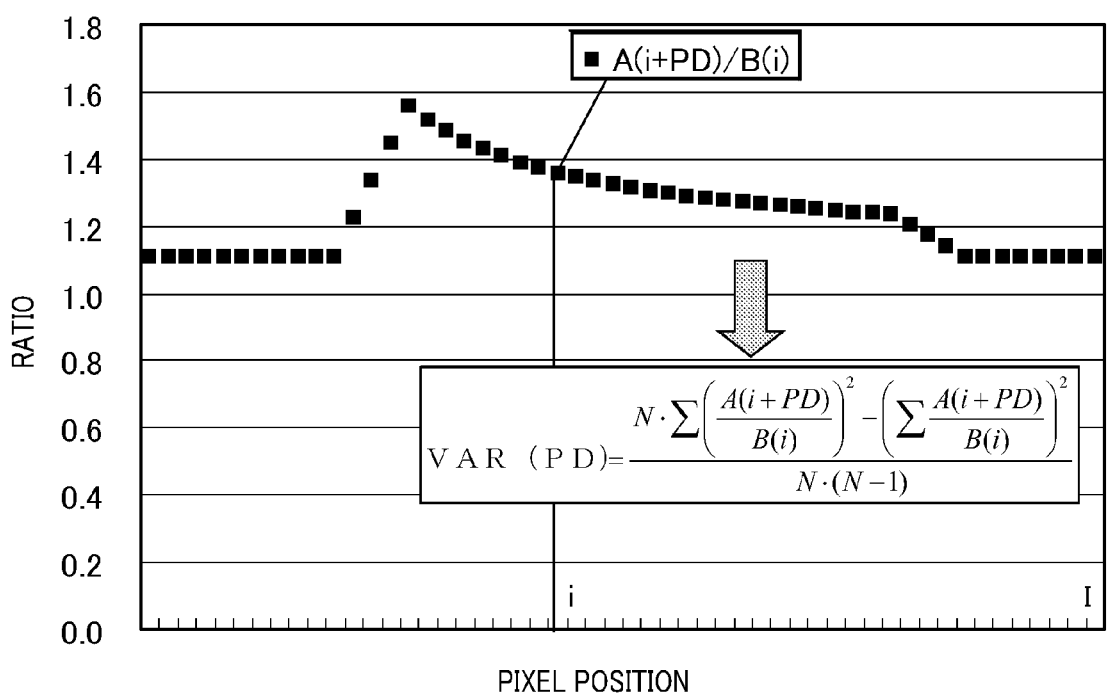
FIG. 15B is a graph in which A(i+PD)/B(i) is plotted.

With reference to FIGS. 15A and 15B, the definition of an amount of correlation proposed in the present invention will be described. FIG. 15A is a graph showing the images A and B obtained by receiving light from an object having a gradation pattern such that the gradation gradually changes from black (on the left side) to white (on the right side) at the pixel $S_{HA}$ and pixel $S_{HB}$ where a gain difference has occurred as shown in FIG. 12A. In the phase difference detection computation, an amount of correlation is calculated while the phase difference between the images A and B is shifted one bit at a time. Hence, FIG. 15A shows the state that the image A is shifted toward the left by PD bits (i.e. a number of bits equal to PD, the phase difference). The focus detection area is composed of I pixels wherein the signal of the ith pixel $S_{HB}$ is B(i) and the signal of the (i+PD)th pixel $S_{HA}$ which is in line with B(i) with the image A being shifted toward the left by PD bits is A(i+PD). For the images A and B with the image A being shifted toward the left by PD bits, the result of comparing the signal of the pixel $S_{HA}$ with the signal of the pixel $S_{HB}$ at each pixel position is calculated by the comparison unit 151 (see FIG. 1B). The comparison result used herein refers to the output ratio A(i+PD)/B(i) between the signal of the pixel $S_{HA}$ and the signal of the pixel $S_{HB}$. FIG. 15B is a graph in which A(i+PD)/B(i) is plotted. In FIG. 15B, the pixel number is plotted on the horizontal axis, and the output ratio A(i+PD)/B(i) is plotted on the vertical axis. The size of the fluctuation is calculated from a distribution of the output ratio A(i+PD)/

B(i). Here, the variance is used as the index indicating the size of the fluctuation. In this particular embodiment, the variance VAR(PD) of the output ratio between the images A and B with the image A being shifted toward the left by PD bits, at each pixel position, is an unbiased variance represented by the following Formula (7).

$$VAR(PD) = \frac{N \cdot \sum \left(\frac{A(i+PD)}{B(i)}\right)^2 - \left(\sum \frac{A(i+PD)}{B(i)}\right)^2}{N \cdot (N-1)} \quad \text{Formula (7)}$$

$$N = I - 2 \cdot PD \quad \text{Formula (8)}$$

In the formulae, N represents the number of opposed pixels in the images A and B after the image A is shifted toward the left by the phase difference PD bits. When the image A is shifted toward the left by the phase difference PD bits, there are no opposed pixels at the left-most PD bits of the image A and the right-most PD bits of the image B, whereby the number of opposed pixels N is the total number of pixels I minus 2 times PD bits. This N is the number of pixels for calculating the comparison result. In the phase difference detection method of the present invention, the variance VAR (PD) is treated as an amount of correlation for each amount of shift. An amount of shift where the variance attains the extreme value is considered to be the state in which the phase between the images A and B is matched, whereby the phase difference is detected. As used herein, "the variance attains the extreme value" means attaining the minimum value. By adapting the variance of the output ratio at each pixel position as an amount of correlation, the correlativity between the images A and B can be correctly expressed without being affected by the gain difference even in the case of the gain difference between the pixel $S_{HA}$ and the pixel $S_{HB}$. Consequently, the phase difference detection error caused by the gain difference can be reduced. While the variance is used as the index indicating the fluctuation of the output ratio A(i+ PD)/B(i) in the present invention, the standard deviation obtained by taking the square root of the variance may also be used. It goes without saying that a similar effect can be obtained with a predetermined multiple of the variance or the standard deviation. Further, the variance (sample variance), which is the sum of the squares of the deviations from the mean split by the number of data, represented by the following Formula may also be used.

$$VAR(PD) = \frac{\sum \left(\frac{A(i+PD)}{B(i)} - \frac{1}{N} \cdot \sum \frac{A(i+PD)}{B(i)}\right)^2}{N} \quad \text{Formula (9)}$$

The same effects can be obtained with a predetermined multiple of the value represented by Formula (9). However, in the exemplary case of the detection of the phase difference between a narrow view and a broad view, the use of Formula (9) may be more advantageous than the use of Formula (7). In this particular embodiment, the output ratio A(i+PD)/B(i) between the signal of the pixel $S_{HA}$ and the signal of the pixel $S_{HB}$ is used as the comparison result for each pixel of the phase-matched images A and B. An absolute value |A(i+ PD)−B(i)| of the output difference may also be used. When a flare component is contained in either one of the images, it is preferable that the absolute value of the output difference be used as the comparison result for each pixel. It is also possible to calculate the phase difference detection results obtained both from the output ratio and the absolute value of the output difference so as to select a reliable detection result by determining the detection result, the degree of coincidence, or the contrast of the images. A series of phase difference detection computations described with reference to FIGS. 15A and 15B is the processing performed in the CPU 121. More specifically, the comparison unit 151 for calculating the comparison result for each pixel; the fluctuation calculation unit 152 for calculating the fluctuation of the output ratio; and the phase difference calculation unit 153 for calculating the phase difference where the fluctuation is the extreme value are realized as a function of the CPU 121. The focus detection device constitutes the CPU 121 for performing a series of phase difference detection computations; the image sensor 107 for acquiring a pair of pupil-split image signals; and the image sensor driving circuit 124 for driving the image sensor 107.

Figure 16A:
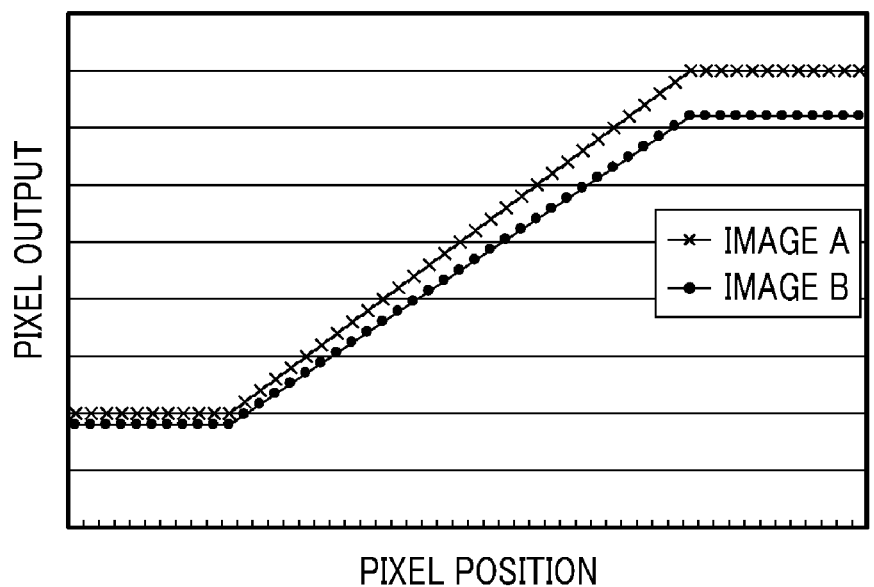
FIG. 16A is a graph showing the images A and B obtained by receiving light from an object having the above-described pattern on the pixel $S_{HA}$ and pixel $S_{HB}$ where a gain difference has occurred as shown in FIG. 12A.
Figure 16B:
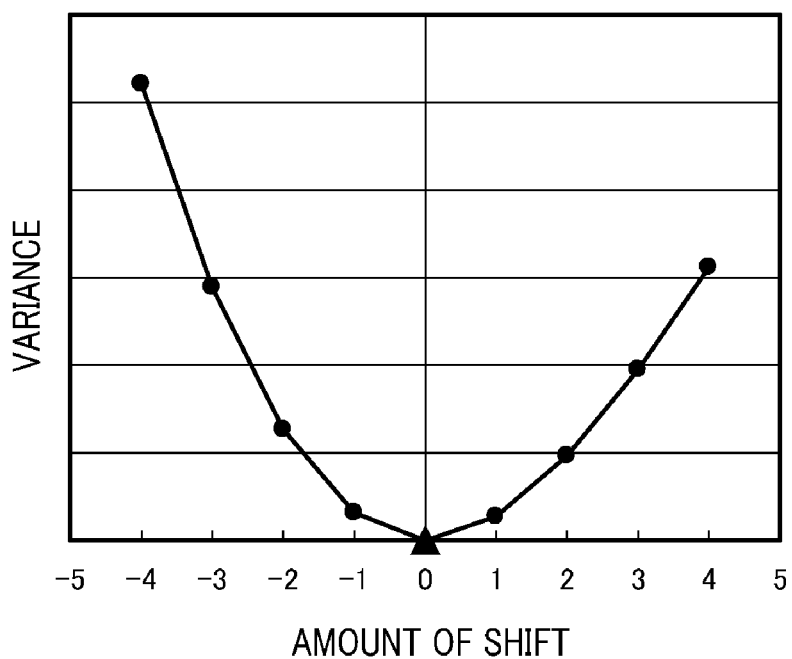
FIG. 16B is a graph showing the calculation result of an amount of correlation shown in Formula (7) while the relative position relationship between the images A and B is shifted one bit at a time as shown in FIG. 16A.

With reference to FIGS. 16A and 16B, a specific example will be given for a case where there is no phase difference detection error for the images A and B in which the gain difference has occurred as shown in FIG. 12A if an amount of correlation is the variance VAR(PD) as shown in Formula (7). An object pattern is a gradation pattern with black on the left, white on the right, and a gradual change from black to white at the boundary, and a state is assumed in which there is no phase difference between the focused images A and B. FIG. 16A is a graph showing the images A and B obtained by receiving light from an object having the above-described pattern on the pixel $S_{HA}$ and pixel $S_{HB}$ where a gain difference has occurred as shown in FIG. 12A. FIG. 16A shows the waveforms of the focus-matched images A and B, in which the gain of the image A is improved by RATE1 compared to that of the image B. FIG. 16B is a graph showing the result of an amount of correlation calculated as shown in Formula (7) while the relative position relationship between the images A and B is shifted one bit at a time as shown in FIG. 16A. Circles represent a plot of an amount of correlation versus an amount of each shift. A triangle represents a plot of an amount of correlation versus an amount of shift where the amount of correlation is minimized. As can be seen from FIG. 16B, an amount of correlation is minimized when the amount of shift is 0. That is, the correlativity between the images A and B is determined to be the highest when the amount of shift is 0, whereby it will be seen that the phase difference has been detected correctly.

Figure 17A:
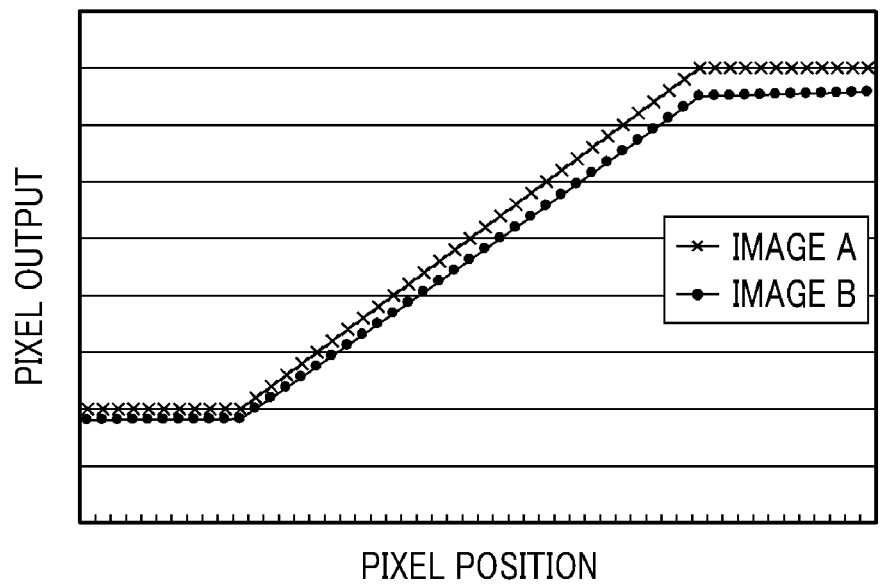
FIG. 17A is a graph showing the images A and B obtained by receiving light from an object having the above-described pattern on the pixel $S_{HA}$ and pixel $S_{HB}$ where a gain difference has occurred as shown in FIG. 12B.
Figure 17B:
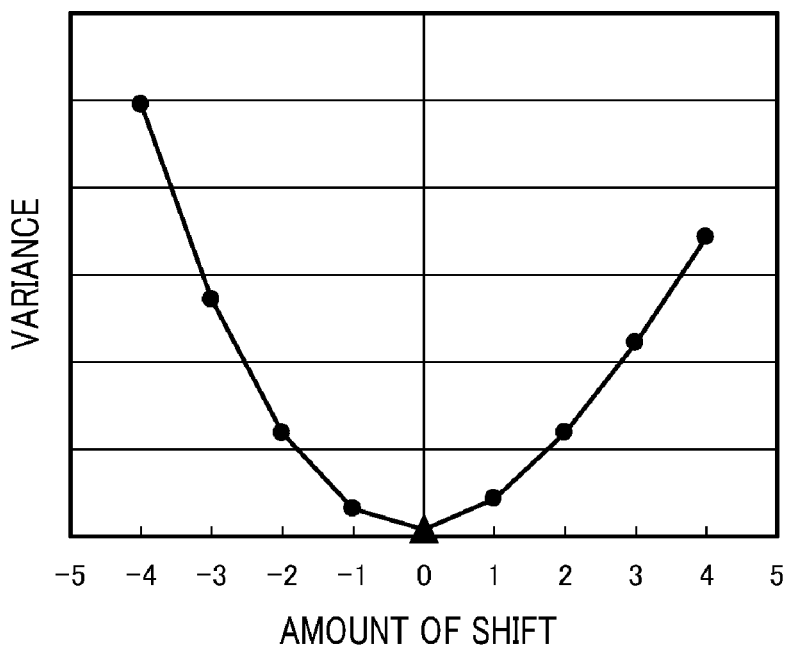
FIG. 17B is a graph showing the calculation result of an amount of correlation shown in Formula (7) while the relative position relationship between the images A and B is shifted one bit at a time as shown in FIG. 17A.
Figure 18A:
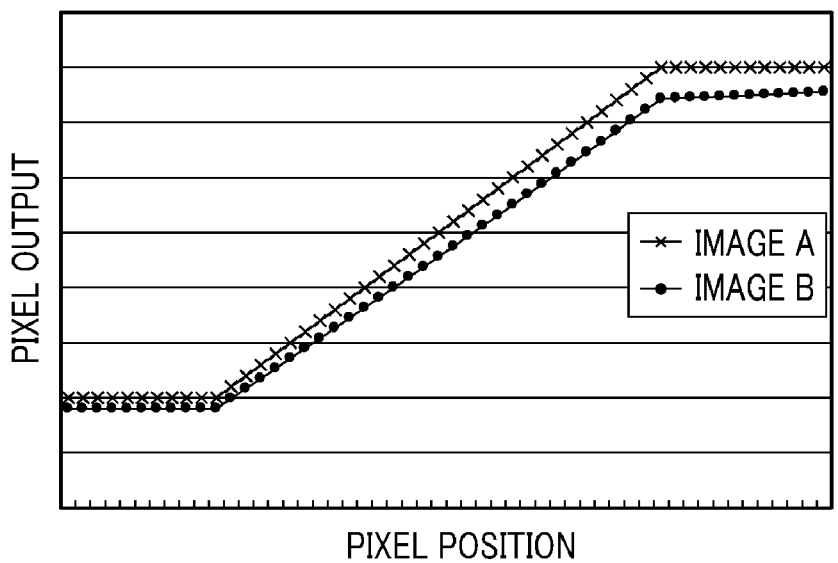
FIG. 18A is a graph showing the images A and B obtained by receiving light from an object having the above-described pattern on the pixel $S_{HA}$ and pixel $S_{HB}$ where a gain difference has occurred as shown in FIG. 12B.
Figure 18B:
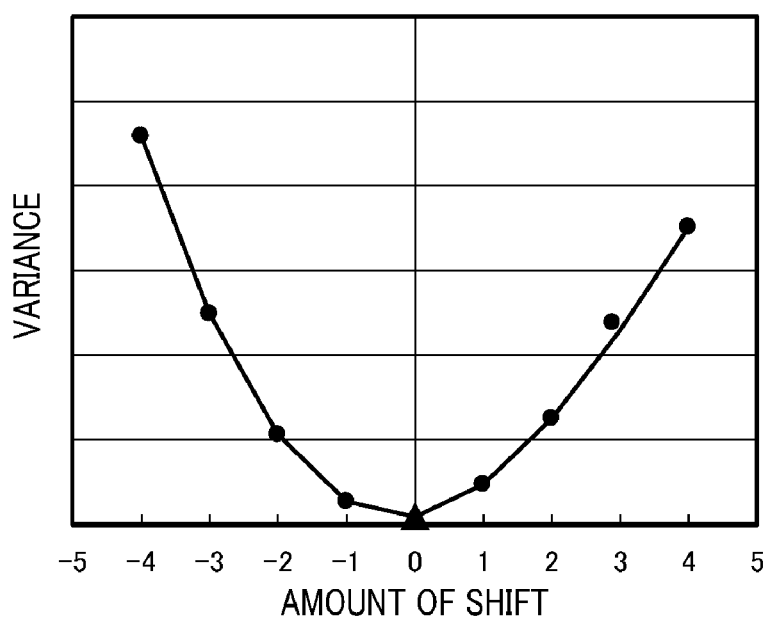
FIG. 18B is a graph showing the calculation result of an amount of correlation shown in Formula (7) while the relative position relationship between the images A and B is shifted one bit at a time as shown in FIG. 18A.

Next, with reference to FIGS. 17A and 17B, an explanation will be given for a case where there is no phase difference detection error for the images A and B in which the gain difference distribution has occurred as shown in FIG. 12B if an amount of correlation is the variance VAR(PD) as shown in Formula (7). As in the case of FIG. 16A, an object pattern is a gradation pattern with black on the left, white on the right, and a gradual change from black to white at the boundary, and a state is assumed in which there is no phase difference between the focused images A and B. FIG. 17A is a graph showing the images A and B obtained by receiving light from an object having the above-described pattern on the pixel $S_{HA}$ and pixel $S_{HB}$ where a gain difference has occurred as shown in FIG. 12B. FIG. 17A shows the waveforms of the focus-matched images A and B such that the gain of the image A is improved by RATE1 at the left end, by RATE2 at the right end, and changes linearly in between compared to those of the image B. FIG. 17B is a graph showing the result of an amount of correlation calculated as shown in Formula (7) while the relative position relationship between the images A and B is shifted one bit at a time as shown in FIG. 17A. Circles represent a plot of an amount of correlation versus an amount of each shift. A triangle represents a plot of an amount of correlation versus an amount of shift where the amount of correlation is minimized. As can be seen from FIG. 17B, an amount of correlation is minimized when the amount of shift is 0. That is, the correlativity between the images A and B is determined to be the highest when the amount of shift is 0, whereby it will be seen that the phase difference has been detected correctly for the images A and B in which the gain difference changes linearly. With reference to FIGS. 18A and 18B, an explanation will be given for a case where there is no phase difference detection error for the images A and B in which the gain difference distribution has occurred as shown in FIG. 12C if an amount of correlation is the variance VAR(PD) as shown in Formula (7). As in the case of FIGS. 16A and 17A, an object pattern is a gradation pattern with black on the left, white on the right, and a gradual change from black to white at the boundary, and a state is assumed in which there is no phase difference between the focused images A and B.

FIG. 18A is a graph showing the images A and B obtained by receiving light from an object having the above-described pattern on the pixel $S_{HA}$ and pixel $S_{HB}$ where a gain difference has occurred as shown in FIG. 12B. FIG. 18A shows the waveforms of the focus-matched images A and B such that the gain of the image A is improved by RATE1 at the left end, by RATE2 at the right end, and changes curvilinearly in between compared to those of the image B. FIG. 18B is a graph showing the result of an amount of correlation calculated as shown in Formula (7) while the relative position relationship between the images A and B is shifted one bit at a time as shown in FIG. 18A. Circles represent a plot of an amount of correlation versus an amount of each shift. A triangle represents a plot of an amount of correlation versus an amount of shift where the amount of correlation is minimized. As can be seen from FIG. 18B, an amount of correlation is minimized when the amount of shift is 0. That is, the correlativity between the images A and B is determined to be the highest when the amount of shift is 0, whereby it will be seen that the phase difference has been detected correctly for the images A and B in which the gain difference changes curvilinearly. An amount of shift where the variance of the AB output ratio at each pixel position is minimized may be calculated to a fraction of a bit.

Figure 19:
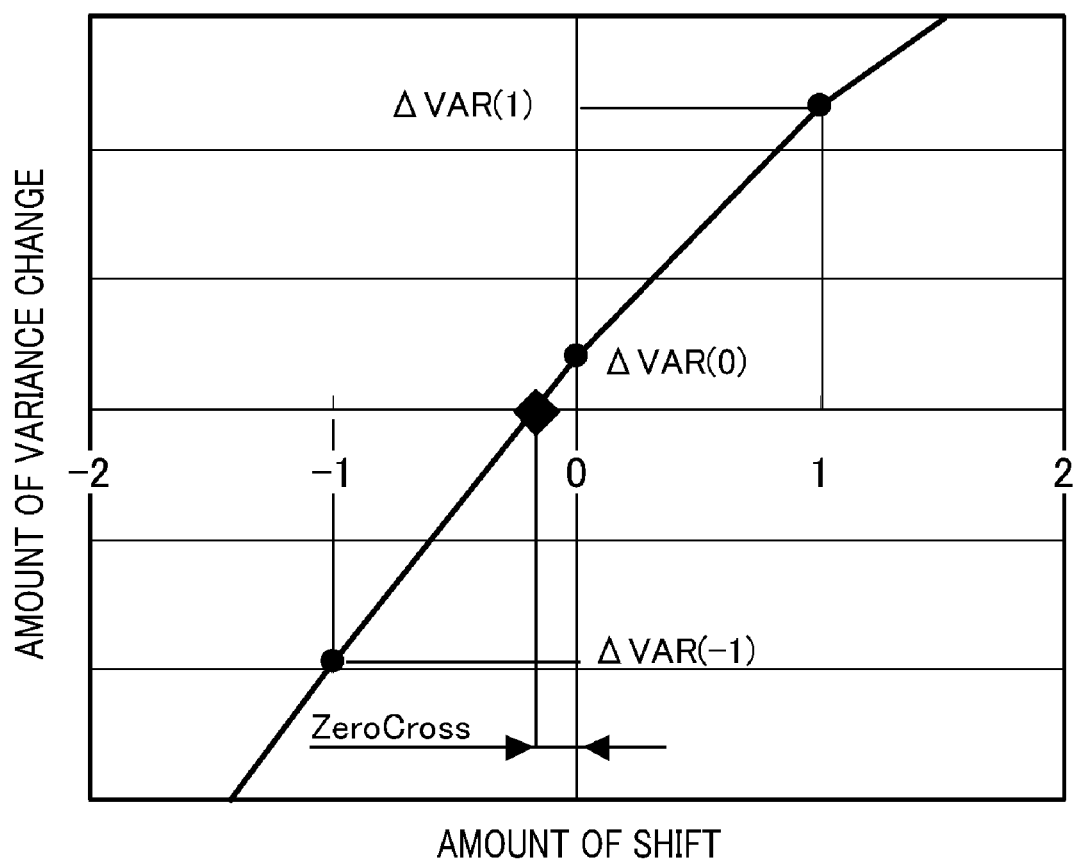
FIG. 19 is a graph showing a method for the determination of an amount of shift, in which the variance is minimized, to decimal places when the variance distribution as shown in FIG. 18B has obtained.

FIG. 19 is a graph showing a method for the determination of an amount of shift in which the variance is minimized to a fraction of a bit when the variance distribution as shown in FIG. 18B has been obtained. In FIG. 19, an amount of shift is plotted on the horizontal axis, and the change amount of the variance calculated by Formula (7) (hereinafter referred to as the "amount of variance change") is plotted on the vertical axis. Assuming that the amount of variance change during PD bit shifting is ΔVAR(PD), ΔVAR(PD) can be calculated by the following Formula (10).

ΔVAR(PD)=VAR(PD+1)−VAR(PD−1)  Formula (10)

Given that ZeroCross is an amount of shift when the amount of correlation change ΔVAR(PD) becomes zero using Formula (10), it can be seen from FIG. 19 that ZeroCross is present between PD=−1 and PD=0. Hence, the value of Zero-Cross can be calculated by the following Formula by linear interpolating from the amount of a forward and backward shift of ΔVAR(−1) and ΔVAR(0).

$$ZeroCross = -1 + \frac{-\Delta VAR(-1)}{\Delta VAR(-1) + \Delta VAR(0)} \quad \text{Formula (11)}$$

By calculating an amount of shift when the amount of variance change is zero as shown in Formula (11), an amount of shift with minimum variance can be calculated to a fraction of a bit, whereby a phase difference can be detected with high accuracy.

Figure 20A:
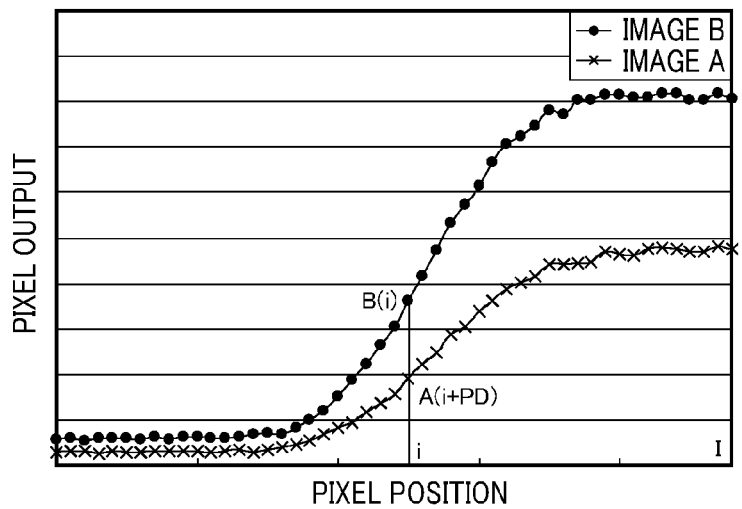
FIG. 20A is a graph showing the state in which phases between the images A and B are matched by shifting the image A by the phase difference PD detected by an amount of correlation defined in Formula (7).
Figure 20B:
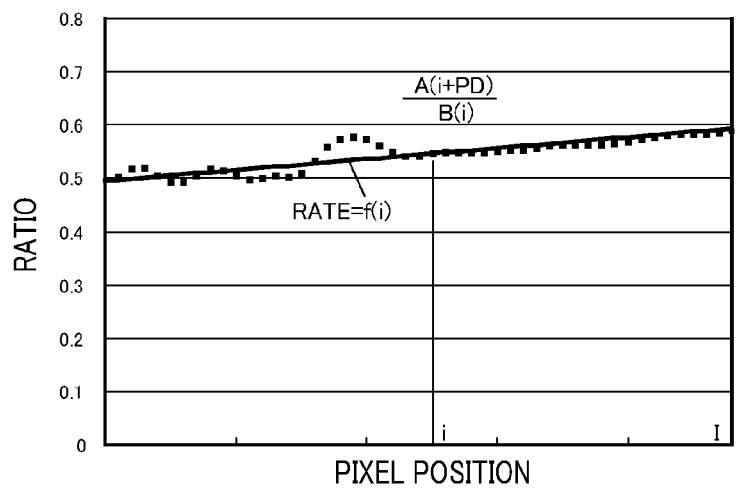
FIG. 20B is a graph where the AB luminous energy ratio RATE for each pixel is plotted according to A(i+PD)/B(i).
Figure 20C:
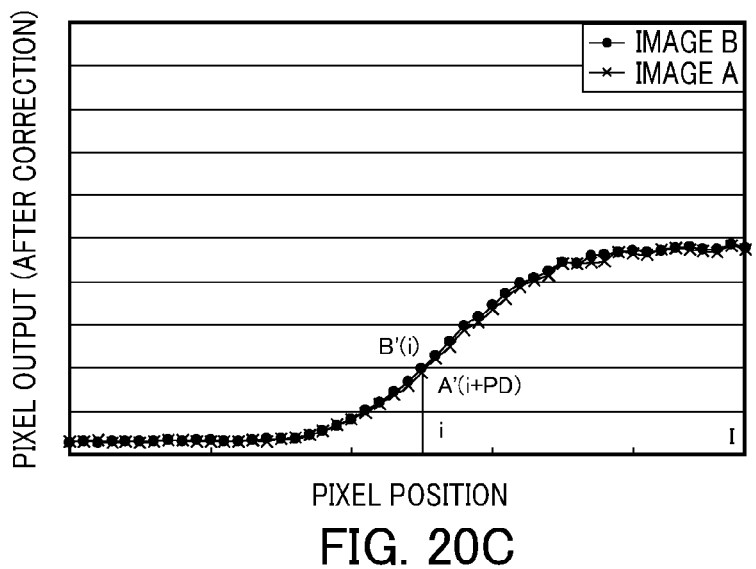
FIG. 20C is a graph showing the images A and B after the re-shading correction on the basis of the approximation formula f(i).

Next, with reference to FIGS. 20A to 20C, a method for correcting a gain difference between the image A and the image B (hereinafter referred to as "re-shading correction") on the basis of the distribution of the output ratio between the phase difference-matched images A and B is explained below. FIG. 20A is a graph showing the state in which phases between the images A and B are matched by shifting the image A by the phase difference PD detected by an amount of correlation defined in Formula (7). The AB luminous energy ratio for each pixel is calculated using the phase-matched images A and B as shown in FIG. 20A. FIG. 20B is a graph where the AB luminous energy ratio RATE for each pixel is plotted according to A(i+PD)/B(i). In FIG. 20B, the pixel position (i.e. the pixel number) is plotted on the horizontal axis, and the AB luminous energy ratio is plotted on the vertical axis. The approximation formula f(i) is calculated from the distribution of the AB luminous energy ratio. Assuming that f(i) is a first order straight line to be calculated on the basis of a method of least squares, the approximation formula f(i) is represented by the following formulae (12) to (14).

$$f(i) = m \cdot i + b \quad \text{Formula (12)}$$

$$m = \frac{N \cdot \left(\sum i\right) \cdot \left(\sum \frac{A(i+PD)}{B(i)}\right)}{\cdot N(\sum i^2) - (\sum i)^2} \quad \text{Formula (13)}$$

$$b = \frac{\left(\sum \frac{A(i+PD)}{B(i)}\right) \cdot \left(\sum i^2\right) - \left(\sum i\right) \cdot \left(\sum i \cdot \frac{A(i+PD)}{B(i)}\right)}{N \cdot \left(\sum i^2\right) - (\sum i)^2} \quad \text{Formula (14)}$$

The gain difference between the (i+PD)th pixel $S_{HA}$ and the ith pixel $S_{HB}$ can be expressed by the approximation formula f(i) shown in formulae (12) to (14). The gain difference between the pixel $S_{HA}$ and the pixel $S_{HB}$ is corrected by multiplying the signal of the ith pixel $S_{HB}$ by f(i). FIG. 20C is a graph showing the images A and B after the re-shading correction on the basis of the approximation formula f(i). As described above, by determining approximation formula f(i) from the distribution of the AB output ratio for each pixel of the phase-matched images A and B and performing the re-shading correction on the basis of approximation formula f(i), the gain difference between the images A and B can be avoided, whereby the degree of coincidence between the images A and B can be improved. While an approximation of a first order straight line has been described in formulae (12) to (14), approximation formula including a second or higher order can also be calculated in the same manner using a method of least squares. Also, in order to reduce the amount of computation, an approximate straight line may also be defined from the average of the right half of the AB output ratio and the average of the left half of the AB output ratio. While a method of multiplying the signal of the pixel $S_{HB}$ by f(i) has been described in FIG. 20C, the signal of the pixel $S_{HA}$ may also be split by f(i). As is mentioned above, by performing the re-shading correction between the images A and B on the basis of the distribution of the output ratio between the phase-matched images A and B, the re-shading correction can be performed without having to use the camera (i.e. shoot a photograph) in uniform light. Hence, the degree of coincidence between the images A and B can be improved, whereby the reliability of the phase difference detection result to be described below can be correctly evaluated. A parameter, namely, the degree of coincidence between the images A and B is used as the index indicating the reliability of the phase difference detection result. The following formula (15) is often used as a formula representing the degree of coincidence.

$$\Sigma |A(i+\text{PD}) - B(i)| \qquad \text{Formula (15)}$$

The more matched the images A and B are, the less the degree of coincidence represented by Formula (15) becomes. When the images A and B are perfectly matched, the degree of coincidence becomes zero. The reliability of the phase difference detection result can be determined by checking whether or not the degree of coincidence exceeds a threshold value. If a phase difference between the images A and B is detected by the variance of the output ratio for each pixel, the phase difference can be correctly detected without correcting a light intensity difference between the pixel $S_{HA}$ and the pixel $S_{HB}$. However, in the present invention, in order to determine the reliability of the phase difference detection result, the re-shading correction between the images A and B is performed on the basis of the distribution of the output ratio between the phase-matched images A and B. If the degree of coincidence is calculated by Formula (15) using a value in which the output ratio between the images A and B is present, it is highly probable that the degree of coincidence is calculated such that the degree of coincidence is determined to be low in spite of the correct detection of the phase difference. However, by performing the re-shading correction between the images A and B, the waveforms between the images A and B are matched, whereby the reliability of the phase difference detection result can be correctly determined. The re-shading correction is performed each time the phase difference is detected. By doing so, whether or not the detection result of the phase difference at that time is accurate can be correctly evaluated each time the phase difference is detected. As described above in FIGS. 20A to 20C, the re-shading correction is performed on the basis of the distribution of the output ratio between the phase-matched images A and B such that the variance of the AB output ratio for each pixel is minimized. By doing so, the degree of coincidence between the images A and B can be improved without having to use the camera in uniform light, whereby the reliability of the phase difference detection result can be correctly evaluated.

Figure 21:
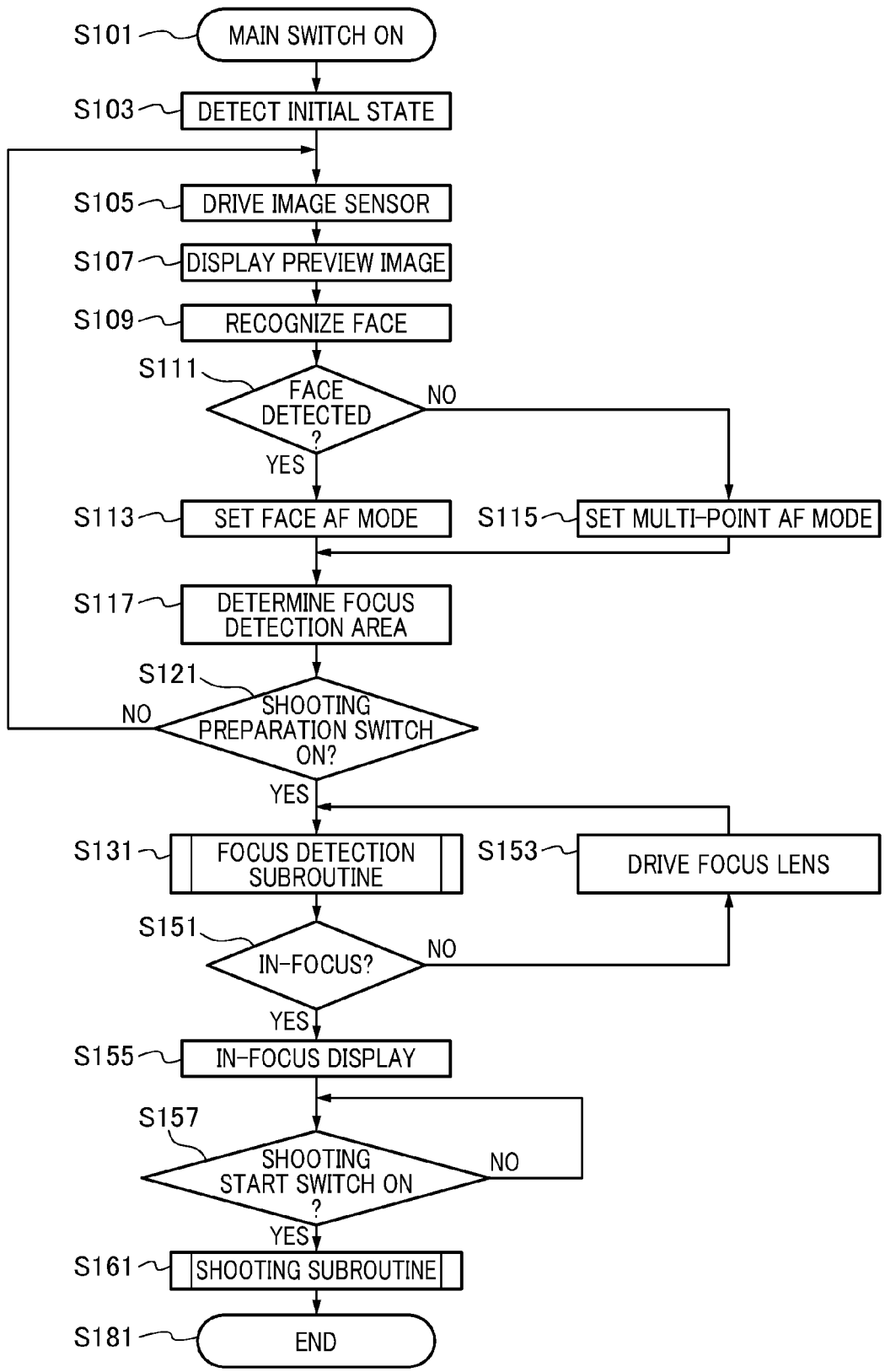
FIG. 21 is a flowchart diagram of the main flow of the camera according to the first embodiment of the present invention.

Next, with reference to FIGS. 21 to 26, the steps of focus-adjusting and shooting of the camera according to the first embodiment of the present invention are explained below. FIG. 21 is a flowchart diagram of the main flow of the camera according to the first embodiment of the present invention. In step (hereinafter abbreviated as "S") 101, the user turns on the power switch of the camera. Then, in S103, the CPU 121 checks the operations of the actuators and image sensor in the camera. The CPU 121 initializes the state of memory contents and programs to be executed, and executes a shooting preparation operation. In S105, the CPU 121 starts the imaging operation of the image sensor 107 to output a low resolution moving image for preview. In S107, the CPU 121 displays the readout moving image on the display 131 mounted at the rear surface of the camera. The user visually checks the preview image and determines the shooting composition while shooting. In S109, the CPU 121 recognizes (what could be) a face in the preview moving image. In S111, the CPU 121 determines whether or not a face has been detected in the preview moving image. If the CPU determines that a face is present in the shooting area, it shifts from S111 to S113 to set the focus adjustment mode (i.e. autofocus, AF, mode) to the face AF mode. The face AF mode is an AF mode in which the camera focuses on the face in the shooting area. If the CPU 121 determines that no face is present in the shooting area, it shifts from S111 to S115 to set the focus adjustment mode to the multi-point AF mode. The multi-point AF mode is a mode in which the shooting area is divided into 3 times 5 (i.e. 15) areas, focus detection is performed in the divided areas, a principal object is analogically inferred from the focus detection result and luminance information of the object, and the camera is focused on the area of the principal object. After determining the AF mode in S113 or S115, the CPU 121 determines the focus detection area in S117. In S121, the CPU 121 determines whether or not the user has turned on the shooting preparation switch. If the user has not turned on the shooting preparation switch, the CPU 121 returns to S105 to repeatedly execute the processing from driving of the image sensor to determination of the focus detection area in S117. If the user has turned on the shooting preparation switch in S121, the CPU 121 shifts to S131 to execute a focus detection subroutine (FIG. 22).

Figure 22:
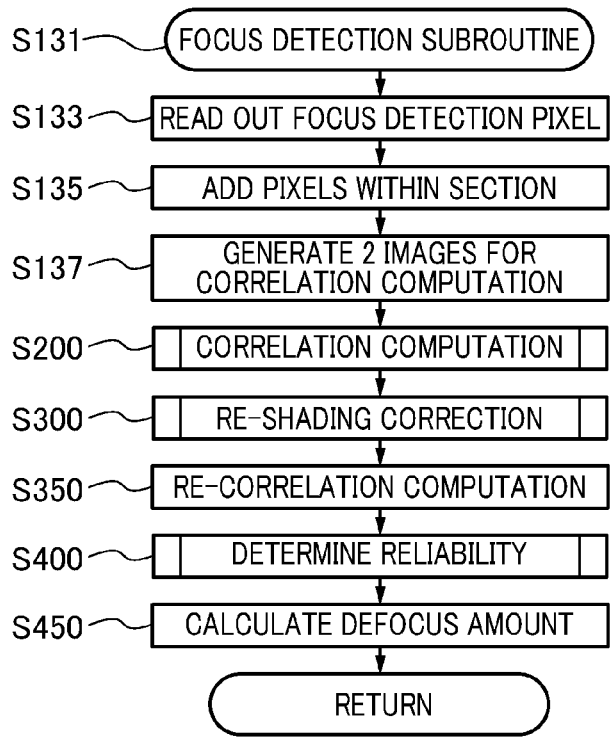
FIG. 22 is a flowchart of the focus detection subroutine.

FIG. 22 is a flowchart of the focus detection subroutine. When the process advances from S131 in the main flow shown in FIG. 21 to S131 in the focus detection subroutine, in S133, the CPU 121 reads out signals from focus detection pixels included in the focus detection area determined in S117 of the main routine. In S135, the CPU 121 reads out signals from focus detection pixels in each block to obtain AF pixel signals. In S137, the CPU 121 arranges signals obtained from the pixel $S_{HA}$ to generate the image A signal, and arranges signals obtained from the pixel $S_{HB}$ to generate the image B signal. These signals are the signals of the images A and B for correlation computation. More specifically, a pair of signals such as $\text{AFSIG}_h$ (A1) and $\text{AFSIG}_h$ (B1) or $\text{AFSIG}_V$ (C3) and $\text{AFSIG}_V$ (D3) as shown in FIG. 9 are generated. In S200, the CPU 121 performs correlation computation on the basis of the obtained images A and B to calculate the phase difference between the images A and B. The correlation computation in S200 is explained as a subroutine in FIG. 23 below. In S300, the relative position relationship between the images A and B is shifted by the phase difference obtained by the correlation computation in S200 to correct the AB output ratio (re-shading correction) on the basis of the AB output ratio for each pixel of the phase-matched images A and B. The re-shading correction in S300 is explained as a subroutine in FIG. 24 below. In S350, the CPU 121 performs correlation computation again for the images A and B in which a re-shading corrected luminous energy ratio has been corrected to calculate a phase difference between the images A and B. In S400, the CPU 121 determines the reliability of the correlation computation result. The term "reliability" refers to the degree of coincidence between the images A and B. When the degree of coincidence between the images A and B is good, the reliability of the focus detection result is generally high. The reliability of the phase difference detection result is determined based on whether or not the degree of coincidence exceeds a threshold value. When a plurality of focus detection areas is selected, information with high reliability is preferentially used. The reliability determination in S400 is explained as a subroutine in FIG. 25 below. In S450, the CPU 121 computes the defocus amount from the detection result with high reliability. The process returns to S151 in the main flow shown in FIG. 21. Referring back to FIG. 21, in S151, the CPU 121 determines whether or not the images A and B are in focus. More specifically, the focus determination is to determine whether or not the defocus amount is equal to or less than a permissible value calculated in S450 shown in FIG. 22. If the defocus amount is above a permissible value, the CPU 121 determines that the images A and B are not in focus, drives the focus lens in S153, and then repeatedly executes the processing from S131 to S151. If the CPU 121 determines that the images A and B are in focus in S151, an in-focus display is performed in S155, and the processing shifts from S155 to S157. In S157, the CPU 121 determines whether or not the shooting start switch has turned on. If the switch has not turned on, the CPU 121 maintains the shooting standby state in S157. If the shooting start switch is turned on in S157, the processing shifts from S157 to S161 to execute a shooting subroutine (FIG. 26), and then ends the process at S181.

Figure 23:
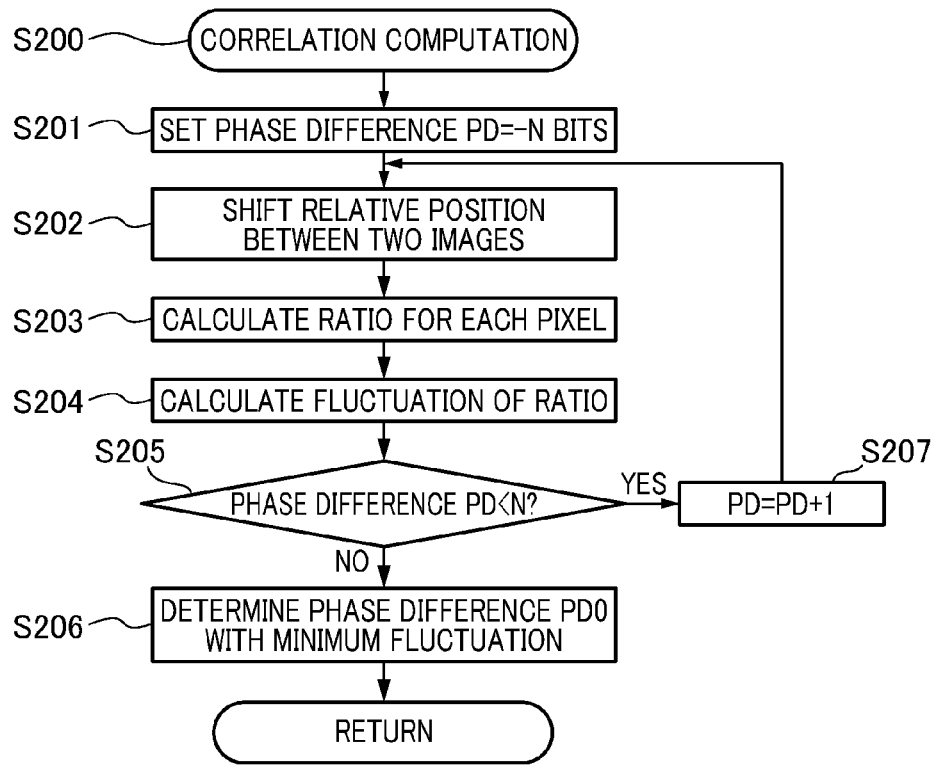
FIG. 23 is a flowchart diagram of the correlation computation subroutine.

FIG. 23 is a flowchart diagram of the correlation computation subroutine S200. In S201, the phase difference PD between the images A and B is set at −N bits. In S202, the relative position relationship between the images A and B is shifted on the basis of the phase difference PD set in S201. For example, when the phase difference PD is set at −N bits, the image A is shifted towards left by N bits relative to the image B. In S203, the AB output ratio for each pixel of the images A and B in which the relative position relationship has been shifted in S202 is calculated. For example, when the number of the pixels of the images A and B is I and the set phase difference PD is −N bits, (I−|2 times N|) AB output ratios are obtained. In S204, the fluctuations of a plurality of the AB output ratios obtained in S203 are calculated. The fluctuation to be calculated is the variance shown in Formula (7). In S205, the CPU 121 determines whether or not the set phase difference PD is smaller than N bits. If the phase difference PD is smaller than N bits, the phase difference PD is incremented by +1 in S207, the process returns to S202, and the relative position between the images A and B is shifted by the set phase difference PD. On the other hand, if the phase difference PD is equal to or greater than N bits, the process advances to S206. In S206, among the fluctuations calculated in S204 from the respective phase difference PD, the minimum value is selected, and this phase difference PD is calculated as the fluctuation minimum phase difference PD0. The processing returns to S200 in FIG. 22 and shifts from S200 to S300.

Figure 24:
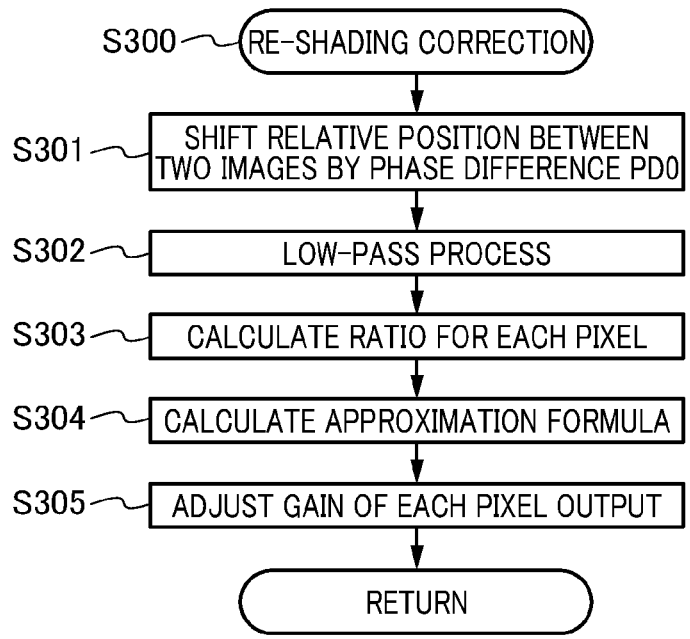
FIG. 24 is a flowchart diagram of the re-shading correction subroutine.

FIG. 24 is a flowchart diagram of the re-shading correction subroutine S300. In S301, the relative position relationship between the images A and B is shifted by the fluctuation minimum phase difference PD0 calculated by the correlation computation in S200 shown in FIG. 22. When the minimum phase difference PD0 is negative, the image A is shifted towards left. When the PD0 is positive, the image B is shifted towards left. By shifting the images A and B such that the AB output ratio for each pixel is minimized, the relative position relationship between the images A and B can be matched. In S302, a low-pass filter process is performed. The low-pass filter process refers to a process for passing signals between adjacent pixels eight times through an adjacent average filter that averages the signals to provide a single signal. By averaging adjacent pixel signals and removing high frequency components to leave only low frequency components, the effects of noise may be reduced. The distribution of the luminous energy ratio occurring between the images A and B has extremely low frequency components as shown in FIGS. 12A to 12C. This is because, as shown in Formulae (1) to (4), the exit windows 141C and 142C projected onto the exit pupil are values which gradually change in accordance with the image height $X_{140}$. Hence, high frequency components cannot be included. Accordingly, by performing the low-pass filter process in S302, the distribution of the luminous energy ratio composed of low frequency components remains while noise composed of high frequency components is removed. In S303, the AB output ratio for each pixel is calculated for the images A and B subjected to the low-pass filter process in S302. For example, when the number of the pixels of the images A and B is I and the set phase difference PD is −N bits, (I−|2 times N|) AB output ratios are obtained. In S304, an approximation formula is calculated on the basis of a plurality of the AB output ratios obtained in S303. The approximation formula to be calculated herein refers to a linear approximate straight line obtained by a method of least squares as shown in Formulae (11) to (13). In S305, by adjusting the gain of the images A and B on the basis of the approximation formula calculated in S304, the luminous energy ratio occurring between the images A and B is corrected. By correcting the luminous energy ratio between the images A and B in S305, the degree of coincidence between the images A and B is improved, whereby the reliability of the phase difference detection result can be correctly calculated. When S305 is completed, the processing returns to S300 in FIG. 22, and shifts from S300 to S350.

Figure 25:
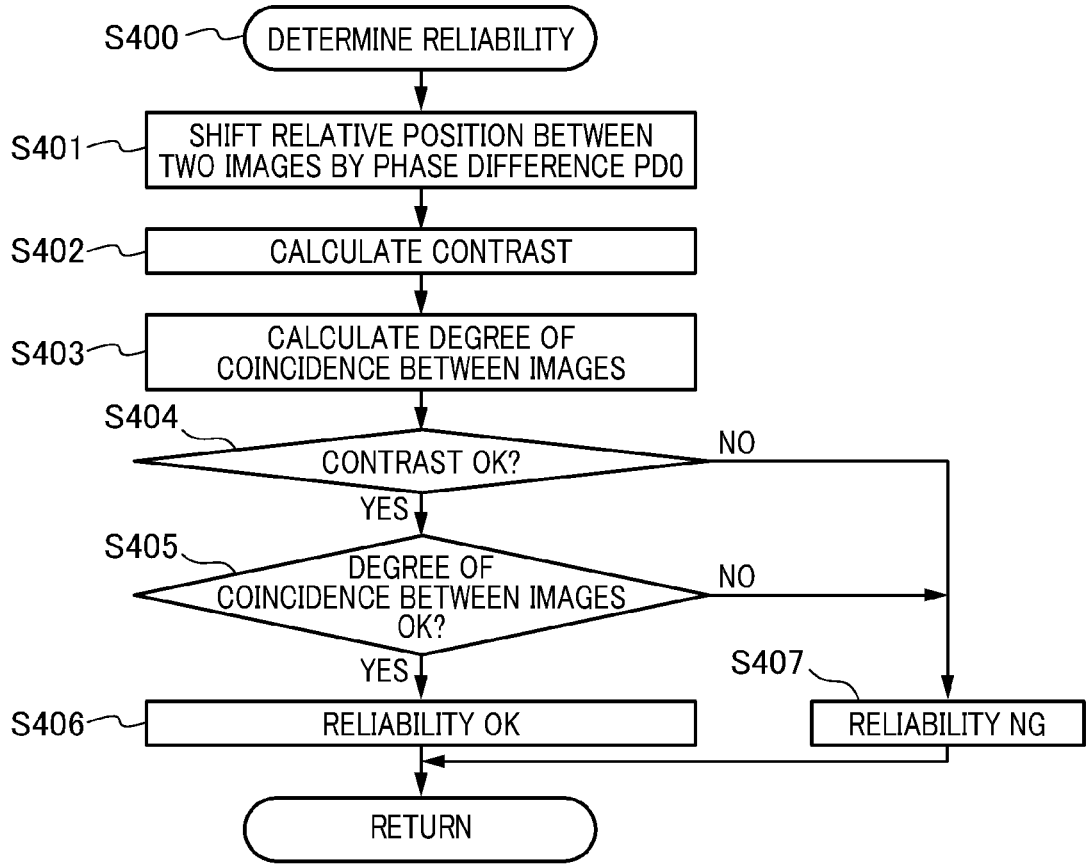
FIG. 25 is a flowchart diagram of the reliability determination subroutine.

FIG. 25 is a flowchart diagram of the reliability determination subroutine S400. In the reliability determination subroutine described below, reliability is determined using two values, specifically, the contrast value of the object image used for the phase difference detection and the degree of coincidence of the images. In S401, the phase between the images A and B is matched by shifting the relative position between the images A and B by the fluctuation minimum phase difference PD0 calculated by the correlation computation in S200 shown in FIG. 22. In S402, the contrast value is calculated using the images A and B between which the luminous energy ratio has been corrected in S300 shown in FIG. 22 and between which the phase has been matched in S401. The contrast value refers to the calculated value of the sum of absolute values and the sum of squares of the adjacent pixel output difference. With intent to reduce the effects of noise, the sum of the absolute values and the sum of squares of the adjacent pixel output difference may also be calculated for the waveforms subjected to the low-pass filter processing. The average of the sum of the absolute values and the sum of squares obtained for each of the images A and B is set to the contrast value of the images A and B. In S403, the degree of coincidence of the images is calculated using the images A and B between which the luminous energy ratio has been corrected in S300 and between which the phase has been matched in S401. Here, the degree of coincidence is to be calculated by the sum of the absolute value of the difference between the AB outputs for each pixel as shown in Formula (15). In S404, the CPU 121 determines whether or not the contrast is reliable. More specifically, the CPU 121 determines whether or not the contrast value calculated in S402 exceeds a threshold value. If the contrast value exceeds a threshold value, the CPU 121 determines that the reliability of the contrast is at sufficiently reliable level, and the process advances from S404 to S405. On the other hand, if the contrast value does not exceed a threshold value, the CPU 121 determines that the reliability of the contrast is not a reliable level, and the process advances from S404 to S407. In S405, the CPU 121 determines whether or not the degree of coincidence of the images is reliable. More specifically, the CPU 121 determines whether or not the degree of coincidence calculated in S403 is smaller than a threshold value. If the degree of coincidence is smaller than a threshold value, the CPU 121 determines that the degree of coincidence of the images is at a reliable level, and the process advances from S405 to S406. On the other hand, if the degree of coincidence is not smaller than a threshold value, the CPU 121 determines that the degree of coincidence of the images is not at a reliable level, and the process advances from S405 to S407. In S406, the CPU 121 determines that the reliability is satisfactory (OK). The process returns to S400 shown in FIG. 22, and shifts from S400 to S450. The CPU 121 executes S407 when the CPU 121 has determined that the contrast was not at a sufficient level in S404 or when the CPU 121 determined that the degree of coincidence of the images was not at a sufficient level in S405. Hence, in S407, the CPU 121 determines that the reliability is insufficient (NG). The process returns to S400 shown in FIG. 22, and shifts from S400 to S450.

Figure 26:
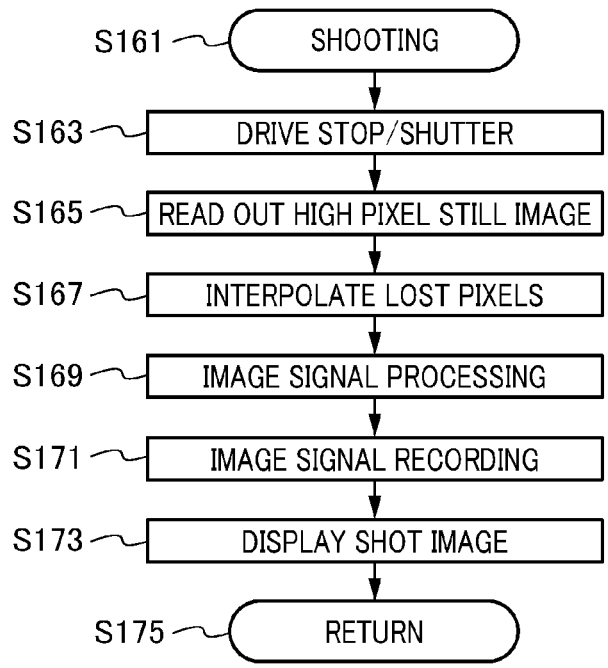
FIG. 26 is a flowchart of the shooting subroutine.

FIG. 26 is a flowchart of the shooting subroutine S161. When the user operates the shooting start switch, the CPU 121 drives the stop/shutter 102 in S163, controlling the aperture of the stop/shutter 102 for defining the exposure time. In S165, the CPU 121 reads out an image for shooting a still image using a large number of pixels, namely, reads out signals from all pixels. In step S167, the CPU 121 interpolates a lost pixel of a readout image signal. That is, an output from focus detection pixels such as $S_{HA}$ and $S_{HB}$ does not contain RGB color information for imaging, and these focus detection pixels are lost pixels when obtaining an image. Hence, an image signal is generated by interpolation using information of adjacent image sensing pixels. In S169, the CPU 121 performs image processes such as γ correction and edge emphasis of an image. In S171, the CPU 121 records a shot image in the flash memory 133. In S173, the CPU 121 displays the shot image on the display 131. In S175, the CPU 121 returns to the main routine of FIG. 21. After returning to the main routine of FIG. 21, the CPU 121 ends a series of shooting operations in S181. While the imaging apparatus of the first embodiment has been described through the case where the photographic optical system TL is integrated with the imaging apparatus to form a so-called lens integrated camera, the present invention may be applied to a type of a camera having an interchangeable photographic optical system TL. For example, for a single-lens reflex digital camera, the present invention may be applied to a case where the focus detection pixel is provided in the image sensor and the phase difference detection is performed on the imaging surface by mirror lockup. As described above, according to the phase difference calculation method of the first embodiment, the phase difference detection error can be reduced even for a pair of image signals having a gain difference since the pixel output ratio for each pixel of a pair of image signals is calculated, and then the phase difference is calculated utilizing the fluctuation of the distribution of the pixel output ratio as an amount of correlation. By using the above-described phase difference detection method applied to the focus detection device that detects the focus state of the photographic optical system TL on the basis of a phase difference between a pair of image signals, the focus detection error is less prone to occur even for a pair of image signals having a gain difference. Further, the gain difference between a pair of image signals is corrected on the basis of the distribution of the pixel output ratio for each pixel of a pair of image signals between which the phase has been matched utilizing the fluctuation of the distribution of the output ratio as an evaluation amount. Therefore, the degree of coincidence between a pair of image signals can be improved even when shooting under non-uniform light, whereby the reliability of the phase difference detection can be correctly determined.

Second Embodiment

With reference to FIGS. 27 to 33, the second embodiment of the present invention will be described. In the first embodiment, the image sensor includes the image sensing pixels and the focus detection pixels, and the pupil is split by projecting an aperture biased toward the center of the microlens ML in the focus detection pixel onto the exit pupil of the photographic optical system 201. Then, by calculating a phase difference between a pair of obtained image signals from a pair of focus detection pixels having an aperture biased in the opposite direction, the focus state of the photographic optical system 201 is detected. In other words, the first embodiment is a phase difference focus detection method of the TTL (through the lens) primary image-forming type. In the second embodiment, a light beam guided by the optical path splitting between the photographic optical system 201 and the image sensor is reimaged by a secondary image forming optical system composed of a pair of lens elements to detect the focus state of the photographic optical system 201 on the basis of the phase difference between a pair of obtained image signals. In other words, a phase difference focus detection method of the TTL secondary image-forming type is a main feature of the second embodiment.

Figure 27:
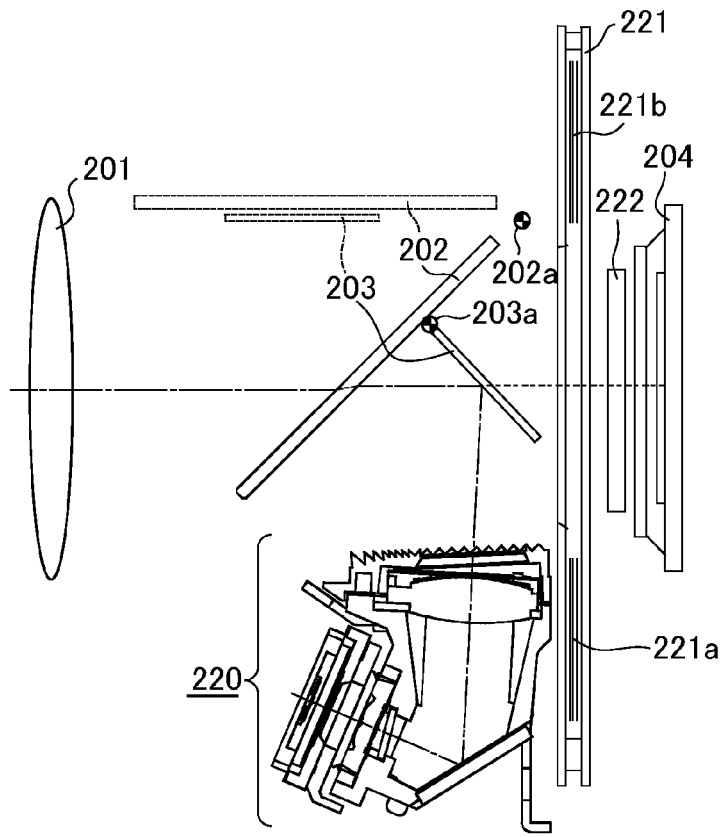
FIG. 27 is a lateral cross-sectional view of the camera of the second embodiment.

FIG. 27 is a lateral cross-sectional view of the camera of the second embodiment. The camera of the second embodiment includes a photographic optical system 201, a main mirror 202, a sub mirror 203, an image sensor 204, a focus detection device 220, a shutter unit 221, and an optical low-pass filter 222. The photographic optical system 201 in the camera of the second embodiment is integrated with the camera body. However, a camera system having an interchangeable photographic optical system by interchanging a removable replacement lens may also be provided. The main mirror 202 splits a light beam from an object coming from the photographic optical system. A part of the main mirror 202 is a half mirror which transits a part of the light beam from an object and reflects the remaining light beam from an object upward. The main mirror 202 is rotatably and pivotally supported to the camera body by a shaft portion 202a. The sub mirror 203 reflects a light beam from an object having passed through the main mirror 202 into the focus detection device 220 arranged below the optical axis. The sub mirror 203 is also rotatably and pivotally supported to the holding member of the main mirror 202 by a shaft portion 203a, and is rotatable relative to the main mirror 202. Hence, the main mirror 202 rotates about the shaft portion 202a, and the sub mirror 203 rotates about the shaft portion 203a. With this arrangement, two states, namely the mirror-down state and the mirror-up state, can be obtained. Here, the mirror-down state refers to the state in which the main mirror 202 is inclined 45 degrees to the optical axis of the photographic optical system and the sub mirror 203 is inclined about 45 degrees downward so as to reflect a light beam from an object. The mirror-up state refers to the state in which both the main mirror 202 and the sub mirror 230 are folded upward so as to be fully withdrawn from a light beam from an object. In the mirror-down state, a light beam from an object from the photographic optical system 201 is split into a light beam directed toward the upper finder optical system (not shown) and a light beam directed toward the lower focus detection device 220.

On the other hand, in the mirror-up state, all of the light beam from an object coming from the photographic optical system 201 are guided to the image sensor 204. The image sensor 204 is a photoelectric conversion element that receives a light beam from an object imaged by the photographic optical system to convert it to an image signal. The image sensor 204 of this embodiment is a packaged CMOS image sensor. The focus detection device 220 is arranged below the sub mirror 203, and detects the focus state of the photographic optical system 201 by the light beam from an object reflected from the sub mirror 203. The focus detection device 220 performs a focus detection operation employing a phase difference detection method. From the relative position relationship between the two object images formed by a light beam transmitted through a pair of different pupil areas in the photographic optical system 201, the focus detection device 220 detects the focus state of the photographic optical system 201. A technique for detecting the focus state of the photographic optical system from the relative position relationship between the two object images obtained from a pair of different pupil areas in the photographic optical system is a known technique as disclosed in Japanese Patent Laid-Open No. 52-138924. The shutter unit 221 is arranged on the light incident side of the optical low-pass filter 222 to be described below, and limits the exposure time in seconds of a light beam from an object incident on the image sensor 204. The shutter unit 221 includes a plurality of leading curtains 221a and trailing curtains 221b. These curtains run in the transverse direction of the image sensor, and controls the shutter time in seconds by the run interval between the leading curtain 221a and the trailing curtain 221b. The optical low-pass filter 222 is arranged in an optical path extending from the photographic optical system 201 to the image sensor 204, and limits a cut-off frequency of the photographic optical system 201 such that spatial frequency components of the image of the object higher than that necessary for the image sensor 204 are not transmitted thereto. An infrared cut filter is also formed in the optical low-pass filter 222.

Figure 28:
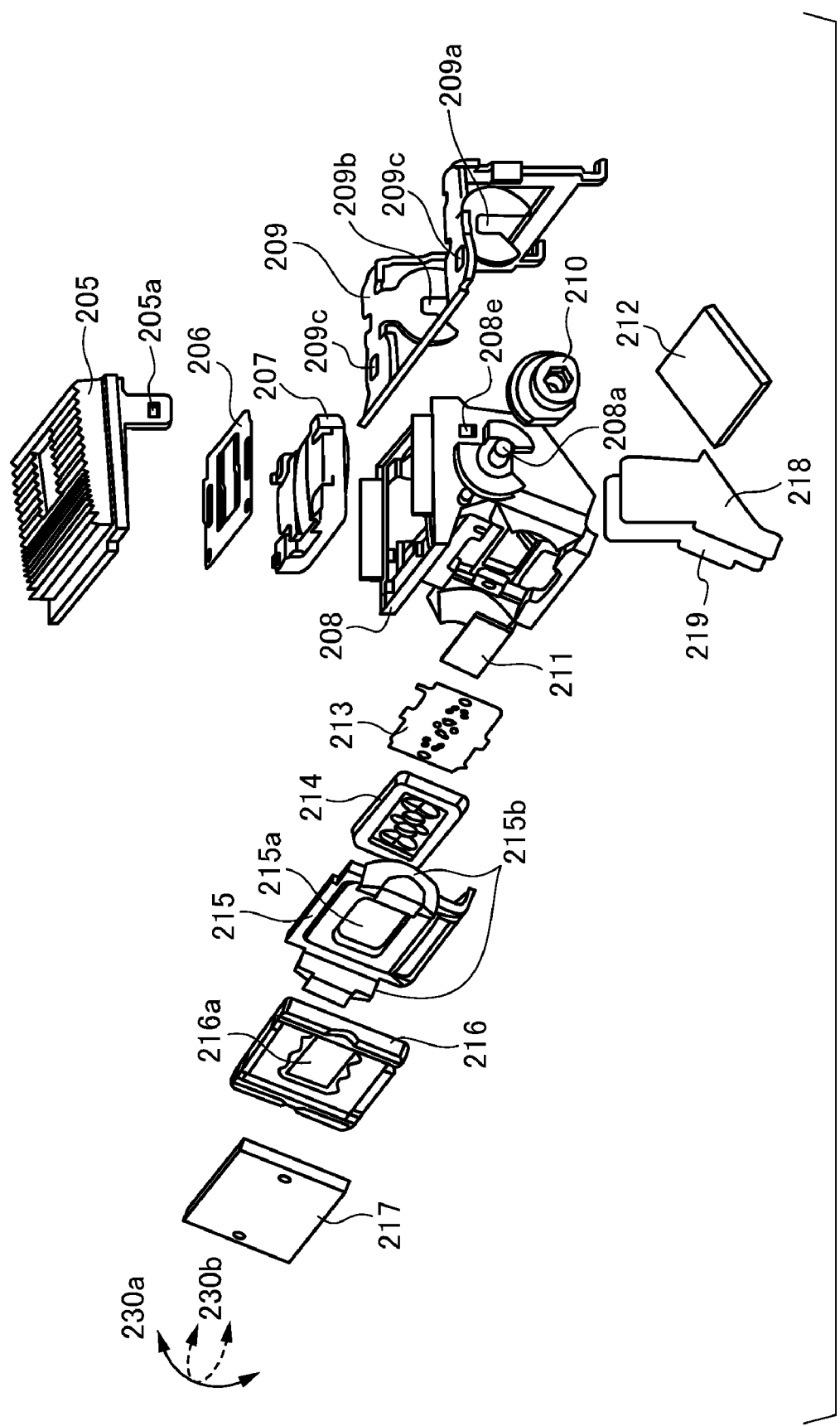
FIG. 28 is a developed perspective view in which the respective parts of the focus detection device 220 of the second embodiment are developed.

FIG. 28 is a developed perspective view in which the respective parts of the focus detection device 220 of the second embodiment are shown in more detail. The focus detection device 220 includes a cover 205, a light blocking sheet 206, a field lens 207, a holding member 208, a plate 209, an eccentric cam 210, an IR-CUT filter 211, a folding mirror 212, a stop 213, and a reimaging lens 214. The focus detection device 220 also includes an abutment member 215, a sensor holder 216, a focus detection sensor 217, and separators 218 and 219. The cover 205 is a light blocking member that limits a light beam from an object reflected from the sub mirror 203. The cover 205 has an aperture that only passes a light beam from an object required for focus detection. The aperture is arranged near the substantial imaging surface of the photographic optical system 201, leads required light beams from an object to the focus detection optical system, and blocks unnecessary light beams from an object. The cover 205 has a hole portion 205a provided at two places. The projection 208e of the holding member 208 is fit into the hole portion 205a, whereby the cover 205 is secured to the holding member 208. Since the upper surface of the cover 205 exposes the inner wall of the camera body, a light blocking line is provided on the upper surface of the cover 205 such that reflected light does not reach to the image sensor 204. The light blocking sheet 206 is arranged between the cover 205 and the field lens 207, and further limits a light beam passed through the aperture of the cover 205. The field lens 207 projects the stop 213 onto the pupil of the photographic optical system.

The holding member 208 holds the respective parts of the focus detection device 220. More specifically, the holding member 208 holds the cover 205 mentioned above, the light blocking sheet 206, the field lens 207, the eccentric cam 210, the IR-CUT filter 211, the folding mirror 212, and the stop 213. The holding member 208 also holds the reimaging lens 214, the abutment member 215, the sensor holder 216, the focus detection sensor 217, and the separators 218 and 219. The shaft portion 208a of the holding member 208 is engaged with the eccentric cam 210 and is rotatable relative to the holding member 208. The holding member 208 is mounted on the camera body via the plate 209. With this arrangement, when the linear expansion coefficient between the camera body and the holding member 208 is different, the plate 209 absorbs deformations therebetween, whereby a distortion of the holding member 208 is avoided. The plate 209 is a member that mounts the holding member 208 on the camera body. U-shaped bearing portions 209a and 209b, each having an abutment portion in the transverse direction of the image sensor 204, are formed in the plate 209. The bearing portions 209a and 209b are sized to engage with shaft portions 208a and a corresponding shaft portion that is not visible in FIG. 28, respectively. Hence, in a state where the shaft portions 208a and its opposite end are engaged with the bearing portions 209a and 209b, respectively, the position of the longitudinal direction of the camera relative to the plate 209 of the holding member 208 is determined uniquely. Since the U-shaped hole of the bearing portion 209a is longer than the U-shaped hole of the bearing portion 209b, the shaft portion 208a and the bearing portion 209a do not abut in the transverse direction of the image sensor 204 when the holding member 208 is brought into the position of the design value relative to the plate 209. However, the shaft portion opposite 208a abuts the bearing portion 209b. That is, the shaft portion opposite 208a and the bearing portion 209b abut the longitudinal direction of the camera and the transverse direction of the image sensor 204, respectively, to be uniquely positioned, whereby the shaft portion 208a and the bearing portion 209a can move only in the transverse direction of the image sensor 204. The eccentric cam 210 is an eccentric cam to be fit with and held by the shaft portion 208a of the holding member 208. The outer periphery of the eccentric cam 210 abuts the plate 209 to determine the height position of the shaft portion 208a relative to the plate 209. With this arrangement, as mentioned above, the position of the shaft portion 208a moveable in the transverse direction of the image sensor 204 is uniquely determined by the rotating angle of the eccentric cam 210. The aforesaid construction enables the holding member 208 to rotate about the shaft portions 208a and its opposite end relative to the plate 209. In addition, the height position of the shaft portion 208a is changed by the rotation of the eccentric cam 210, which enables the rotational movement centered on the optical axis of the photographic optical system 201.

As mentioned above, the inclination of the focus detection device 220 of the present embodiment is bi-directionally adjustable. This bi-directional inclination adjustment adjusts deviation between the optical axis of the focus detection optical system and the optical axis of the photographic optical system, which is referred to as "pupil adjustment". After completion of the pupil adjustment, an instantaneous adhesive or welding agent is flowed into an abutment surface so as to secure the holding member 208, the plate 209, and the eccentric cam 210. The IR-CUT filter 211 is formed with a glass on whose surface is coated a multi-layer deposited film that reflects the infrared component light, thereby reflecting the infrared component light. The focus detection sensor 217 is also sensitive to light with wavelength longer than that of visible light. On the other hand, since the optical low-pass filter 222 provided with an infrared cut filter is arranged at the light entrance side of the image sensor 204, light with a wavelength longer than that of visible light is cut off and thus does not reach to the image sensor 204. When the spectral characteristics of light to be received by the focus detection sensor 217 and the image sensor 204 are different, the focus position may be changed. Hence, when the photographic optical system 201 is moved according to the focus position obtained by the focus detection device 220, the phenomenon of defocusing on the image sensor 204 may occur. The IR-CUT filter 211 conforms the spectral characteristics of light that reaches the image sensor 204 and the focus detection sensor 217, which serves to prevent defocusing as mentioned above.

The folding mirror 212 is formed with a glass on whose surface is coated with the aluminum deposited film and which reflects light with a wavelength between 400 to 800 nm at substantially the same reflectance. For accommodating the focus detection device 220 in a limited space in the lower part of the camera, the folding mirror 212 deflects a light beam from an object with the result that the focus detection device 220 can be made more compact. The stop 213 is the stop of an image-reforming optical system. A pair of apertures are formed in the stop 213, which limits a light beam incident on a pair of lenses for the reimaging lens 214. The stop 213 is projected onto the pupil of the photographic optical system 201 by means of the field lens 207. A pair of apertures of the projected stop 213 transmit a light beam coming from a pair of different pupil areas in the pupil of the photographic optical system 201. The reimaging lens 214 includes a pair of lenses corresponding to a pair of apertures of the stop 213, which respectively forms an image of light beams coming from the different pupil areas of the photographic optical system 201 onto the image sensor 217. The abutment member 215 is an abutment member that is interposed between the sensor holder 216 and the holding member 208 to realize the inclination adjustment mechanism of the focus detection sensor 217. The abutment member 215 is provided with an aperture 215a for transmitting a light beam from an object; and a pair of convex portions 215b for abutting the holding member 208. The convex portions 215b are provided at both ends of the abutment member 215, and each of which has a partially cut-away spherical shape. A ball is provided at both ends of the abutment member 215, and abuts the holding member 208, whereby an inclination adjustment between the reimaging lens 214 and the focus detection sensor 217 can be performed. The sensor holder 216 is a member that holds the focus detection sensor 217, and is secured to the focus detection sensor 217 and the sensor holder 216 by means of an instantaneous adhesive or welding agent. The sensor holder 216 is provided with an aperture 216a for transmitting a light beam from an object. The focus detection sensor 217 is a photoelectric conversion unit held in the sensor holder 216. The focus detection sensor 217 will be described later. The separators 218 and 219 each is a separator that prevents a light beam from an object in the central field from mixing with a light beam from an object in the peripheral field. When a light beam transmitted through the central portion of the lens of the field lens 207 transits the aperture for the peripheral field of the stop 213 and reaches the focus detection sensor 217, that light beam becomes ghost light, thereby resulting in detection error. Hence, in the optical path between the field lens 207 and the IR-CUT filter 211, the separators 218 and 219 are interposed in the space between a central field light beam and a peripheral field light beam, which prevent light beams from mixing.

Figure 29:
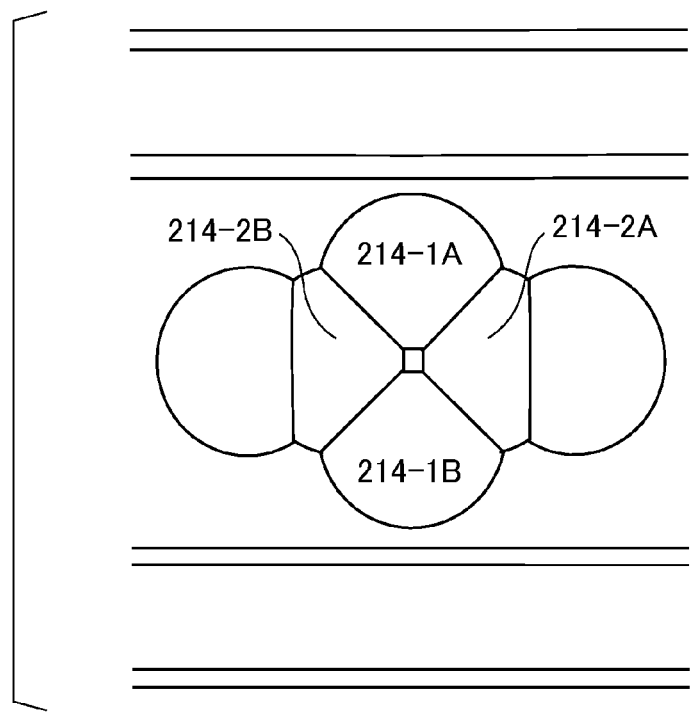
FIG. 29 is an enlarged view of the central portion of the light exiting surface side extracted from the reimaging lens 214.

FIG. 29 is an enlarged view of the central portion of the light exiting surface side extracted from the reimaging lens 214. A plurality of pairs of lenses for reimaging a pair of object images is provided at the light exiting surface side of the reimaging lens 214. Each lens is a spherical lens, and has a convex shape at the light exiting surface side. Lenses 214-1A and 214-1B are for reimaging focus detection light beams in the vertical direction in the distance measuring field at the center in the screen. Light beams in the vertical direction in the field at the center in the screen are reimaged at the lenses 214-1A and 214-1B, whereby a pair of object images aligned in the longitudinal direction are formed on the focus detection pixel line for the focus detection sensor 217. Note that the vertical direction and horizontal direction may be other directions that are different from each other, but not necessarily orthogonal, depending on the layout of the pixels in the pixel matrix of the image sensor. The lenses 214-2A and 214-2B are for reimaging focus detection light beams in the horizontal direction in the field at the center in the screen. Light beams in the horizontal direction in the field at the center in the screen are reimaged at the lenses 214-2A and 214-2B, whereby a pair of object images aligned in the horizontal direction are formed on the focus detection pixel line for the focus detection sensor 217.

Figure 30:
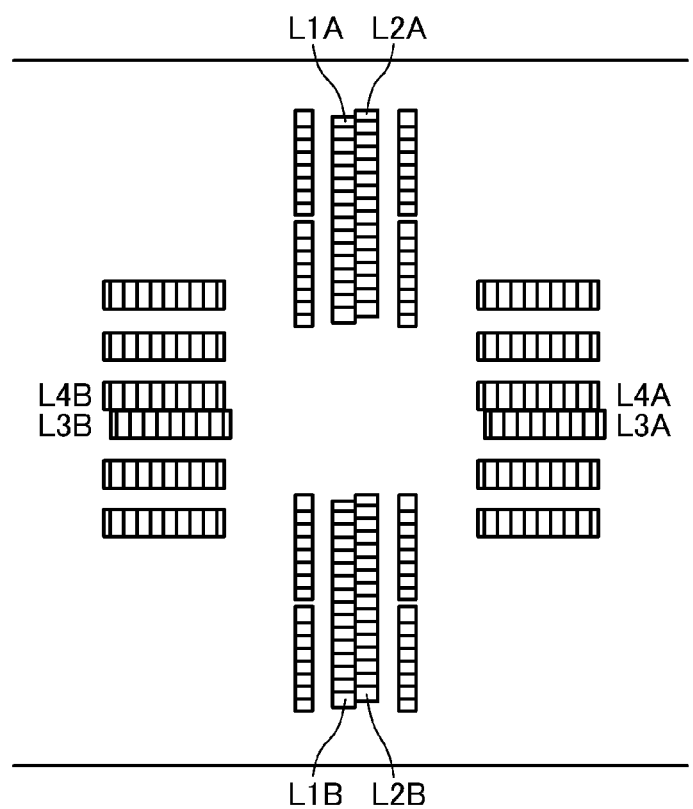
FIG. 30 is an enlarged view of the central portion of the light exiting surface side of the chip in the focus detection sensor 217.

FIG. 30 is an enlarged view of the central portion of the light exiting surface side of the chip in the focus detection sensor 217. The focus detection pixel line is arranged to the focus detection sensor 217 corresponding to the imaging position of a pair of object images reimaged at the reimaging lens 214 as described in FIG. 29. Light beams in the vertical direction in the field at the center in the screen are reimaged on the focus detection pixel lines L1A and L2A of FIG. 30 by the lens 214-1A of FIG. 29, and are also reimaged on the focus detection pixel lines L1B and L2B of FIG. 30 by the lens 214-1B of FIG. 29. Each of the focus detection pixel lines L1A and L2A is a line sensor in which a plurality of pixels is arranged in the longitudinal direction. The focus detection pixel lines L1A and L2A are arranged in a staggered pattern in which the phases are offset by a half pitch, resulting in improved resolution. Likewise, the focus detection pixel lines L1B and L2B are composed of a plurality of pixels, and are arranged in a staggered pattern. Likewise, light beams in the vertical direction in the field at the center in the screen are reimaged on the focus detection pixel lines L3A and L4A of FIG. 30 by the lens 214-2A of FIG. 29, and are also reimaged on the focus detection pixel lines L3B and L4B of FIG. 30 by the lens 214-2B of FIG. 29. Each of the focus detection pixel lines L3A and L4A is a line sensor in which a plurality of pixels is arranged in the longitudinal direction. The focus detection pixel lines L3A and L4A are arranged in a staggered pattern in which the phases are offset by a half pitch, resulting in improved resolution. Likewise, the focus detection pixel lines L3B and L4B are composed of a plurality of pixels, and are arranged in a staggered pattern. A pair of focus detection pixel lines in the focus detection sensor 217 is each composed of a plurality of pixels arranged on a line and a relatively lateral shift is observed according to the image formation state of the object image formed by the imaging optical system 201 in the focus detection area between the output signal waveforms of the pair of pixel arrays. The output signal waveforms in the front focus and the rear focus shift horizontally relative to each other. It is the principle of focus detection that the phase difference is detected including the shift direction using a technique such as correlation computation, etc.

Figure 31:
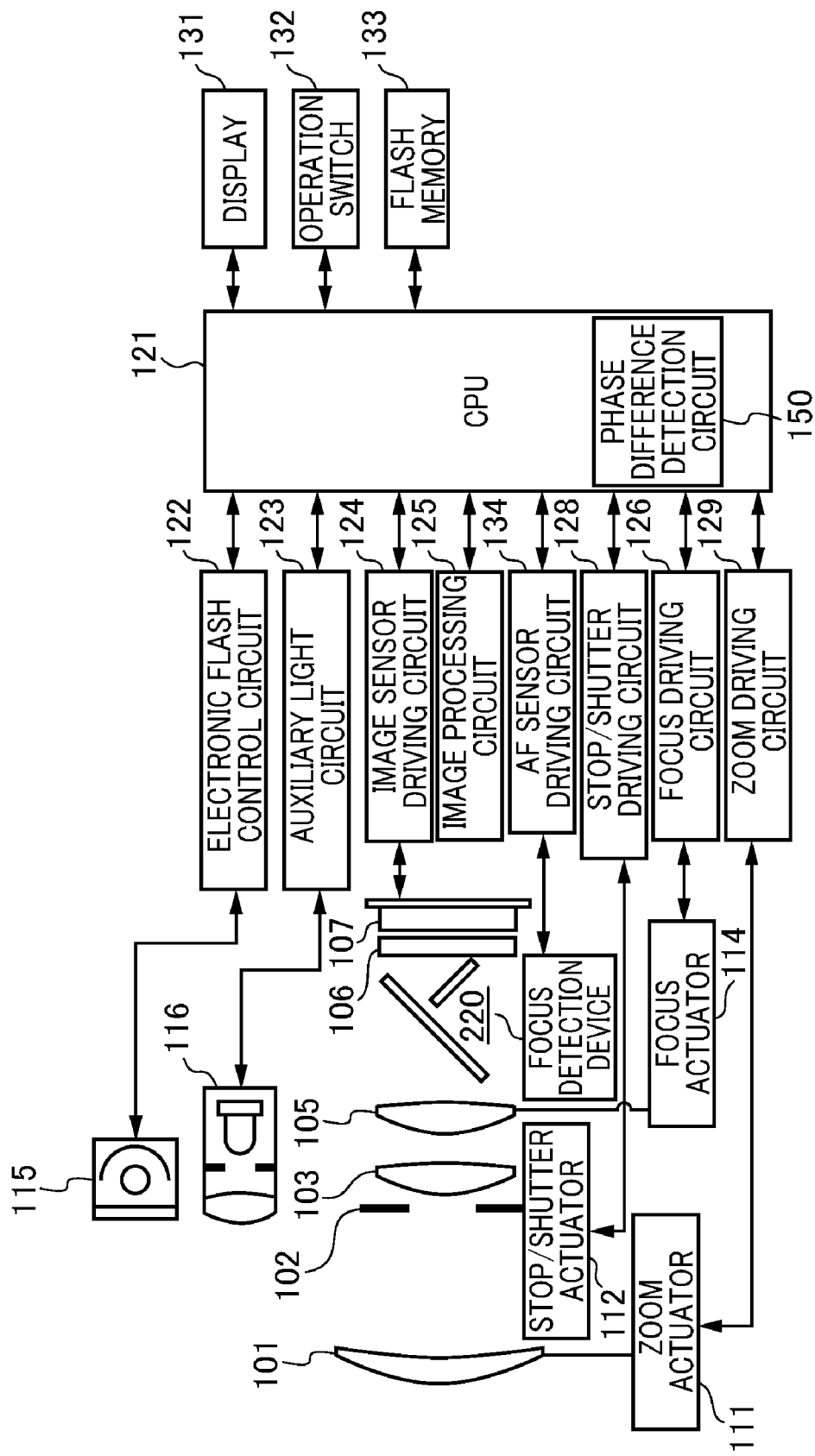
FIG. 31 is a view showing a configuration of a camera provided with the phase difference detection method of the second embodiment.

FIG. 31 is a view showing a configuration of a camera provided with the phase difference detection method of the second embodiment. The camera of the second embodiment is a digital camera integrating a camera body having an image sensor with the photographic optical system 201. The second embodiment is different from the first embodiment in that the former further includes the focus detection device 220 and an AF sensor driving circuit 134 for driving the same. As the configuration of the second embodiment is the same as that of the first embodiment except for the points mentioned above, no further description will be given here.

In FIG. 31, the focus detection device 220 for detecting the focus state of the photographic optical system 201 is arranged beneath the sub mirror 203, light reflected from the sub mirror 203 is guided to the focus detection device 220. As described in FIG. 28, the focus detection device 220 is provided with the focus detection sensor 217 that photoelectrically converts an optical image in which light reflected from the sub mirror has been reimaged by the reimaging lens 214 so as to generate a pair of image signals. The AF sensor driving circuit 134 drives the focus detection sensor 217. The CPU 121 acquires a pair of image signals from the focus detection device 220 via the AF sensor driving circuit 134 and calculates the phase difference on the basis of the phase difference calculation method to be described below. Next, an explanation is given to describe that the pupil splitting state of the focus detection pixel of the second embodiment is also pupil-split as in the first embodiment shown in FIG. 8. The stop 213 serves as the exit pupil of the reimaging lens 214 that focuses an image signal onto the focus detection pixel. The stop 213 is projected onto the exit pupil of the photographic optical system 201 by means of the field lens 207. That is, the exit pupils between the stop 213 and the photographic optical system 201 have an optically conjugate relationship. With this arrangement, the exit pupils of the lenses 214-1A, 214-1B, 214-2A, and 214-2B in the reimaging lens 214 are projected by the field lens 207 to make the pupils EPHA, EPHB, EPHC, and EPHD, resulting in the pupil splitting. The exit pupil of the focus detection pixel of the second embodiment is limited by vignetting in the photographic optical system 201 according to the same principles as described in FIGS. 10 and 11 of the first embodiment. Hence, the gain difference between the images A and B changes in accordance with the image height as shown in FIGS. 12A to 12C of the first embodiment. Consequently, a pair of obtained image signals from the focus detection device 220 becomes the images A and B between which the gain difference changes in accordance with the image height. When the phase difference detection is performed for such images A and B with changing gain difference on the basis of an amount of correlation according to the conventional definition, an error arises in the phase difference detection result as described in FIGS. 13A to 14C. Hence, in the phase difference detection method of the second embodiment, the fluctuation of the output ratio between the image signals A and B for each pixel position is also defined as an amount of correlation to thereby calculate the phase difference, as in the first embodiment. When the number of the focus detection pixels is I, the signal of the ith pixel $S_{HA}$ is A(i), and the signal of the ith pixel $S_{HB}$ is B(i), an amount of correlation with the image A being shifted toward the left by PD bits is an unbiased variance represented by the following Formula (7), as in the first embodiment.

$$VAR(PD) = \frac{N \cdot \sum \left(\frac{A(i+PD)}{B(i)}\right)^2 - \left(\sum \frac{A(i+PD)}{B(i)}\right)^2}{N \cdot (N-1)}$$ Formula (7)

$$N = I - 2 \cdot PD$$ Formula (8)

Also in the phase difference detection method of the second embodiment, the variance VAR(PD) is treated as an amount of correlation for each amount of shift. An amount of shift where the variance attains the extreme value is considered to be a state in which the phase between the images A and B is matched, whereby the phase difference is detected. As used herein, "the variance attains the extreme value" means attaining the minimum value. By adapting the variance of the output ratio at each pixel position as an amount of correlation, the correlativity between the images A and B can be correctly expressed without being affected by the gain difference even when the gain difference exists between the pixel $S_{HA}$ and the pixel $S_{HB}$. Consequently, the phase difference detection error caused by the gain difference can be reduced. While the variance is used as the index indicating the fluctuation of the output ratio A(i+PD)/B(i) in the present invention, the standard deviation may also be used. It goes without saying that a similar effect is achieved with a predetermined multiple of the variance or the standard deviation. Further, as in the first embodiment, the variance (sample variance), which is the sum of the squares of the deviations from the mean split by the number of data, represented by the following Formula (9) may also be used.

$$VAR(PD) = \frac{\sum \left(\frac{A(i+PD)}{B(i)} - \frac{1}{N} \cdot \sum \frac{A(i+PD)}{B(i)}\right)^2}{N}$$ Formula (9)

The same effects can be obtained with a predetermined multiple of the value represented by Formula (9). In this particular embodiment, the output ratio A(i+PD)/B(i) between the signal of the pixel $S_{HA}$ and the signal of the pixel $S_{HB}$ is used as the comparison result for each pixel of the phase-matched images A and B, however, the absolute value |A(i+PD)/B(i)| of the output difference may also be used. When a flare component is contained in either one of the images, it is preferable that the absolute value of the output difference be used as the comparison result for each pixel. It is also possible to calculate the phase difference detection results obtained both from the output ratio and the absolute value of the output difference, and select a reliable detection result by determining the detection result, the degree of coincidence, or the contrast of the images. In the second embodiment, a series of phase difference detection computations described with reference to FIGS. 15A and 15B of the first embodiment is performed as in the first embodiment. The series of phase difference detection computations is the processing performed in the CPU 121. More specifically, the comparison unit 151 for calculating the comparison result for each pixel; the fluctuation calculation unit 152 for calculating the fluctuation of the output ratio; and the phase difference calculation unit 153 for calculating the phase difference where the fluctuation attains the extreme value are realized as a function of the CPU 121. As the effects when the variance VAR(PD) as shown in Formula (7) is an amount of correlation are the same as that described in FIGS. 16A to 18B of the first embodiment, no further description will be given here. As in the first embodiment, an amount of shift where the variance of the AB output ratio at each pixel position is minimized may be calculated to a fraction of a pixel. A method for the determination of an amount of shift to a fraction of a bit is the same as has been described with reference to FIG. 19 of the first embodiment. In the second embodiment, the re-shading correction is performed on the basis of the distribution of the output ratio between the phase-matched images A and B as described with reference to FIGS. 20A to 20C of the first embodiment. Assuming that an approximation formula of the distribution of the luminous energy ratio between the images A and B, which have been phase-matched by shifting the phase difference PD detected by an amount of correlation as defined by Formula (7), is f(i), f(i) is represented by the following formula as in the first embodiment.

$$f(i) = m \cdot i + b \qquad \text{Formula (12)}$$

$$m = \frac{N \cdot \left(\sum i\right) \cdot \left(\sum \frac{A(i+PD)}{B(i)}\right)}{\cdot N(\sum i^2) - (\sum i)^2} \qquad \text{Formula (13)}$$

$$b = \frac{\left(\sum \frac{A(i+PD)}{B(i)}\right) \cdot \left(\sum i^2\right) - \left(\sum i\right) \cdot \left(\sum i \cdot \frac{A(i+PD)}{B(i)}\right)}{N \cdot (\sum i^2) - (\sum i)^2} \qquad \text{Formula (14)}$$

The gain difference between the pixel $S_{HA}$ and the pixel $S_{HB}$ is corrected by multiplying the signal of the ith pixel $S_{HB}$ by f(i). As shown in FIG. 20C, the images A and B subjected to the re-shading correction are capable of overcoming the gain difference, whereby the degree of coincidence between the images A and B can be improved. While an approximation of a first order straight line has been described in formulae (12) to (14), approximation formula including a second or higher order can also be calculated in the same manner using a method of least squares. Also, in order to reduce the amount of computation, an approximate straight line may also be defined from the average of the right half of the AB output ratio and the average of the left half of the AB output ratio. While a method of multiplying the signal of the pixel $S_{HB}$ by f(i) has been described, the signal of the pixel $S_{HA}$ may also be split by f(i). If a phase difference between the images A and B is detected by the variance of the output ratio for each pixel, the phase difference can be correctly detected without correcting a light intensity difference between the images A and B. However, in the present invention, in order to determine the reliability of the phase difference detection result, the re-shading correction between the images A and B is performed on the basis of the distribution of the output ratio between the phase-matched images A and B. By doing so, the waveforms between the images A and B are matched, whereby the reliability of the phase difference detection result can be correctly determined. The re-shading correction is performed each time the phase difference is detected. By doing so, whether or not the detection result of the phase difference at that time is accurate can be correctly evaluated each time the phase difference is detected. As described above in FIGS. 20A to 20C, the re-shading correction is performed on the basis of the distribution of the output ratio between the phase-matched images A and B such that the variance of the AB output ratio for each pixel is minimized. By doing so, the degree of coincidence between the images A and B can be improved without shooting under uniform light, whereby the reliability of the phase difference detection result can be correctly evaluated.

Figure 32:
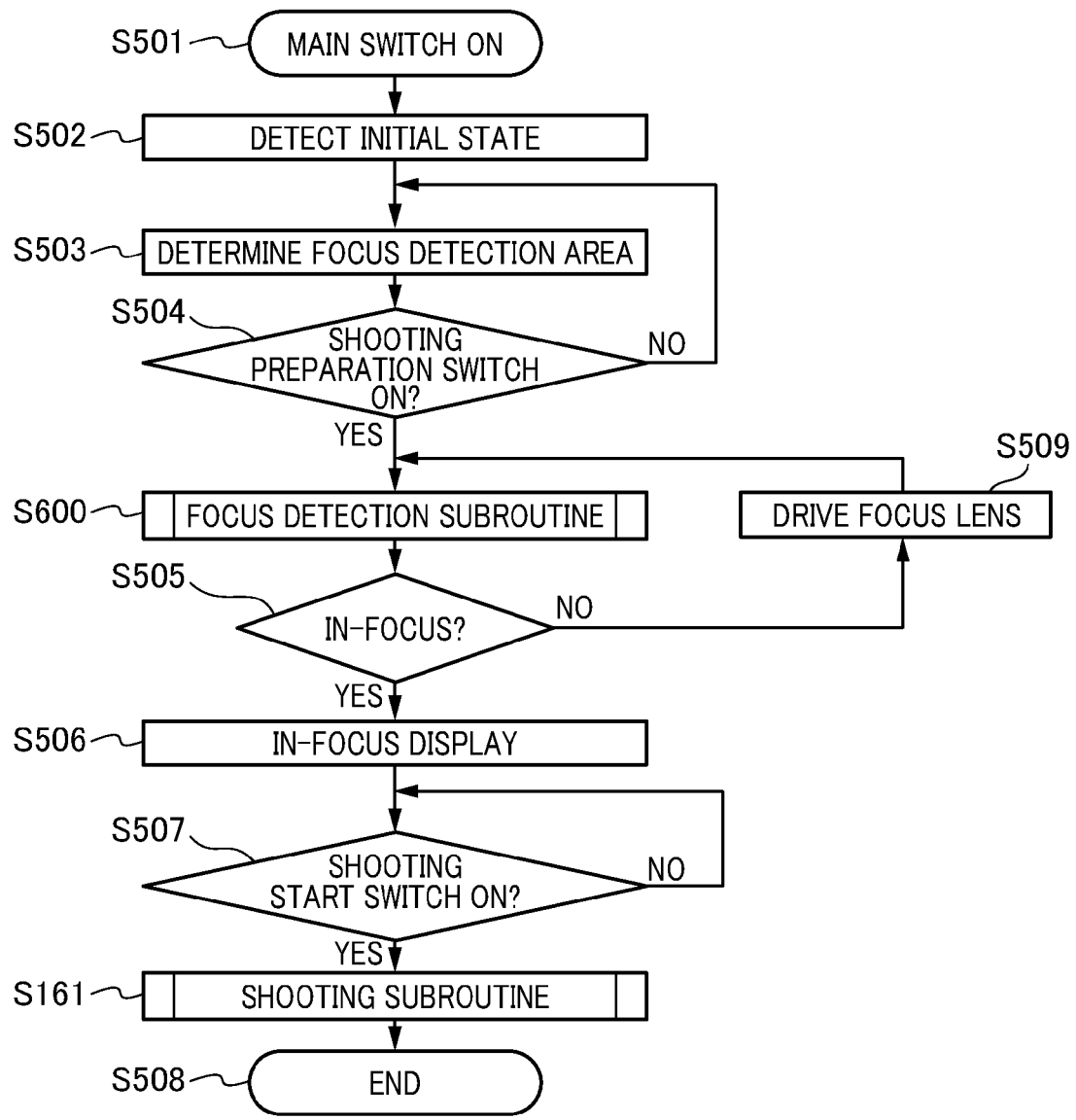
FIG. 32 is a main flowchart diagram of the camera of the second embodiment of the present invention.

Next, the steps of focus adjusting and shooting of the camera according to the second embodiment will be described with reference to FIGS. 32 and 33. FIG. 32 is a main flowchart diagram of a camera of the second embodiment of the present invention. In S501, the user turns on the power switch of the camera. Then, in S502, the CPU 121 checks the operations of the actuators and image sensor in the camera. The CPU 121 detects the initialized state of memory contents and programs to be executed, and executes a shooting preparation operation. In S503, the CPU 121 determines the focus detection area on the basis of the position specified by a focus detection area specifying unit mounted on an operation switch 132. In S504, the CPU 121 determines whether or not the user has turned on the shooting preparation switch. If the user has not turned on the shooting preparation switch, the CPU 121 returns to S503 to confirm the focus detection area specified by the focus detection area specifying unit. If the user has turned on the shooting preparation switch in S504, the CPU 121 shifts to S600 to execute a focus detection subroutine.

Figure 33:
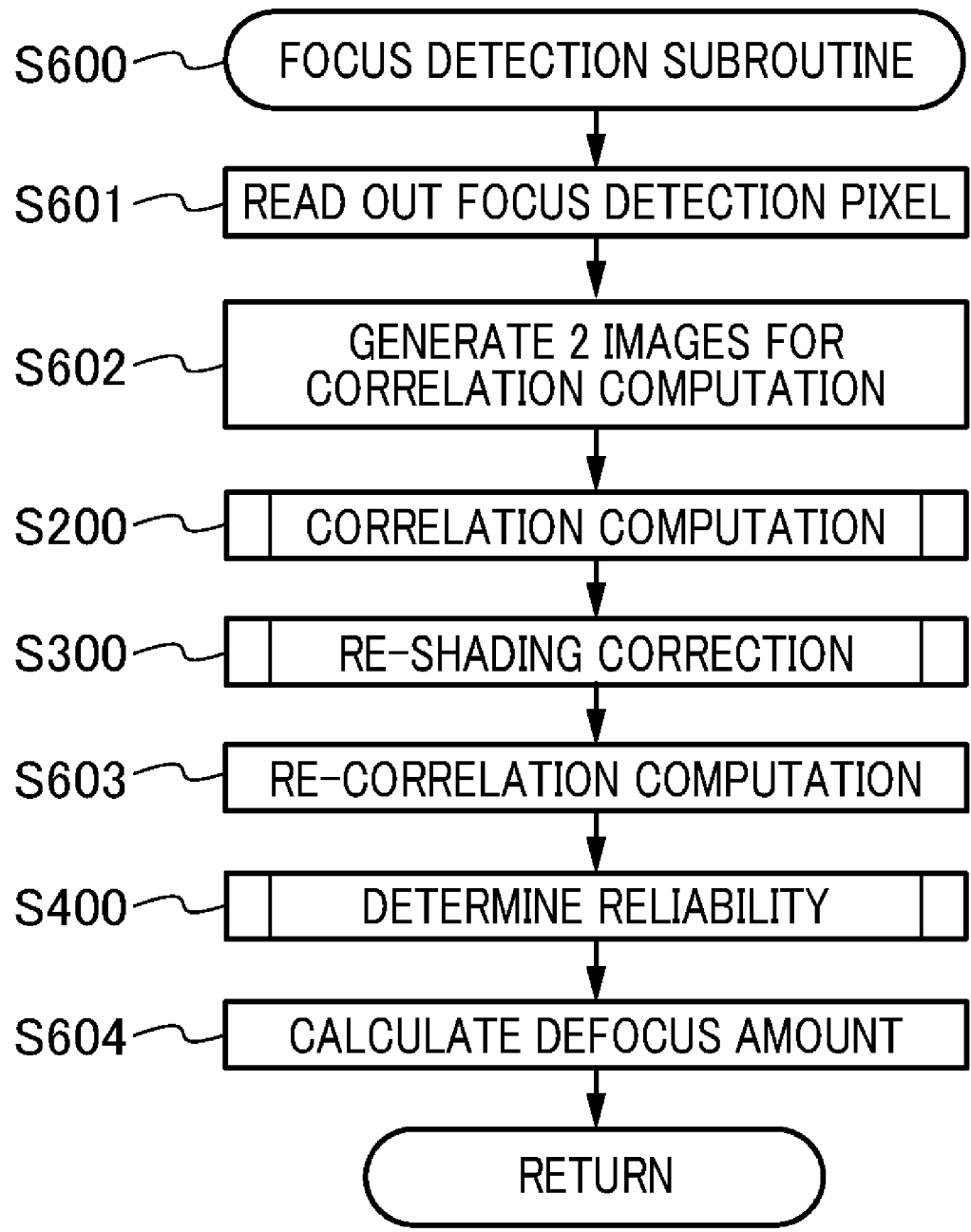
FIG. 33 is a flowchart diagram of the focus detection subroutine (step S600 in FIG. 32).

FIG. 33 is a flowchart diagram of the focus detection subroutine (S600 in FIG. 32). When the process moves from S600 in the main flow to S600 in the focus detection subroutine, in S601, the CPU 121 reads out focus detection pixels included in the focus detection area determined in S503 of the main routine. In S602, the CPU 121 arranges signals obtained from the pixel $S_{HA}$ to generate the image A signal, and arranges signals obtained from the pixel $S_{HB}$ to generate the image B signal. These signals are the signals of the images A and B for correlation computation. More specifically, a pair of signals such as $AFSIG_h$ (A1) and $AFSIG_h$ (B1) or $AFSIG_V$ (C3) and $AFSIG_V$ (D3) as shown in FIG. 9 are generated. In S200, the CPU 121 performs correlation computation on the basis of the obtained images A and B to calculate a phase difference between the images A and B. The correlation computation in S200 performs the operations shown in FIG. 23 as described in the first embodiment. In S300, the relative position relationship between the images A and B is shifted by the phase difference obtained by the correlation computation in S200 to correct the AB output ratio (re-shading correction) on the basis of the AB output ratio for each pixel of the phase-matched images A and B. The re-shading correction in S300 performs the operations shown in FIG. 24 as described in the first embodiment. In S603, the CPU 121 performs correlation computation again for the images A and B in which a re-shading corrected luminous energy ratio has been corrected to calculate a phase difference between the images A and B. In S400, the CPU 121 determines the reliability of the correlation computation result. The term "reliability" refers to the degree of coincidence between the images A and B. When the degree of coincidence between the images A and B is good, the reliability of the focus detection result is generally high. The reliability of the phase difference detection result is determined based on whether or not the degree of coincidence exceeds a threshold value. When a plurality of focus detection areas is selected, information with high reliability is preferentially used. The reliability determination in S400 performs the operations shown in FIG. 25 as described in the first embodiment. In S604, the CPU 121 computes the defocus amount from the detection result with high reliability. The process returns to the output of S600 in the main flow shown in FIG. 32. Referring back to FIG. 32, in S505, the CPU 121 determines whether or not the defocus amount is equal to or less than a permissible value calculated in S604, that is, whether or not the images A and B are in focus. If the defocus amount is above a permissible value, the CPU 121 determines that the images A and B are not in focus, drives the focus lens in S509, and then repeatedly executes the processing from S600 to S505. If the CPU 121 determines that the images A and B are in focus in S505, an in-focus display is performed in S506, and the processing shifts from S506 to S507. In S507, the CPU 121 determines whether or not the shooting start switch has turned on. If the switch has not turned on, the CPU 121 maintains the shooting standby state in S507. If the shooting start switch is turned on in S507, the processing shifts from S507 to S161 to execute a shooting subroutine. The shooting subroutine in S161 performs the operations shown in FIG. 26 as described in the first embodiment. After returning to the main routine of FIG. 32 from the shooting subroutine in S161, the CPU 121 ends a series of shooting operations in S508.

As described above, according to the second embodiment, the phase difference detection error can be reduced even for a pair of image signals having a gain difference since the pixel output ratio for each pixel of a pair of image signals is calculated and then the phase difference utilizing the fluctuation of the distribution of the output ratio as an amount of correlation is calculated. By using the phase difference detection method of the present embodiment applied to the focus detection device that detects the focus state of the photographic optical system 201 on the basis of a phase difference between a pair of image signals, the focus detection error is less prone to occur even for a pair of image signals having a gain difference. Further, the gain difference between a pair of image signals is corrected on the basis of the distribution of the pixel output ratio for each pixel of a pair of image signals between which the phase has been matched utilizing the fluctuation of the distribution of the output ratio as an evaluation amount. Therefore, the degree of coincidence between a pair of image signals can be improved even when shooting under non-uniform light, whereby the reliability of the phase difference detection can be correctly determined.

Third Embodiment

In the second embodiment, a light beam guided by the optical path splitting between the photographic optical system 201 and the image sensor 204 is reimaged by a secondary image forming optical system (reimaging lens 214) composed of a pair of lens elements. Then, the focus state of the photographic optical system 201 on the basis of the phase difference between a pair of obtained image signals was described. In other words, the second embodiment is a phase difference focus detection method of the TTL secondary image-forming type. In the third embodiment, in addition to the photographic optical system, there is separately provided a focus detection optical system, whereby focus detection is performed by the triangulation principle. In other words, the phase difference focus detection method of the external measuring type is a feature of the third embodiment.

Figure 34:
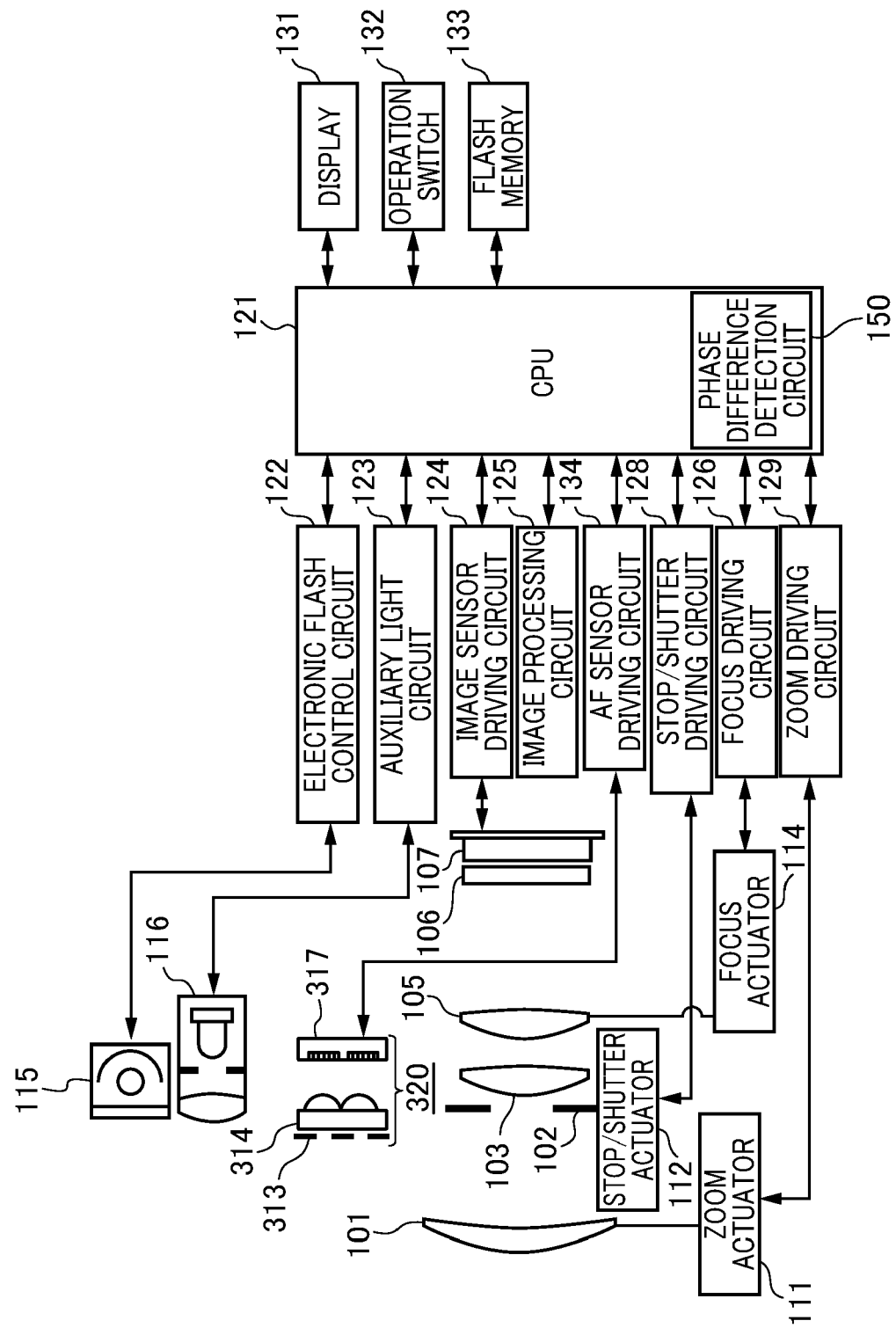
FIG. 34 is a view showing a configuration of a camera of the third embodiment.

FIG. 34 is a view showing a configuration of a camera of the third embodiment. The camera of the third embodiment is a digital camera integrating a camera body having the image sensor 107 with a photographic optical system (101, 103, 105). The third embodiment is different from the second embodiment in that the former does not include an optical system (sub mirror 203) for splitting an optical path, and a focus detection device 320 is provided with the camera body separately from the photographic optical system. As the configuration of the third embodiment is the same as that of the second embodiment except for the points mentioned above, no further description will be given here. The focus detection device 320 mounted on the camera of the third embodiment is constituted by an imaging lens 314, a stop 313, and a focus detection sensor 317. The imaging lens 314 has a pair of lenses, and forms a pair of object optical images on the light-receiving portion surface of the focus detection sensor 317. The stop 313 has an aperture corresponding to the lens of the imaging lens 314, and limits a light beam incident on the lens of the imaging lens 314. With this arrangement, the stop 313 functions as the exit pupil of the imaging lens 314. A light-receiving portion corresponding to the lens of the imaging lens 314 is provided at the focus detection sensor 317, wherein the light-receiving portion is composed of a plurality of focus detection pixels. The focus detection sensor 317 is a photoelectric conversion unit that photoelectrically converts a pair of object optical images imaged by the imaging lens 314. The focus detection sensor 317 arranges signals obtained from a plurality of pixels so as to generate a pair of image signals. The AF sensor driving circuit 134 drives the focus detection sensor 317. The CPU 121 acquires a pair of image signals from the focus detection device 320 via the AF sensor driving circuit 134 and calculates the phase difference on the basis of the phase difference calculation method to be described below. The phase difference focus detection method of the external measuring type is a known technique disclosed in Japanese Patent Laid-Open No. 2004-12601. Hence, an explanation of the distance measuring principles based on the triangulation principles will be omitted.

Next, it is explained that the gain difference between a pair of image signals may also occur in the camera of the third embodiment. As described in FIG. 34, the stop 313 has a pair of apertures corresponding to the lens of the imaging lens 314. When the surface areas of the pair of apertures become different sizes due to manufacturing errors, the amount of light incident on a pair of lenses of the imaging lens 314 is changed. This may result in a gain difference between the resultant pair of image signals, which further causes a gain difference as shown in FIG. 12A of the first embodiment between a pair of obtained image signals from the focus detection device 320. When the phase difference detection is performed for such a pair of image signals having a gain difference on the basis of an amount of correlation according to the conventional definition, an error arises in the phase difference detection result as described in FIGS. 13A to 14C. In general, the focus detection device of the external measuring type is often extremely compact, so the pair of apertures in the stop 313 is also very small. As a result, even if the dimensions of the apertures are aligned with high precision, the influence of the remaining dimensional errors on the aperture areas is significant, and thereby mismatches of the aperture areas cannot be avoided. Therefore, the gain difference between a pair of image signals caused by the above-mentioned manufacturing errors is an unavoidable problem. When the phase difference detection is performed for such a pair of image signals having a changing gain difference on the basis of an amount of correlation according to the conventional definition, an error arises in the phase difference detection result as described in FIGS. 13A to 14C. Hence, in the phase difference detection method of the third embodiment, the fluctuation of the output ratio between the image signals A and B for each pixel position is also defined as an amount of correlation, and the phase difference is calculated, as in the first embodiment. When the number of the focus detection pixels is I, the signal of the ith pixel $S_{HA}$ is A(i), and the signal of the ith pixel $S_{HB}$ is B(i), an amount of correlation with the image A being shifted toward the left by PD bits is an unbiased variance represented by the following Formula (7), as in the first embodiment.

$$VAR(PD) = \frac{N \cdot \sum \left( \frac{A(i+PD)}{B(i)} \right)^2 - \left( \sum \frac{A(i+PD)}{B(i)} \right)^2}{N \cdot (N-1)} \quad \text{Formula (7)}$$

$$N = I - 2 \cdot PD \quad \text{Formula (8)}$$

In the phase difference detection method of the third embodiment, the variance VAR(PD) is also treated as an amount of correlation for each amount of shift. An amount of shift where the variance attains the extreme value is considered to be a state in which the phase between the images A and B is matched, whereby the phase difference is detected. As used herein, "the variance attains the extreme value" means attaining the minimum value. By adapting the variance of the output ratio at each pixel position as an amount of correlation, the correlativity between the images A and B can be correctly expressed without being affected by the gain difference even when the gain difference exists between the images A and B. Consequently, the phase difference detection error caused by the gain difference can be reduced. While the variance is used as the index indicating the fluctuation of the output ratio $A(i+PD)/B(i)$ in the present invention, the standard deviation may also be used. It goes without saying that a similar effect can be obtained with a predetermined multiple of the variance or the standard deviation. Further, as in the first embodiment, the variance (sample variance), which is the sum of the squares of the deviations from the mean split by the number of data, represented by the following Formula (9), may also be used as the fluctuation calculation.

$$VAR(PD) = \frac{\sum \left( \frac{A(i+PD)}{B(i)} - \frac{1}{N} \cdot \sum \frac{A(i+PD)}{B(i)} \right)^2}{N} \quad \text{Formula (9)}$$

The same effects can be obtained with a predetermined multiple of the value represented by Formula (9). In this particular embodiment, the output ratio $A(i+PD)/B(i)$ between the signal of the pixel $S_{HA}$ and the signal of the pixel $S_{HB}$ is used as the comparison result for each pixel of the phase-matched images A and B, however, the absolute value $|A(i+PD)/B(i)|$ of the output difference may also be used. When a flare component is contained in either one of the images, it is preferable that the absolute value of the output difference be used as the comparison result for each pixel. It is also possible to calculate the phase difference detection results obtained both from the output ratio and the absolute value of the output difference, and select a reliable detection result by determining the detection result, the degree of coincidence, or the contrast of the images. In the third embodiment, a series of phase difference detection computations described with reference to FIGS. 15A and 15B of the first embodiment is performed as in the first embodiment. The series of phase difference detection computations is the processing performed in the CPU 121. More specifically, the comparison unit 151 for calculating the comparison result for each pixel; the fluctuation calculation unit 152 for calculating the fluctuation of the output ratio; and the phase difference calculation unit 153 for calculating the phase difference where the fluctuation is the extreme value are realized as a function of the CPU 121. As the effects when the variance VAR(PD) as shown in Formula (7) is an amount of correlation are the same as that described in FIGS. 16A to 18B of the first embodiment, no further description will be given here. As in the first embodiment, an amount of shift where the variance of the AB output ratio at each pixel position is minimized may be calculated to decimal places. The method for the determination of an amount of shift to decimal places is the same as has been described with reference to FIG. 19 of the first embodiment. In the third embodiment, the re-shading correction is performed on the basis of the distribution of the output ratio between the phase-matched images A and B as described with reference to FIGS. 20A to 20C of the first embodiment. Assuming that an approximation formula of the distribution of the luminous energy ratio between the images A and B, which have been phase-matched by shifting the phase difference PD detected by an amount of correlation as defined by Formula (7), is f(i), f(i) is represented by the following formula as in the first embodiment.

$$f(i) = m \cdot i + b \quad \text{Formula (12)}$$

$$m = \frac{N \cdot \left(\sum i\right) \cdot \left(\sum \frac{A(i+PD)}{B(i)}\right)}{\cdot N(\sum i^2) - (\sum i)^2} \quad \text{Formula (13)}$$

$$b = \frac{\left(\sum \frac{A(i+PD)}{B(i)}\right) \cdot \left(\sum i^2\right) - \left(\sum i\right) \cdot \left(\sum i \cdot \frac{A(i+PD)}{B(i)}\right)}{N \cdot (\sum i^2) - (\sum i)^2} \quad \text{Formula (14)}$$

The gain difference between the pixel $S_{HA}$ and the pixel $S_{HB}$ is corrected by multiplying the signal of the ith pixel $S_{HB}$ by f(i). As shown in FIG. 20C, the images A and B subjected to the re-shading correction are capable of overcoming the gain difference, whereby the degree of coincidence between the images A and B can be improved. While an approximation of a first order straight line has been described in formulae (12) to (14), approximation formula including a second or higher order can also be calculated in the same manner using a method of least squares. Also, in order to reduce the amount of computation, an approximately straight line may also be defined from the average of the right half of the AB output ratio and the average of the left half of the AB output ratio. While a method of multiplying the signal of the pixel $S_{HB}$ by f(i) has been described, the signal of the pixel $S_{HA}$ may also be split by f(i). If a phase difference between the images A and B is detected by the variance of the output ratio for each pixel, the phase difference can be correctly detected without correcting a light intensity difference between the images A and B. However, in the present invention, in order to determine the reliability of the phase difference detection result, the re-shading correction between the images A and B is performed on the basis of the distribution of the output ratio between the phase-matched images A and B. By doing so, the waveforms between the images A and B are matched, whereby the reliability of the phase difference detection result can be correctly determined. The re-shading correction is performed each time the phase difference is detected. By doing so, whether or not the detection result of the phase difference at that time is accurate can be correctly evaluated each time the phase difference is detected. As described above in FIGS. 20A to 20C, the re-shading correction is performed on the basis of the distribution of the output ratio between the phase-matched images A and B such that the variance of the AB output ratio for each pixel is minimized. By doing so, the degree of coincidence between the images A and B can be improved even when shooting under non-uniform light, whereby the reliability of the phase difference detection result can be correctly evaluated. As the steps of focus adjusting and shooting of the camera of the third embodiment are carried out in the same manner as that of the second embodiment, no further description will be given here.

The third embodiment has been described as what is referred to as a passive type, in which light from an object is received to acquire a pair of image signals so as to calculate the phase difference. However, the present invention can be applied to what is referred to as an active type, in which infrared light is projected to an object and light reflected from the object is received to acquire a pair of image signals so as to calculate the phase difference. The gain difference between a pair of image signals will occur in either the passive or active type due to their similar mechanism.

Therefore, by applying the approach of the phase difference calculation of the present invention, the phase difference detection error caused by the gain difference can be reduced.

As described above, according to the third embodiment, the phase difference detection error can be reduced even for a pair of image signals having a gain difference since the pixel output ratio for each pixel of a pair of image signals is calculated and then the phase difference utilizing the fluctuation of the distribution of the output ratio as an amount of correlation is calculated. By using the above-described phase difference detection method applied to the focus detection device that detects the focus state of the photographic optical system on the basis of a phase difference between a pair of image signals, the focus detection error is less prone to occur even for a pair of image signals having a gain difference. Further, the gain difference between a pair of image signals is corrected on the basis of the distribution of the pixel output ratio for each pixel of a pair of image signals between which the phase has been matched utilizing the fluctuation of the distribution of the output ratio as an evaluation amount. Therefore, the degree of coincidence between a pair of image signals can be improved without shooting under uniform light, whereby the reliability of the phase difference detection can be correctly determined.

MODIFICATIONS

It is to be understood that the present invention is not limited to the preferred embodiment described above. Various changes and modifications may be made in the invention without departing from the spirit and scope thereof.

(1) While description has been made in each of the foregoing embodiments regarding the example in which a digital camera is used as an imaging apparatus, the present invention is not limited thereto. For example, the present invention may be applied to a video camera being mainly intended for use in moving-image shooting.

(2) In each of the foregoing embodiments, description has been made regarding the example in which correlation computation is performed again for the images A and B in which a re-shading corrected luminous energy ratio has been corrected and then a phase difference between the images A and B is calculated. However, the present invention is not limited thereto. For example, the present invention may be applied for the carrying out of focus adjustment by calculating a phase difference between the images A and B from the result of the correlation computation to be performed before re-shading correction without conducting re-correlation computation.

(3) In each of the foregoing embodiments, description has been made regarding the example in which the statistical fluctuation of the comparison result of the images A and B is evaluated by the unbiased variance represented by Formula (7) or the sample variance represented by Formula (9). However, the unbiased variance and sample variance representing the statistical fluctuation of the comparison result of the images A and B are not limited to these formulae, but may also employ formulae shown below.

$$\text{Unbiased variance: } \frac{\sum (X - X_{ave})^2}{N - 1} \qquad \text{Formula (B)}$$

$$\text{Standard variance: } \frac{N \sum X^2 - \left(\sum X\right)^2}{N^2} \qquad \text{Formula (C)}$$

Also, the statistical fluctuation of the comparison result of the images A and B may be evaluated using a value representing other statistical fluctuations (variance) such as range, interquartile range, mean difference, and mean deviation, in addition to variance and standard deviation.

(4) While description has been made in each of the foregoing embodiments regarding the example in which the present invention is applied to a camera as an imaging apparatus, the present invention is not limited thereto. For example, the device of the present invention may be in the form of a computer program capable of instructing a computer to carry out the phase difference detection method of the present invention. By doing so, this computer program can be applied to an imaging apparatus by what is referred to as a firmware upgrade that upgrades a program for controlling an imaging apparatus, whereby the phase difference detection of the existing imaging apparatus can be performed with high accuracy.

While the first to third embodiments and the variations can be used in an appropriate combination, no further description will be given here. The present invention is not limited to the aforementioned embodiments.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-186401 filed Jul. 17, 2008 which are hereby incorporated by reference herein it their entirety.

What is claimed is:

1. A phase difference detection device comprising:
a photoelectric conversion unit in which a plurality of pixels for photoelectrically converting received light are arrayed,
the photoelectric conversion unit being configured to photoelectrically convert at least a pair of optical images received through a lens so as to generate a first image signal and a second image signal; and
a phase difference detection unit comprising:
unit for obtaining first and second image signals from each of at least two pixel positions in the photoelectric conversion unit,
comparison unit for comparing the first image signal with the second image signal for each pixel position,
fluctuation calculation unit for calculating a fluctuation of first and second image signals,
unit for comparing the calculated fluctuation over a range of pixel positions to obtain a resultant first image signal and a resultant second image signal, and
phase difference calculation unit for calculating a phase difference between the resultant first and second image signals in order to enable the determination of a focus state of the lens on the basis of the calculated fluctuation.

2. The phase difference detection device according to claim 1, wherein the resultant first and second image signals are signals with the lowest calculated fluctuation as calculated by the fluctuation calculation unit.

3. The phase difference detection device according to claim 1, wherein the comparison unit is configured to output at least one of the ratio and the difference between the respective first and second image signals.

4. The phase difference detection device according to claim 1, wherein the fluctuation calculation made by the fluctuation calculation unit comprises at least one of the variance, the standard deviation, a predetermined multiple of the variance, and a predetermined multiple of the standard deviation.

5. The phase difference detection device according to claim 1, wherein the fluctuation calculation unit is configured to calculate the fluctuation of intensity of at least one of the first and second image signals over a range of pixel positions.

6. The phase difference detection device according to claim 1, wherein, when N represents a number of comparison results for each of the pixels output by the comparison unit for the respective first and second image signals, X represents individual values of the comparison results for each of the pixels output by the comparison unit for the respective first and second image signals, and $X_{ave}$ represents the mean of X, the fluctuation calculation made by the fluctuation calculation unit is a value represented by the following formula:

$$\frac{\sum (X - X_{ave})^2}{N}$$

or a predetermined multiple of the value.

7. The phase difference detection device according to claim 1, wherein, when N represents a number of comparison results for each of the pixels output by the comparison unit for the respective first and second image signals, and X represents individual values of the comparison results for each of the pixels output by the comparison unit for the respective first and second image signals, the fluctuation calculated by the fluctuation calculation unit is a value represented by the following formula:

$$\frac{N \sum X^2 - \left(\sum X\right)^2}{N(N-1)}$$

or a predetermined multiple of the value.

8. The phase difference detection device according to claim 1, wherein the phase difference calculation unit is configured to calculate the phase difference between respective first and second image signals where the analysis made by the analysis unit comprises an extreme variation between respective first or second image signals.

9. The phase difference detection device according to claim 1, wherein the phase difference calculation unit is configured to calculate the phase difference between the respective first and second image signals on the basis of the fluctuation calculation result indicating that a statistical variation between respective first or second image signals is minimized.

10. The phase difference detection device according to claim 1, wherein the phase difference calculation unit is configured to calculate the phase difference between the respective first and second image signals on the basis of the fluctuation calculation unit finding that a change amount of a statistical variation is zero.

11. The phase difference detection device according to claim 1, wherein the photoelectric conversion unit comprises phase difference detecting pixels which generate the first and second image signals for use in phase difference detection, and image sensing pixels which generate an imaging signal for use in the generation of image data for imaging an object from which light enters the lens, and wherein the phase difference detecting pixels are dispersed amongst the image sensing pixels.

12. An imaging apparatus comprising:
    a lens;
    the phase difference detection device according to claim 1;
    a photographic optical system for operating focus adjustment of the lens on the basis of the phase difference detection result of the phase difference detection device; and
    an image sensor for creating an object image based on the operation of the photographic optical system.

13. A phase difference detection method for a phase difference detection device comprising a photoelectric conversion unit in which a plurality of pixels for photoelectrically converting received light are arrayed, the method comprising:
    obtaining first and second image signals from each of at least two pixel positions;
    comparing the first image signal with the second image signal for each pixel position,
    calculating a fluctuation of first and second image signals,
    comparing the calculated fluctuation over a range of pixel positions to obtain a resultant first image signal and a resultant second image signal, and
    calculating a phase difference between the resultant first and second image signals in order to enable the determination of a focus state of the lens on the basis of the calculated fluctuation.

14. A non-transitory computer-readable recording medium having recorded thereon a computer program which, when executed on a computer, causes the computer to carry out the method of claim 13.

* * * * *